United States Patent
Rahman et al.

(10) Patent No.: US 12,542,581 B2
(45) Date of Patent: Feb. 3, 2026

(54) METHOD AND APPARATUS FOR CONFIGURING AN UL CODEBOOK

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 18/476,228

(22) Filed: Sep. 27, 2023

(65) Prior Publication Data

US 2024/0154655 A1 May 9, 2024

Related U.S. Application Data

(60) Provisional application No. 63/414,784, filed on Oct. 10, 2022, provisional application No. 63/415,839, (Continued)

(51) Int. Cl.
   *H04B 7/0456* (2017.01)
   *H04W 72/232* (2023.01)

(52) U.S. Cl.
   CPC ........ *H04B 7/0456* (2013.01); *H04W 72/232* (2023.01)

(58) Field of Classification Search
   CPC .................. H04B 7/0456; H04W 72/232
   See application file for complete search history.

(56) References Cited

U.S. PATENT DOCUMENTS

| | | |
|---|---|---|
| 2018/0183503 A1 | 6/2018 | Rahman et al. |
| 2020/0112346 A1 | 4/2020 | Tan et al. |

(Continued)

FOREIGN PATENT DOCUMENTS

| | | |
|---|---|---|
| WO | 2022027997 A1 | 2/2022 |
| WO | 2024065744 A1 | 4/2024 |

OTHER PUBLICATIONS

International Search Report and Written Opinion issued Jan. 18, 2024 regarding International Application No. PCT/KR2023/015527, 7 pages.

(Continued)

*Primary Examiner* — Samina F Choudhry

(57) ABSTRACT

Apparatuses and methods for configuring uplink (UL) codebook are provided. A method performed by a user equipment (UE) includes transmitting UE capability information including at least one value of $N_g$ from $\{1, 2, 4, 8\}$, each value indicating a number of antenna port groups with each group comprising $N/N_g$ antenna ports, where N is a number of antenna ports at the UE, and receiving a configuration about (i) an uplink (UL) codebook for N antenna ports and (ii) a configured $N_g$ value. The UL codebook is according to one of the at least one value of $N_g$. The method further includes receiving an indication indicating a transmit precoding matrix indicator (TPMI) for transmission of a physical uplink shared channel (PUSCH) and transmitting the PUSCH based on the indicated TPMI. The TPMI indicates a precoding matrix (W) from the UL codebook for N antenna ports. At least one value of N is 8.

20 Claims, 7 Drawing Sheets

Related U.S. Application Data filed on Oct. 13, 2022, provisional application No. 63/468,196, filed on May 22, 2023, provisional application No. 63/470,079, filed on May 31, 2023.

(56) References Cited

U.S. PATENT DOCUMENTS

| | | | |
|---|---|---|---|
| 2020/0412421 A1 | 12/2020 | Jiang et al. | |
| 2021/0351829 A1 | 11/2021 | Kakishima et al. | |
| 2022/0279492 A1 | 9/2022 | Park et al. | |
| 2022/0287059 A1 | 9/2022 | Huang et al. | |
| 2023/0403118 A1* | 12/2023 | Xiao | H04L 5/0094 |
| 2024/0040584 A1* | 2/2024 | Yuan | H04W 72/232 |

OTHER PUBLICATIONS

"LTE; Evolved Universal Terrestrial Radio Access (E-UTRA); Physical channels and modulation (3GPP TS 36.211 version 17.1.0 Release 17)", ETSI TS 136 211 V17.1.0, May 2022, 252 pages.

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"LTE; Evolved Universal Terrestrial Radio Access (E-UTRA); Physical layer procedures (3GPP TS 36.213 version 17.1.0 Release 17)", ETSI TS 136 213 V17.1.0, May 2022, 586 pages.

"LTE; Evolved Universal Terrestrial Radio Access (E-UTRA); Medium Access Control (MAC) protocol specification (3GPP TS 36.321 version 17.1.0 Release 17)", ETSI TS 136 321 V17.1.0, Aug. 2022, 147 pages.

"LTE; Evolved Universal Terrestrial Radio Access (E-UTRA); Radio Resource Control (RRC); Protocol specification (3GPP TS 36.331 version 17.1.0 Release 17)", ETSI TS 136 331 V17.1.0, Aug. 2022, 1135 pages.

"3rd Generation Partnership Project; Technical Specification Group Radio Access Network; NR; Physical channels and modulation (Release 17)", 3GPP TS 38.211 V17.1.0, Mar. 2022, 135 pages.

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages.

"3rd Generation Partnership Project; Technical Specification Group Radio Access Network; NR; Physical layer procedures for data (Release 17)", 3GPP TS 38.214 V17.1.0, Mar. 2022, 225 pages.

5G; NR; Physical layer measurements (3GPP TS 38.215 version 17.1.0 Release 17), ETSI TS 138 215 V17.1.0, Apr. 2022, 32 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

Extended European Search Report issued Oct. 17, 2025 regarding Application No. 23877627.2, 15 pages.

Vivo, "Discussion on enabling 8 TX UL transmission", 3GPP TSG RAN WG1 #110bis-e, R1-2208632, Oct. 2022, 7 pages.

CMCC, "Discussion on SRI/TPMI enhancement for enabling 8 TX UL transmission", 3GPP TSG RAN WG1 #110bis-e, R1-2209326, Oct. 2022, 7 pages.

* cited by examiner

METHOD AND APPARATUS FOR CONFIGURING AN UL CODEBOOK

CROSS-REFERENCE TO RELATED APPLICATION AND CLAIM OF PRIORITY

This application claims priority under 35 U.S.C. § 119(e) to U.S. Provisional Patent Application No. 63/414,784 filed on Oct. 10, 2022, U.S. Provisional Patent Application No. 63/415,839 filed on Oct. 13, 2022, U.S. Provisional Patent Application No. 63/468,196 filed on May 22, 2023, and U.S. Provisional Patent Application No. 63/470,079 filed on May 31, 2023. The above-identified provisional patent applications are hereby incorporated by reference in their entirety.

TECHNICAL FIELD

The present disclosure relates generally to wireless communication systems and, more specifically, to configuring an uplink (UL) codebook.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for configuring an UL codebook.

In one embodiment, a user equipment (UE) is provided. The UE includes a processor and a transceiver operably connected to the processor. The transceiver is configured to transmit UE capability information including at least one value of $N_g$ from $\{1, 2, 4, 8\}$, each value indicating a number of antenna port groups with each group comprising $N/N_g$ antenna ports, where N is a number of antenna ports at the UE; receive a configuration about (i) an uplink (UL) codebook for N antenna ports and (ii) a configured $N_g$ value. The UL codebook is according to the configured $N_g$ value and the configured $N_g$ value is based on the at least one value of $N_g$; receive an indication indicating a transmit precoding matrix indicator (TPMI) for transmission of a physical uplink shared channel (PUSCH); and transmit the PUSCH based on the indicated TPMI. The TPMI indicates a precoding matrix (W) from the UL codebook for N antenna ports. At least one value of N is 8.

In another embodiment, a base station (BS) is provided. The BS includes a processor and a transceiver operably connected to the processor. The transceiver is configured to receive UE capability information including at least one value of $N_g$ from $\{1, 2, 4, 8\}$, each value indicating a number of antenna port groups with each group comprising $N/N_g$ antenna ports, where N is a number of antenna ports at the UE; transmit a configuration about (i) an uplink (UL) codebook for N antenna ports and (ii) a configured $N_g$ value, wherein the UL codebook is according to the configured $N_g$ value and the configured $N_g$ value is based on the at least one value of $N_g$; transmit an indication indicating a TPMI for transmission of a PUSCH; and receive the PUSCH based on the indicated TPMI. The TPMI indicates a precoding matrix (W) from the UL codebook for N antenna ports. At least one value of N is 8.

In yet another embodiment, a method performed by a UE is provided. The method includes transmitting UE capability information including at least one value of $N_g$ from $\{1, 2, 4, 8\}$, each value indicating a number of antenna port groups with each group comprising $N/N_g$ antenna ports, where N is a number of antenna ports at the UE, and receiving a configuration about (i) an uplink (UL) codebook for N antenna ports and (ii) a configured $N_g$ value. The UL codebook is according to the configured $N_g$ value and the configured $N_g$ value is based on the at least one value of $N_g$. The method further includes receiving an indication indicating a TPMI for transmission of a PUSCH and transmitting the PUSCH based on the indicated TPMI. The TPMI indicates a precoding matrix (W) from the UL codebook for N antenna ports. At least one value of N is 8.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
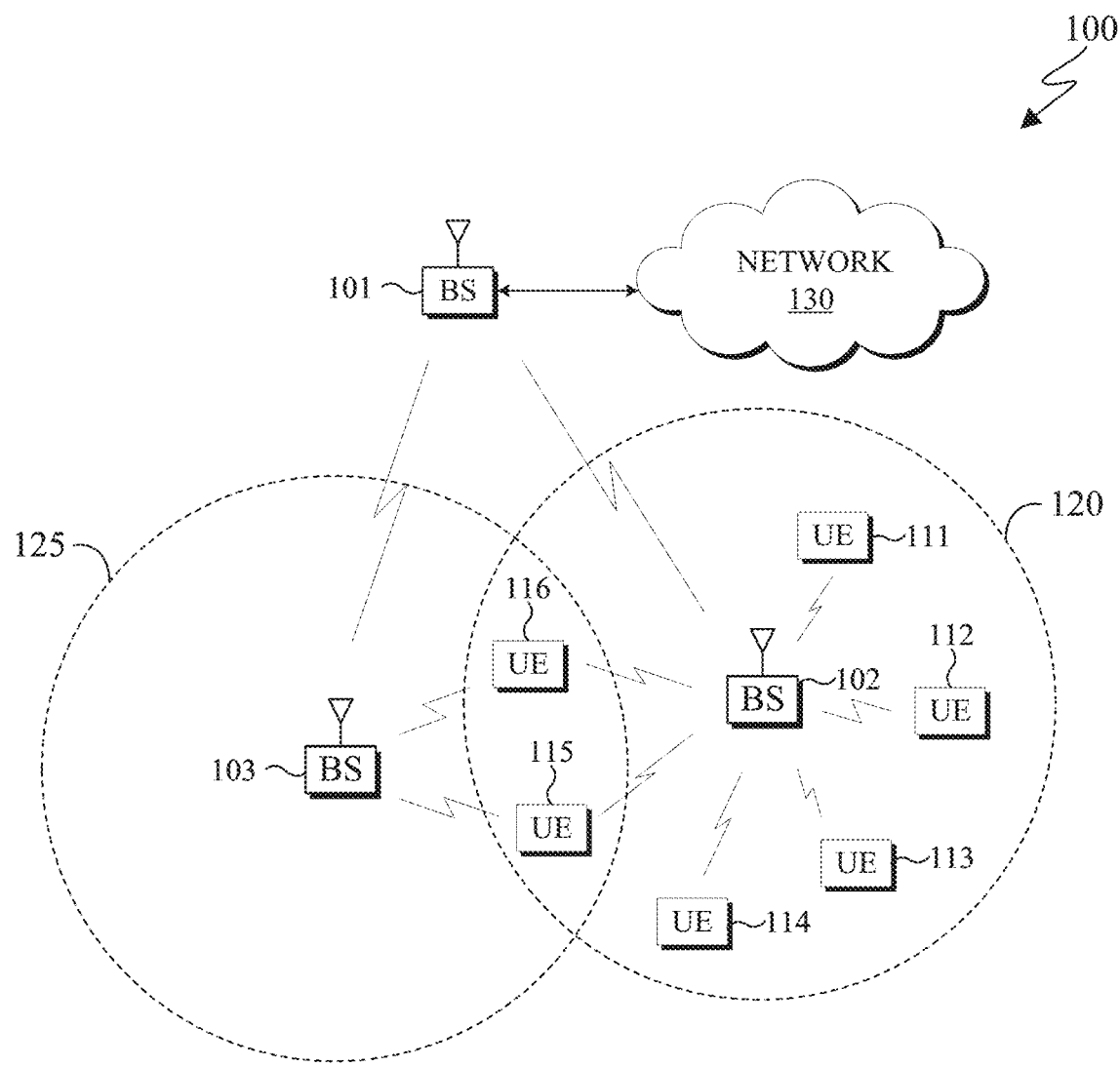
FIG. 1 illustrates an example wireless network according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.1.0, "E-UTRA, Physical channels and modulation" (herein "REF 1"); 3GPP TS 36.212 v17.1.0, "E-UTRA, Multiplexing and Channel coding" (herein "REF 2"); 3GPP TS 36.213 v17.1.0, "E-UTRA, Physical Layer Procedures" (herein "REF 3"); 3GPP TS 36.321 v17.1.0, "E-UTRA, Medium Access Control (MAC) protocol specification" (herein "REF 4"); 3GPP TS 36.331 v17.1.0, "E-UTRA, Radio Resource Control (RRC) protocol specification" (herein "REF 5"); 3GPP TS 38.211 v17.1.0, "NR, Physical channels and modulation" (herein "REF 6"); 3GPP TS 38.212 v17.1.0, "NR, Multiplexing and Channel coding" (herein "REF 7"); 3GPP TS 38.213 v17.1.0, "NR, Physical Layer Procedures for Control" (herein "REF 8"); 3GPP TS 38.214 v17.1.0, "NR, Physical Layer Procedures for Data" (herein "REF 39"); 3GPP TS 38.215 v17.1.0, "NR, Physical Layer Measurements" (herein "REF 10"); 3GPP TS 38.321 v17.1.0, "NR, Medium Access Control (MAC) protocol specification" (herein "REF 11"); 3GPP TS 38.331 v17.1.0, "NR, Radio Resource Control (RRC) Protocol Specification (herein REF 12)".

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
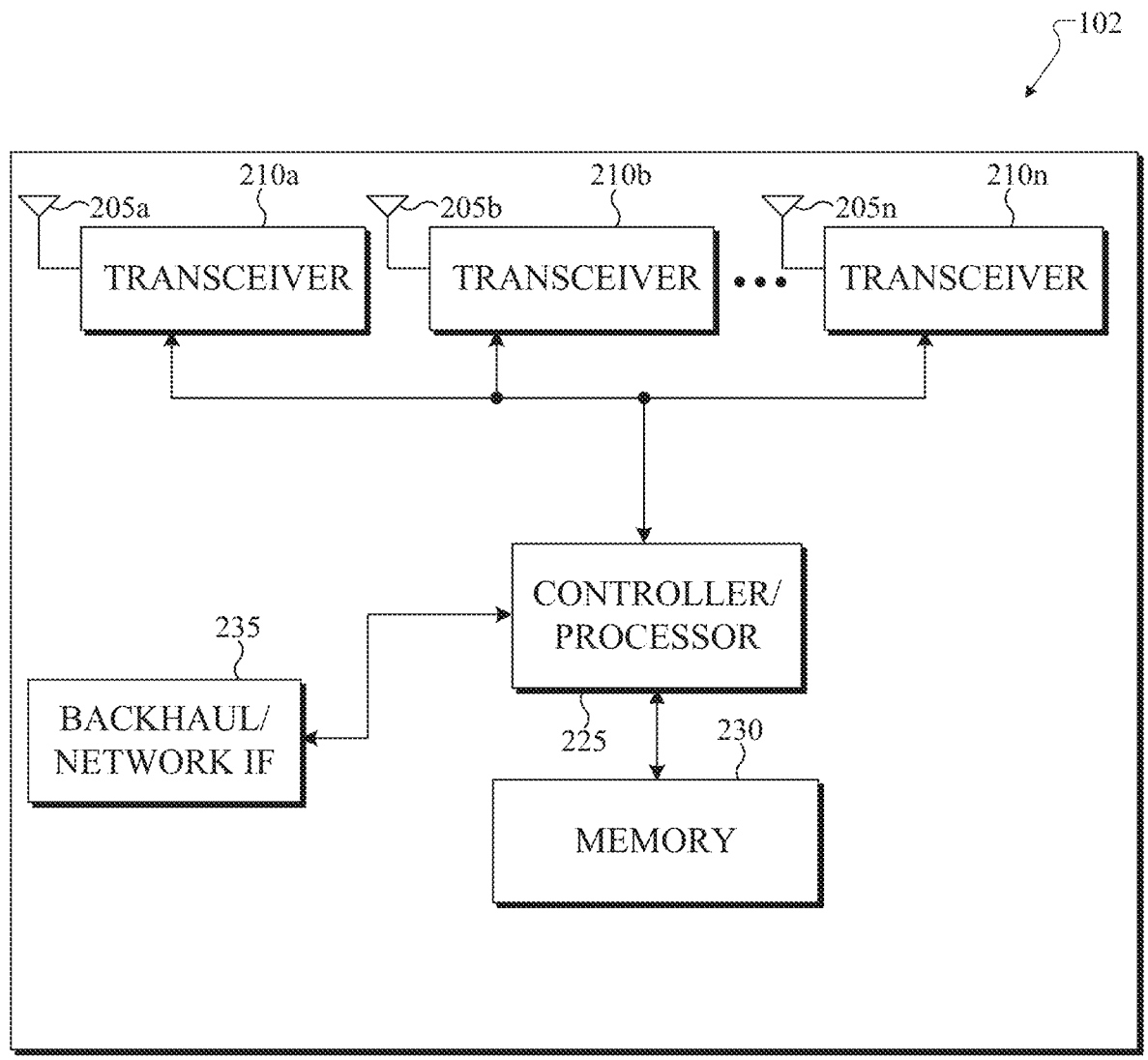
FIG. 2 illustrates an example gNodeB (gNB) according to embodiments of the present disclosure.
Figure 3:
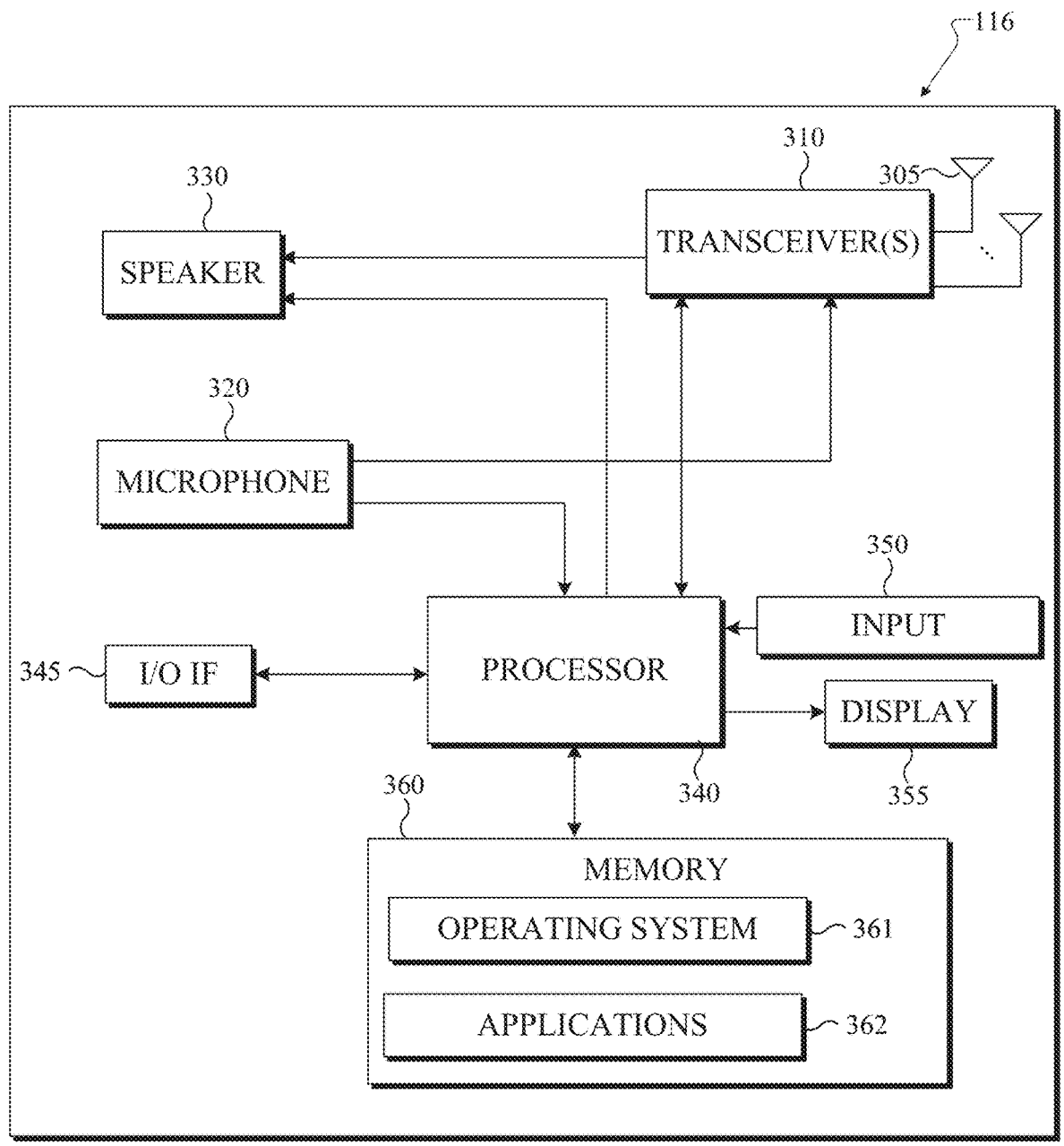
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103.

The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNB s 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing a configured UL codebook. In certain embodiments, one or more of the BS s 101-103 include circuitry, programing, or a combination thereof to support configuration of an UL codebook.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods to support configuring UL codebook. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for utilizing a configured UL codebook. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
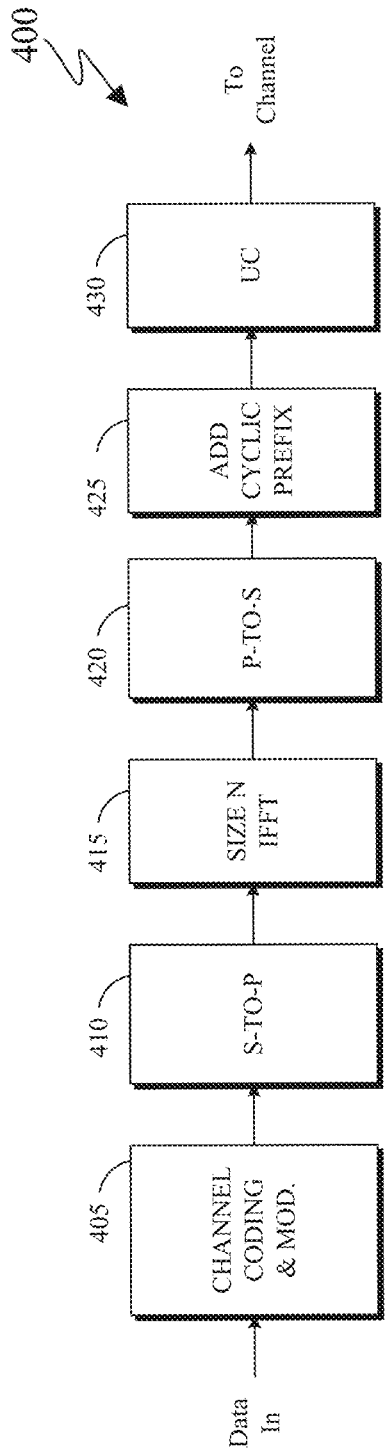
FIGS. 4 and 5 illustrate example wireless transmit and receive paths according to embodiments of the present disclosure.
Figure 5:
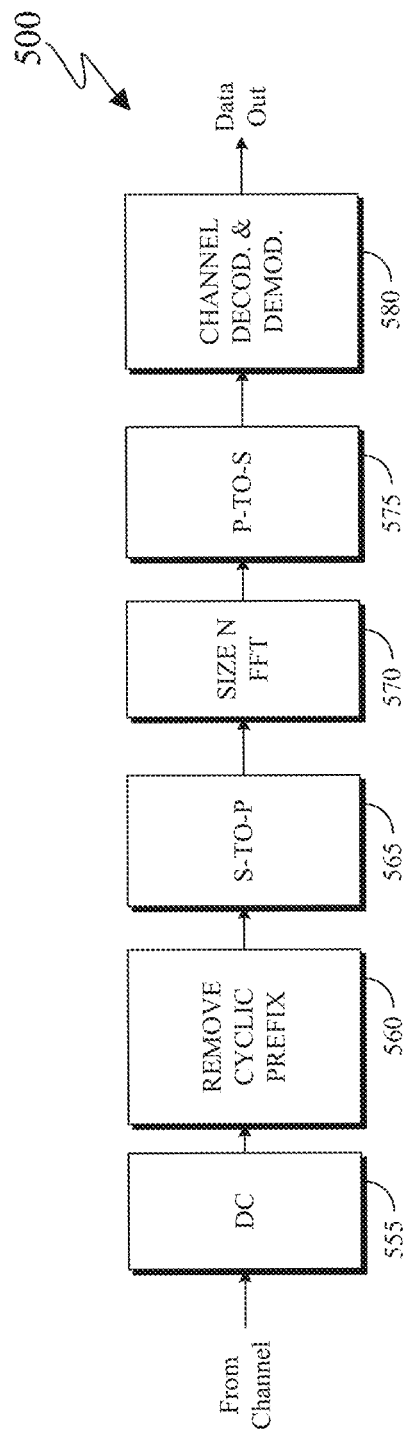

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support configuring uplink codebook as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The 3GPP NR specification supports up to 32 CSI-RS antenna ports which enable an eNB (or gNB) to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase. For UL transmission, the 3GPP specification supports 1, 2, or 4 SRS antenna ports in one SRS resource, where each SRS antenna port can be mapped to one or multiple antenna elements at the UE.

Figure 6:
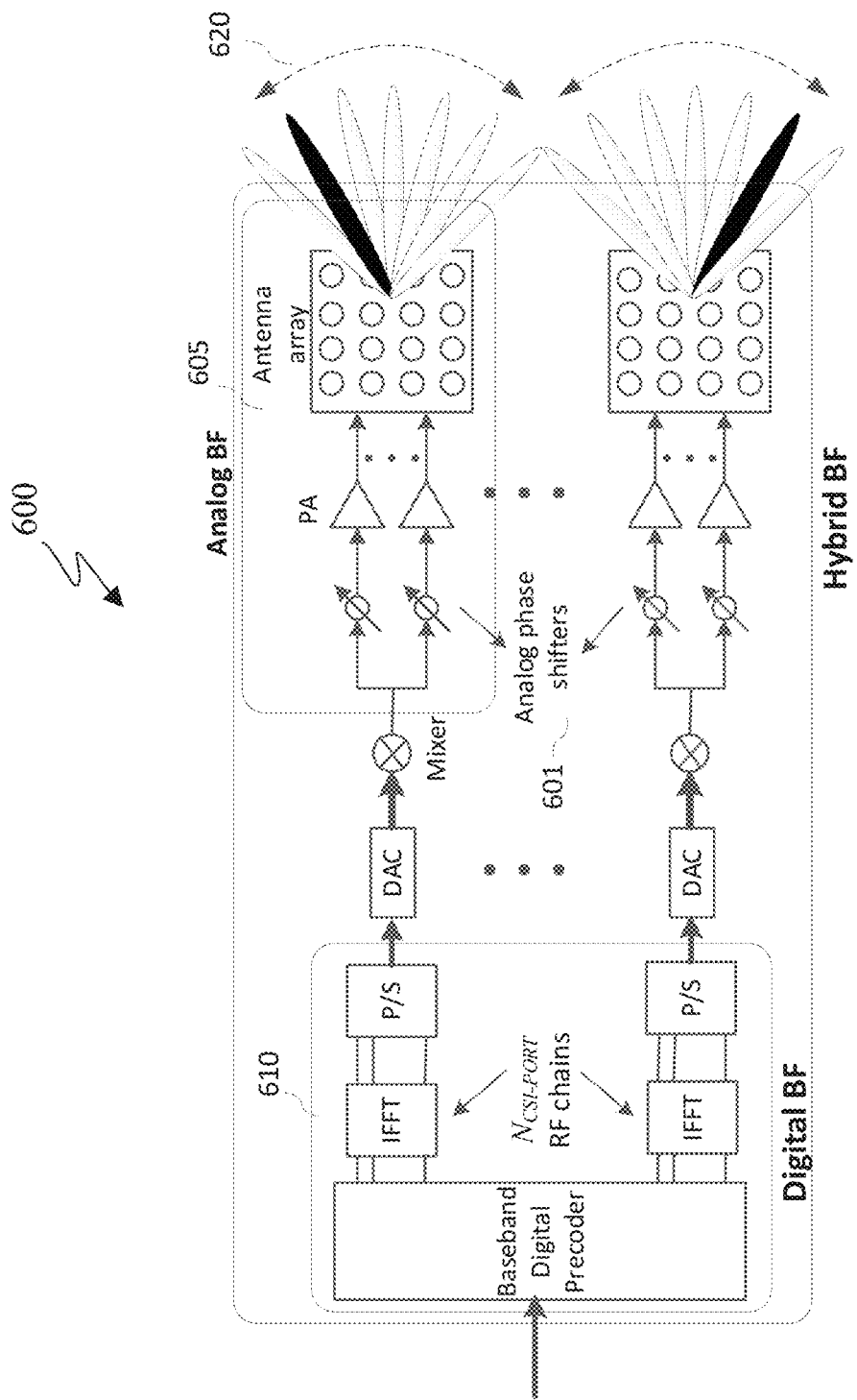
FIG. 6 illustrates an example antenna blocks or arrays forming beams according to embodiments of the present disclosure.

FIG. 6 illustrates an example antenna blocks or arrays 600 according to embodiments of the present disclosure. The embodiment of the antenna blocks or arrays 600 illustrated in FIG. 6 is for illustration only. FIG. 6 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI\_PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

Embodiments of the present disclosure recognize and take into consideration that, in NR, two transmission schemes are supported for PUSCH: codebook based transmission and non-codebook based transmission. The UE is configured with codebook based transmission when the higher layer parameter txConfig in pusch-Config is set to 'codebook', the UE is configured non-codebook based transmission when the higher layer parameter txConfig is set to 'nonCodebook'.

According to Section 6.1.1.1 [REFS], the following is supported for codebook based UL transmission.

For codebook-based transmission, PUSCH can be scheduled by DCI format 0_0, DCI format 0_1, DCI format 0_2 or semi-statically configured to operate according to Clause 6.1.2.3 [REFS]. If this PUSCH is scheduled by DCI format 0_1, DCI format 0_2, or semi-statically configured to operate according to Clause 6.1.2.3 [REFS], the UE determines its PUSCH transmission precoder based on SRI, TPMI and the transmission rank, where the SRI, TPMI and the transmission rank are given by DCI fields of SRS resource indicator and Precoding information and number of layers in clause 7.3.1.1.2 and 7.3.1.1.3 of [5, REF] for DCI format 0_1 and 0_2 or given by srs-ResourceIndicator and precodingAndNumberOfLayers according to clause 6.1.2.3. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. Only one SRS resource set can be configured in srs-ResourceSetToAddModList with higher layer parameter usage in SRS-ResourceSet set to 'codebook', and only one SRS resource set can be configured in srs-ResourceSetToAddModListDCI-0-2 with higher layer parameter usage in SRS-ResourceSet set to 'codebook'. The TPMI is used to indicate the precoder to be applied over the layers $\{0 \ldots v-1\}$ and that corresponds to the SRS resource selected by the SRI when multiple SRS resources are configured, or if a single SRS resource is configured TPMI is used to indicate the precoder to be applied over the layers $\{0 \ldots v-1\}$ and that corresponds to the SRS resource. The transmission precoder is selected from the uplink codebook that has a number of antenna ports equal to higher layer parameter nrofSRS-Ports in SRS-Config, as defined in Clause 6.3.1.5 of [4, TS 38.211]. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI.

For codebook based transmission, the UE determines its codebook subsets based on TPMI and upon the reception of higher layer parameter codebookSubset in pusch-Config for PUSCH associated with DCI format 0_1 and codebookSubsetDCI-0-2 in pusch-Config for PUSCH associated with DCI format 0_2 which may be configured with 'fullyAndPartialAndNonCoherent', or 'partialAndNonCoherent', or 'nonCoherent' depending on the UE capability. When higher layer parameter ul-FullPowerTransmission is set to 'fullpowerMode2' and the higher layer parameter codebookSubset or the higher layer parameter codebookSubsetForDCI-Format0-2 is set to 'partialAndNonCoherent', and when the SRS-resourceSet with usage set to "codebook" includes at least one SRS resource with 4 ports and one SRS resource with 2 ports, the codebookSubset associated with the 2-port SRS resource is 'nonCoherent'. The maximum transmission rank may be configured by the higher layer parameter maxRank in pusch-Config for PUSCH scheduled with DCI format 0_1 and maxRank-ForDCIFormat0_2 for PUSCH scheduled with DCI format 0_2.

A UE reporting its UE capability of 'partialAndNonCoherent' transmission shall not expect to be configured by either codebookSubset or codebookSubsetForDCI-Format0-2 with 'fullyAndPartialAndNonCoherent'.

A UE reporting its UE capability of 'nonCoherent' transmission shall not expect to be configured by either codebookSubset or codebookSubsetForDCI-Format0-2 with 'fullyAndPartialAndNonCoherent' or with 'partialAndNonCoherent'.

A UE shall not expect to be configured with the higher layer parameter codebookSubset or the higher layer parameter codebookSubsetForDCI-Format0-2 set to 'partialAndNonCoherent' when higher layer parameter nrofSRS-Ports in an SRS-ResourceSet with usage set to 'codebook' indicates that the maximum number of the configured SRS antenna ports in the SRS-ResourceSet is two.

For codebook-based transmission, only one SRS resource can be indicated based on the SRI from within the SRS resource set. Except when higher layer parameter ul-FullPowerTransmission is set to 'fullpowerMode2', the maximum number of configured SRS resources for codebook-based transmission is 2. If aperiodic SRS is configured for a UE, the SRS request field in DCI triggers the transmission of aperiodic SRS resources.

A UE shall not expect to be configured with higher layer parameter ul-FullPowerTransmission set to 'fullpowerMode1' and codebookSubset or codebookSubsetDCI-0-2 set to 'fullAndPartialAndNonCoherent' simultaneously.

The UE shall transmit PUSCH using the same antenna port(s) as the SRS port(s) in the SRS resource indicated by the DCI format 0_1 or 0_2 or by configuredGrantConfig according to clause 6.1.2.3.

The DM-RS antenna ports $\{\tilde{p}_0, \ldots, \tilde{p}_{v-1}\}$ in Clause 6.4.1.1.3 of [4, TS38.211] are determined according to the ordering of DM-RS port(s) given by Tables 7.3.1.1.2-6 to 7.3.1.1.2-23 in Clause 7.3.1.1.2 of [5, TS 38.212].

Except when higher layer parameter ul-FullPowerTransmission is set to 'fullpowerMode2', when multiple SRS resources are configured by SRS-ResourceSet with usage set to 'codebook', the UE shall expect that higher layer parameters nrofSRS-Ports in SRS-Resource in SRS-ResourceSet shall be configured with the same value for all these SRS resources.

In the rest of the disclosure, fullAndPartialAndNonCoherent 'partialAndNonCoherent', and 'Non-Coherent' are referred to codebookSubsets depending on three coherence type/capability, where the term 'coherence' implies all or a subset of antenna ports at the UE that can be used to transmit a layer coherently. In particular, the term 'full-coherence' (FC) implies all antenna ports at the UE that can be used to transmit a layer coherently.

the term 'partial-coherence' (PC) implies a subset (at least two but less than all) of antenna ports at the UE that can be used to transmit a layer coherently.

the term 'non-coherence' (NC) implies only one antenna port at the UE that can be used to transmit a layer.

When the UE is configured with codebookSubset='fullAndPartialAndNonCoherent', the UL codebook includes all three types (FC, PC, NC) of precoding matrices; when the UE is configured with codebookSubset='partialAndNonCoherent', the UL codebook includes two types (PC, NC) of precoding matrices; and when the UE is configured with codebookSubset='nonCoherent', the UL codebook includes only one type (NC) of precoding matrices.

According to Section 6.3.1.5 of REFI, for non-codebook-based UL transmission, the precoding matrix W equals the identity matrix. For codebook-based UL transmission, the precoding matrix W is given by W=1 for single-layer transmission on a single antenna port, otherwise by Table 1 to Table 6, which are copied below.

The rank (or number of layers) and the corresponding precoding matrix Ware indicated to the UE using TRI and TPMI, respectively. In one example, this indication is joint via a field 'Precoding information and number of layers' in DCI, e.g., using DCI format 0_1. In another example, this indication is via higher layer RRC signaling. In one example, the mapping between a field 'Precoding information and number of layers and TRI/TPMI is according to Section 7.3.1.1.2 of [REF 10].

TABLE 1

Precoding matrix W for single-layer transmission using two antenna ports.

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

TABLE 2

Precoding matrix W for single-layer transmission using four antenna ports with transform precoding disabled.

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 3

Precoding matrix W for two-layer transmission using two antenna ports with transform precoding disabled.

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

TABLE 4

Precoding matrix W for two-layer transmission using four antenna ports with transform precoding disabled.

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |

TABLE 4-continued

Precoding matrix W for two-layer transmission using four antenna ports with transform precoding disabled.

| TPMI index | W (ordered from left to right in increasing order of TPMI index) | | | |
|---|---|---|---|---|
| 8-11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12-15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

TABLE 5

Precoding matrix W for three-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE 6

Precoding matrix W for four-layer transmission using four antenna ports with transform precoding disabled.

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

The subset of TPMI indices for the three coherence types are summarized in Table 7 and Table 8, where rank=r corresponds to (and is equivalent to) r layers.

TABLE 7

Total power of precoding matrix W for 2 antenna ports

| | Non-Coherent (NC) TPMIs | | Full-Coherent (FC) TPMIs | |
|---|---|---|---|---|
| Rank | TPMI indices | Total power | TPMI indices | Total power |
| 1 | 0-1 | ½ | 2-5 | 1 |
| 2 | 0 | 1 | 1-2 | 1 |

TABLE 8

Total power of precoding matrix W for 4 antenna ports

| | Non-Coherent (NC) TPMIs | | Partial-Coherent (PC) TPMIs | | Full-Coherent (FC) TPMIs | |
|---|---|---|---|---|---|---|
| Rank | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |
| 3 | 0 | ¾ | 1-2 | 1 | 3-6 | 1 |
| 4 | 0 | 1 | 1-2 | 1 | 3-4 | 1 |

The corresponding supported codebookSubsets are summarized in Table 9 and Table 10.

TABLE 9

TPMI indices for codebookSubsets for 2 antenna ports

| Rank | Non-Coherent | fullAndPartialAndNonCoherent |
|---|---|---|
| 1 | 0-1 | 0-5 |
| 2 | 0 | 0-2 |

TABLE 10

TPMI indices for codebookSubsets for 4 antenna ports

| Rank | Non-Coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

In up to Rel. 17 NR, for UL transmission, the 3GPP specification supports 1, 2, or 4 SRS antenna ports in one SRS resource. In more advanced UL MIMO systems (e.g., in Rel. 18 and beyond), the number of SRS antenna ports can be more than 4, e.g., 6, 8, or even 12, and 16, especially for devices such as CPE, FWA, and vehicular UEs. The UL transmission for such devices requires enhancements, e.g., antenna port group selection and codebook for the selected antenna ports, and related signaling for efficient UL MIMO operations. The present disclosure provides example embodiments for potential enhancements. The scope of the present disclosure is not limited to only these embodiments but includes any extensions or combinations of the proposed embodiments.

Accordingly, various embodiments of the present disclosure provide codebook-based UL transmission for >=4 antenna ports. an UL codebook. In various embodiments, an UL codebook for >=4 (e.g., 6, 8, 12, 16) antenna ports is provided. In various embodiments, codebook subsets are provided depending on coherence types (full-coherent, partial-coherent, non-coherent). In various embodiments, TPMI signaling design is provided.

In one example, the present disclosure assumes all antenna ports of the UE belong to a single antenna panel (i.e., they are co-located, for example, at one plane, side, or edge of the UE). We further assume that $N_1$ and $N_2$ are the number of antenna ports with the same polarization in the first and second dimensions, respectively. For 2D antenna port layouts, we have $N_1>1$, $N_2>1$, and for 1D antenna port layouts, we either have $N_1>1$ and $N_2=1$ or $N_2>1$ and $N_1=1$. In the rest of the disclosure, 1D antenna port layouts with $N_1>1$ and $N_2=1$ is considered. The disclosure, however, is applicable to the other 1D port layouts with $N_2>1$ and $N_1=1$. Also, in the rest of the disclosure, we assume that $N_1>N_2$. The disclosure, however, is applicable to the case when $N_1<N_2$, and the embodiments for $N_1>N_2$ applies to the case $N_1<N_2$ by swapping/switching ($N_1$, $N_2$) with ($N_2$, $N_1$). For a (single-polarized) co-polarized antenna port layout, the total number of antenna ports is $N_1N_2$ and for a dual-polarized antenna port layout, the total number of antenna ports is $2N_1N_2$. An illustration of antenna port layouts for {2, 4, 6, 8, 12} antenna ports at UE is shown in Table 11.

Figure 7:
FIG. 7 illustrates an example antenna port layout according to embodiments of the present disclosure.

FIG. 7 illustrates an example antenna port layout 700 according to embodiments of the present disclosure. The embodiment of the antenna port layout 700 illustrated in FIG. 7 is for illustration only. FIG. 7 does not limit the scope of this disclosure to any particular implementation of the antenna port layout 700.

Let s denote the number of antenna polarizations (or groups of antenna ports with the same polarization). Then, for co-polarized antenna ports, s=1, and for dual- or cross (X)-polarized antenna ports s=2. So, the total number of antenna ports $P=sN_1N_2$. In one example, the antenna ports at the UE refers to SRS antenna ports (either in one SRS resource or across multiple SRS resources).

In one embodiment, the UL codebook W for P antenna ports at the UE is based on precoding vectors which are according to one of the two alternatives in Table 11 depending on whether the antenna ports are co-polarized or cross-/dual-polarized.

TABLE 11

| Pre-coding vectors | |
|---|---|
| Co-pol | Dual-pol |
| $v_{l,m} = \dfrac{v_{l,m}}{\sqrt{N_1N_2}}$ | $v_{l,m,n} = \dfrac{1}{\sqrt{2N_1N_2}}\begin{bmatrix} v_{l,m} \\ \varphi_n v_{l,m} \end{bmatrix}$ |

Here, $v_{l,m}$ is a Kronecker product ($\otimes$) of vectors $w_l$ and $u_m$ of lengths $N_1$ and $N_2$, respectively. In one example, $w_l$ and $u_m$ are oversampled DFT vectors, i.e., $$w_l = \begin{bmatrix} 1 & e^{j\frac{2\pi l}{O_1 N_1}} & e^{j\frac{4\pi l}{O_1 N_1}} & \cdots & e^{j\frac{2\pi l(N_1-1)}{O_1 N_1}} \end{bmatrix}^T$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

where $O_1$ and $O_2$ are oversampling factors in two dimensions, and $v_{l,m}$ is then given by $$v_{l,m} = w_l \otimes u_m = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

In one example, both $O_1, O_2 \in \{2, 4, 8\}$. In one example, $O_1$ and $O_2$ can take the same values as Rel.15 NR Type I codebook (cf. 5.2.2.2.1, TS 38.214), i.e., $(O_1, O_2)=(4,4)$ when $N_2>1$, and, i.e., $(O_1, O_2)=(4,1)$ when $N_2=1$. Alternatively, they take different values from the Rel. 15 Type I NR codebook, for example, $(O_1, O_2)=(2,2)$ when $N_2>1$, and, i.e., $(O_1, O_2)=(2,1)$ when $N_2=1$. In one example, $O_1$ and $O_2$ is configurable (e.g., via higher layer).

The quantity pn is a co-phase for dual-polarized antenna port layouts. In one example, $\varphi_n=e^{j\pi n/2}$, where $n \in \{0, 1, 2, 3\}$ implying that $\varphi_n$ belongs to QPSK alphabet $\{1, j, -1, -j\}$.

In one example, the values of $N_1$ and $N_2$ are configured, e.g., with the higher layer parameter n1-n2-ul. The supported configurations of $(N_1, N_2)$ for a given number of antenna ports (P) is given in Table 12.

TABLE 12

Configurations of $(N_1, N_2)$

| Number of antenna ports, P | Dual-pol $(N_1, N_2)$ | Co-pol $(N_1, N_2)$ |
|---|---|---|
| 2 | (1, 1) | (2, 1) |
| 4 | (2, 1) | (2, 2), (4, 1) |
| 6 | (3, 1) | (3, 2), (6, 1) |
| 8 | (2, 2), (4, 1) | (4, 2), (8, 1) |
| 12 | (3, 2), (6, 1) | (4, 3), (6, 2), (12, 1) |
| 16 | (4, 2), (8, 1) | (8, 2), (4, 4), (16, 1) |

In one example, the values of $N_1$ and $N_2$ are fixed for a given number of antenna ports. For example, $(N_1, N_2)=(P, 1)$ for co-pol and $(P/2, 1)$ for dual-pol antenna. In one example, only one $(N_1, N_2)$ is supported for each value of P, where the supported $(N_1, N_2)$ is one of pairs in Table 12.

The dual-polarized antenna layout is assumed in the rest of the disclosure. The number of antenna ports is assumed to be P=8 in the rest of the disclosure.

In one example, P antenna ports can be divided into multiple groups. Let $N_g$ be the number of antenna port groups. When each group comprises the same number of antenna ports, then each groups has the antenna layout with $(N_1, N_2)$ value as shown in Table 13.

TABLE 13

| $N_g$ | $(N_1, N_2)$ |
|---|---|
| 1 | (4, 1), (2, 2) |
| 2 | (2, 1) |

TABLE 13-continued

| $N_g$ | $(N_1, N_2)$ |
|---|---|
| 4 | (1, 1) |
| 8 | Not applicable |

In one example, $N_g=1$ corresponds to a single antenna panel. In one example, $N_g=1$ corresponds to a full coherent (FC) UE or FC antenna layout.

In one example, $N_g=2$ corresponds to two antenna panels. In one example, $N_g=2$ corresponds to a partial coherent (PC) UE or PC antenna layout.

In one example, $N_g=4$ corresponds to four antenna panels. In one example, $N_g=4$ corresponds to a partial coherent (PC) UE or PC antenna layout.

In one example, $N_g=8$ corresponds to eight antenna panels. In one example, $N_g=8$ corresponds to a non-coherent (NC) UE or NC antenna layout.

In one embodiment, the UL codebook includes full-coherent (FC) precoding matrices, and a FC precoding matrix can be defined as a matrix with all non-zero elements/entries. Similar to Rel. 15 UL codebook for 4 antenna ports, the UL codebook for >4 antenna ports (e.g., 8 antenna ports) either includes precoding matrices from the DL Type I codebook, or are based on the DL Type I codebook framework.

In one example, the included FC precoding matrices are determined using the same values of $(i_{1,1}, i_{1,2})$ for a subset of supported rank values, and can change from one subset of rank values to another subset of rank values.

For example, when a first subset of rank values is $\{1, 2\}$, the supported values of $(i_{1,1}, i_{1,2})$ can be from a set S1.

For example, when a first subset of rank values is $\{3, 4\}$, the supported values of $(i_{1,1}, i_{1,2})$ can be from a set S2.

For example, when a first subset of rank values is $\{5, 6\}$, the supported values of $(i_{1,1}, i_{1,2})$ can be from a set S3.

For example, when a first subset of rank values is $\{7, 8\}$, the supported values of $(i_{1,1}, i_{1,2})$ can be from a set S4.

In one example, S1, ..., S4 are different (cf. Table 14). In one example, S1, ..., S3 are different, and S3=S4 (cf. Table 15).

TABLE 14

FC precoding matrices based on DL Type I codebook indices

| | 8 ports: $(N_1, N_2) = (4, 1)$ | | 8 ports: $(N_1, N_2) = (2, 2)$ | | |
|---|---|---|---|---|---|
| Rank | $O_1$ | $i_{1,1}$ | $(O_1, O_2)$ | $i_{1,1}$ | $i_{1,2}$ |
| 1 | 1 | 0, 1, 2, 3 | (2, 2) | 0, 1, 2, 3 | 0, 1, 2, 3 |
| 2 | 1 | 0, 1, 2, 3 | (2, 2) | 0, 1, 2, 3 | 0, 1, 2, 3 |
| 3 | 1 | 0, 1, 2 | (2, 2) | 0, 1, 2 | 0, 1, 2 |
| 4 | 1 | 0, 1, 2 | (2, 2) | 0, 1, 2 | 0, 1, 2 |
| 5 | 1 | 0, 2 or 0, 1 | (2, 2) | 0, 2 or 0, 1 | 0, 2 or 0, 1 |
| 6 | 1 | 0, 2 or 0, 1 | (2, 2) | 0, 2 or 0, 1 | 0, 2 or 0, 1 |
| 7 | 1 | 0 | (2, 2) | 0 | 0 |
| 8 | 1 | 0 | (2, 2) | 0 | 0 |

TABLE 15

FC precoding matrices based on DL Type I codebook indices

| | 8 ports: $(N_1, N_2) = (4, 1)$ | | 8 ports: $(N_1, N_2) = (2, 2)$ | | |
|---|---|---|---|---|---|
| Rank | $O_1$ | $i_{1,1}$ | $(O_1, O_2)$ | $i_{1,1}$ | $i_{1,2}$ |
| 1 | 1 | 0, 1, 2, 3 | (2, 2) | 0, 1, 2, 3 | 0, 1, 2, 3 |
| 2 | 1 | 0, 1, 2, 3 | (2, 2) | 0, 1, 2, 3 | 0, 1, 2, 3 |
| 3 | 1 | 0, 2 or 0, 1 | (2, 2) | 0, 2 or 0, 1 | 0, 2 or 0, 1 |
| 4 | 1 | 0, 2 or 0, 1 | (2, 2) | 0, 2 or 0, 1 | 0, 2 or 0, 1 |

TABLE 15-continued

FC precoding matrices based on DL Type I codebook indices

| | 8 ports: $(N_1, N_2) = (4, 1)$ | | 8 ports: $(N_1, N_2) = (2, 2)$ | | |
|---|---|---|---|---|---|
| Rank | $O_1$ | $i_{1,1}$ | $(O_1, O_2)$ | $i_{1,1}$ | $i_{1,2}$ |
| 5 | 1 | 0 | (2, 2) | 0 | 0 |
| 6 | 1 | 0 | (2, 2) | 0 | 0 |
| 7 | 1 | 0 | (2, 2) | 0 | 0 |
| 8 | 1 | 0 | (2, 2) | 0 | 0 |

In one example, the included FC precoding matrices are determined based on the values of $(i_{1,1}, i_{1,2})$, where $i_{1,1} \in \{0, 1, \ldots, O_1 N_1 - 1\}$ and $i_{1,2} \in \{0, 1, \ldots, O_2 N_2 - 1\}$, where only one, e.g., $(O_1, O_2) = (1,1)$, or multiple $(O_1, O_2)$ are supported.

In one example, one of the supported $(O_1, O_2)$ is configured to the UE, e.g., via RRC, or indicated via MAC CE, or via DCI (e.g., UL-DCI).

In one example, the UE via its capability reporting reports one or multiple values of $(O_1, O_2)$ that it can support, and the UE then can be configured with one $(O_1, O_2)$ value subject to the UE capability reporting. In one example, the UE may not support $(O_1, O_2)$ such that the codebook comprises 8PSK or 16PSK entries, i.e., can only support $(O_1, O_2)$ such that the codebook comprises QPSK or BSK entries.

In one example, when $(O_1, O_2) = (1,1)$, the UL codebook for 8 antenna ports includes FC precoders based on the Rel. 15 Type I single panel codebook with codebookMode=1. The corresponding indices $\{i_{1,1}, i_{1,2}, i_{1,3}, i_{12}\}$ are tabulated in Table 16. In one example, the codebook is subsampled, thereby includes only a subset of Rel. 15 Type I precoders as FC precoders in 8Tx UL codebook. For instance, the subsampling factor can be N=1 for rank 1-2, and N>1 for rank>2. An example of the subsampling is shown in Table 17, wherein $(i_{1,1}, i_{1,2})$: subsampling for rank>4

$i_{1,3}$ (rank 2-4): $i_{1,3}=0$.

$i_2$: no subsampling

TABLE 16

All possible FC precoding matrices based on DL Type I codebook indices

| | $(N_1, N_2) = (4, 1)$ | | | | | $(N_1, N_2) = (2, 2)$ | | | | | |
|---|---|---|---|---|---|---|---|---|---|---|---|
| Rank | $O_1$ | $i_{1,1}$ | $i_{1,2}$ | $i_{1,3}$ | $i_2$ | Total | $(O_1, O_2)$ | $i_{1,1}$ | $i_{1,2}$ | $i_{1,3}$ | $i_2$ | Total |
| 1 | 1 | 0, 1, 2, 3 | 0 | | 0, 1, 2, 3 | 16 | (1, 1) | 0, 1 | 0, 1 | | 0, 1, 2, 3 | 16 |
| 2 | 1 | 0, 1, 2, 3 | 0 | 0, 1, 2, 3 | 0, 1 | 32 | (1, 1) | 0, 1 | 0, 1 | 0, 1, 2, 3 | 0, 1 | 32 |
| 3 | 1 | 0, 1, 2, 3 | 0 | 0, 1, 2 | 0, 1 | 24 | (1, 1) | 0, 1 | 0, 1 | 0, 1, 2 | 0, 1 | 24 |
| 4 | 1 | 0, 1, 2, 3 | 0 | 0, 1, 2 | 0, 1 | 24 | (1, 1) | 0, 1 | 0, 1 | 0, 1, 2 | 0, 1 | 24 |
| 5 | 1 | 0, 1, 2, 3 | 0 | | 0, 1 | 8 | (1, 1) | 0, 1 | 0, 1 | | 0, 1 | 8 |
| 6 | 1 | 0, 1, 2, 3 | 0 | | 0, 1 | 8 | (1, 1) | 0, 1 | 0, 1 | | 0, 1 | 8 |
| 7 | 1 | 0, 1 | 0 | | 0, 1 | 4 | (1, 1) | 0, 1 | 0, 1 | | 0, 1 | 8 |
| 8 | 1 | 0, 1 | 0 | | 0, 1 | 4 | (1, 1) | 0, 1 | 0, 1 | | 0, 1 | 8 |
| | | | | | | 120 | | | | | | 128 |

TABLE 17

Subsampled FC precoding matrices based on DL Type I codebook indices

| | $(N_1, N_2) = (4, 1)$ | | | | | $(N_1, N_2) = (2, 2)$ | | | | | |
|---|---|---|---|---|---|---|---|---|---|---|---|
| Rank | $O_1$ | $i_{1,1}$ | $i_{1,2}$ | $i_{1,3}$ | $i_2$ | Total | $(O_1, O_2)$ | $i_{1,1}$ | $i_{1,2}$ | $i_{1,3}$ | $i_2$ | Total |
| 1 | 1 | 0, 1, 2, 3 | 0 | | 0, 1, 2, 3 | 16 | (1, 1) | 0, 1 | 0, 1 | | 0, 1, 2, 3 | 16 |
| 2 | 1 | 0, 1, 2, 3 | 0 | 0 | 0, 1 | 8 | (1, 1) | 0, 1 | 0, 1 | 0 | 0, 1 | 8 |
| 3 | 1 | 0, 1, 2, 3 | 0 | 0 | 0, 1 | 8 | (1, 1) | 0, 1 | 0, 1 | 0 | 0, 1 | 8 |
| 4 | 1 | 0, 1, 2, 3 | 0 | 0 | 0, 1 | 8 | (1, 1) | 0, 1 | 0, 1 | 0 | 0, 1 | 8 |
| 5 | 1 | 0, 1 | 0 | | 0, 1 | 4 | (1, 1) | 0, 1 | 0 | | 0, 1 | 4 |
| 6 | 1 | 0, 1 | 0 | | 0, 1 | 4 | (1, 1) | 0, 1 | 0 | | 0, 1 | 4 |
| 7 | 1 | 0, 1 | 0 | | 0, 1 | 4 | (1, 1) | 0, 1 | 0 | | 0, 1 | 4 |
| 8 | 1 | 0, 1 | 0 | | 0, 1 | 4 | (1, 1) | 0, 1 | 0 | | 0, 1 | 4 |
| | | | | | | 64 | | | | | | 64 |

TABLE 18 codebook for 1-layer (rank 1), $(N_1, N_2) = (4, 1)$

| $(N_1, N_2)$ | $(O_1, O_2)$ | $i_{1,1}$ | $i_{1,2}$ | $i_2$ | TPMI | Precoder |
|---|---|---|---|---|---|---|
| (4, 1) | (1, 1) | 0, ..., 3 | 0 | 0, 1, 2, 3 | 0, 1, ..., 15 | $W_{i_{1,1},0,i_2}^{(1)}$ | where $W_{l,0,n}^{(1)} = \frac{1}{S}\begin{bmatrix} v_{l,0} \\ \varphi_n v_{l,0} \end{bmatrix}$
and S is a scaling/normalization factor, e.g., $S = \sqrt{8} = 2\sqrt{2}$.
$u_m = u_0 = 1$ and $$v_{l,0} = \begin{bmatrix} 1 & e^{j\frac{2\pi l}{4}} & e^{j\frac{4\pi l}{4}} & e^{j\frac{6\pi l}{4}} \end{bmatrix}^T = \begin{bmatrix} 1 & e^{j\frac{\pi l}{2}} & e^{j\frac{2\pi l}{2}} & e^{j\frac{3\pi l}{2}} \end{bmatrix}^T$$

TABLE 19 codebook for 1-layer (rank 1), $(N_1, N_2) = (2, 2)$

| $(N_1, N_2)$ | $(O_1, O_2)$ | $i_{1,1}$ | $i_{1,2}$ | $i_2$ | TPMI | Precoder |
|---|---|---|---|---|---|---|
| (2, 2) | (1, 1) | 0, 1 | 0, 1 | 0, 1, 2, 3 | 0, 1, ..., 15 | $W_{i_{1,1},i_{1,2},i_2}^{(1)}$ | where $W_{l,m,n}^{(1)} = \frac{1}{S}\begin{bmatrix} v_{l,m} \\ \varphi_n v_{l,m} \end{bmatrix}$
and S is a scaling/normalization factor, e.g., $S = \sqrt{8} = 2\sqrt{2}$.
$u_m = [1 \quad e^{j\pi m}]$ and $$v_{l,m} = \begin{bmatrix} u_m & e^{j\pi l} u_m \end{bmatrix}^T = \begin{bmatrix} 1 & e^{j\frac{2\pi m}{2}} & e^{j\frac{2\pi l}{2}} & e^{j\frac{2\pi l}{2}} & e^{j\frac{2\pi m}{2}} \end{bmatrix}^T = \begin{bmatrix} 1 & e^{j\pi m} & e^{j\pi l} & e^{j\pi(l+m)} \end{bmatrix}^T$$

| Mapping of $i_{1,3}$ to $(k_1, k_2)$ for 2-layer | | | | |
|---|---|---|---|---|
| | $N_1 = 2, N_2 = 2$ | | $N_1 = 4, N_2 = 1$ | |
| $i_{1,3}$ | $k_1$ | $k_2$ | $k_1$ | $k_2$ |
| 0 | 0 | 0 | 0 | 0 |
| 1 | $O_1$ | 0 | $O_1$ | 0 |
| 2 | 0 | $O_2$ | $2O_1$ | 0 |
| 3 | $O_1$ | $O_2$ | $3O_1$ | 0 |

TABLE 20 codebook for 2-layer (rank 2), $(N_1, N_2) = (4, 1)$

| $(N_1, N_2)$ | $(O_1, O_2)$ | $i_{1,1}$ | $i_{1,2}$ | $i_{1,3}$ | $i_2$ | TPMI | Precoder |
|---|---|---|---|---|---|---|---|
| (4, 1) | (1, 1) | 0, ..., 3 | 0 | 0, ..., 3 | 0, 1 | Scheme 1: 0,1, ..., 31 or Scheme 2: 16, ..., 47 | $W_{i_{1,1},i_{1,1}+k_1,0,0,i_2}^{(2)}$ | where $W_{l,l',m,m',n}^{(2)} = \frac{1}{S}\begin{bmatrix} v_{l,m} & v_{l',m'} \\ \varphi_n v_{l,m} & -\varphi_n v_{l',m'} \end{bmatrix}$
and S is a scaling/normalization factor, e.g., $S = \sqrt{2 \times 8} = 4$.

TABLE 21 codebook for 2-layer (rank 2), $(N_1, N_2) = (2, 2)$

| $(N_1, N_2)$ | $(O_1, O_2)$ | $i_{1,1}$ | $i_{1,2}$ | $i_{1,3}$ | $i_2$ | TPMI | Precoder |
|---|---|---|---|---|---|---|---|
| (2, 2) | (1, 1) | 0, 1 | 0, 1 | 0, ..., 3 | 0, 1 | Scheme 1: 0, 1, ..., 31 or Scheme 2: 16, ..., 47 | $W_{i_{1,1},i_{1,1}+k_1,i_{1,2},i_{1,2}+k_2,i_2}^{(2)}$ |

$W_{l,l',m,m',n}^{(2)} = \frac{1}{S}\begin{bmatrix} v_{l,m} & v_{l',m'} \\ \varphi_n v_{l,m} & -\varphi_n v_{l',m'} \end{bmatrix}$
and S is a scaling/normalization factor, e.g., $S = \sqrt{2 \times 8} = 4$.

| Mapping of $i_{1,3}$ to $(k_1, k_2)$ for 3-layer and 4-layer | | | | |
|---|---|---|---|---|
| | $N_1 = 4, N_2 = 1$ | | $N_1 = 2, N_2 = 2$ | |
| $i_{1,3}$ | $k_1$ | $k_2$ | $k_1$ | $k_2$ |
| 0 | $O_1$ | 0 | $O_1$ | 0 |
| 1 | $2O_1$ | 0 | 0 | $O_2$ |
| 2 | $3O_1$ | 0 | $O_1$ | $O_2$ |

TABLE 22 codebook for 3-layer (rank 3), $(N_1, N_2) = (4, 1)$

| $(N_1, N_2)$ | $(O_1, O_2)$ | $i_{1,1}$ | $i_{1,2}$ | $i_{1,3}$ | $i_2$ | TPMI | Precoder |
|---|---|---|---|---|---|---|---|
| (4, 1) | (1, 1) | 0, ..., 3 | 0 | 0, 1, 2 | 0, 1 | Scheme 1: 0, 1, ..., 23 or Scheme 2: 48, ..., 71 | $W_{i_{1,1},i_{1,1}+k_1,0,0,i_2}^{(3)}$ |

$$W_{l,l',m,m',n}^{(3)} = \frac{1}{S}\begin{bmatrix} v_{l,m} & v_{l',m'} & v_{l,m} \\ \varphi_n v_{l,m} & \varphi_n v_{l',m'} & -\varphi_n v_{l,m} \end{bmatrix}$$

and S is a scaling/normalization factor, e.g., $S = \sqrt{3 \times 8} = 2\sqrt{6}$.

TABLE 23 codebook for 3-layer (rank 3), $(N_1, N_2) = (2, 2)$

| $(N_1, N_2)$ | $(O_1, O_2)$ | $i_{1,1}$ | $i_{1,2}$ | $i_{1,3}$ | $i_2$ | TPMI | Precoder |
|---|---|---|---|---|---|---|---|
| (2, 2) | (1, 1) | 0, 1 | 0, 1 | 0, 1, 2 | 0, 1 | Scheme 1: 0, 1, ..., 23 or Scheme 2: 48, ..., 71 | $W_{i_{1,1},i_{1,1}+k_1,i_{1,2},i_{1,2}+k_2,i_2}^{(3)}$ |

$$W_{l,l',m,m',n}^{(3)} = \frac{1}{S}\begin{bmatrix} v_{l,m} & v_{l',m'} & v_{l,m} \\ \varphi_n v_{l,m} & \varphi_n v_{l',m'} & -\varphi_n v_{l,m} \end{bmatrix}$$

and S is a scaling/normalization factor, e.g., $S = \sqrt{3 \times 8} = 2\sqrt{6}$.

35

TABLE 24 codebook for 4-layer (rank 4), $(N_1, N_2) = (4, 1)$

| $(N_1, N_2)$ | $(O_1, O_2)$ | $i_{1,1}$ | $i_{1,2}$ | $i_{1,3}$ | $i_2$ | TPMI | Precoder |
|---|---|---|---|---|---|---|---|
| (4, 1) | (1, 1) | 0, ..., 3 | 0 | 0, 1, 2 | 0, 1 | Scheme 1: 0, 1, ..., 23 or Scheme 2: 72, ..., 95 | $W_{i_{1,1},i_{1,1}+k_1,0,0,i_2}^{(4)}$ |

$$W_{l,l',m,m',n}^{(4)} = \frac{1}{S}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$$

and S is a scaling/normalization factor, e.g., $S = \sqrt{4 \times 8} = 4\sqrt{2}$.

TABLE 25 codebook for 4-layer (rank 4), $(N_1, N_2) = (2, 2)$

| $(N_1, N_2)$ | $(O_1, O_2)$ | $i_{1,1}$ | $i_{1,2}$ | $i_{1,3}$ | $i_2$ | TPMI | Precoder |
|---|---|---|---|---|---|---|---|
| (2, 2) | (1, 1) | 0, 1 | 0, 1 | 0, 1, 2 | 0, 1 | Scheme 1: 0, 1, ..., 23 or Scheme 2: 72, ..., 95 | $W_{i_{1,1},i_{1,1}+k_1,i_{1,2},i_{1,2}+k_2,i_2}^{(4)}$ |

$$W_{l,l',m,m',n}^{(4)} = \frac{1}{S}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$$

and S is a scaling/normalization factor, e.g., $S = \sqrt{4 \times 8} = 4\sqrt{2}$.

TABLE 26 codebook for 5-layer (rank 5), $(N_1, N_2) = (4, 1)$

| $(N_1, N_2)$ | $(O_1, O_2)$ | $i_{1,1}$ | $i_{1,2}$ | $i_2$ | TPMI | Precoder |
|---|---|---|---|---|---|---|
| (4, 1) | (1, 1) | 0, ..., 3 | 0 | 0, 1 | Scheme 1: 0, 1, ..., 7 or Scheme 2: 96, ..., 103 | $W_{i_{1,1},i_{1,1}+O_1,i_{1,1}+2O_1,0,0,0,i_2}^{(5)}$ |

$$W_{l,l',l'',m,m',m'',n}^{(5)} = \frac{1}{S}\begin{bmatrix} v_{l,m} & v_{l,m} & v_{l',m'} & v_{l',m'} & v_{l'',m''} \\ \varphi_n v_{l,m} & -\varphi_n v_{l,m} & v_{l',m'} & -v_{l',m'} & v_{l'',m''} \end{bmatrix}$$

and S is a scaling/normalization factor, e.g., $S = \sqrt{5 \times 8} = 2\sqrt{10}$.

TABLE 27 codebook for 5-layer (rank 5), $(N_1, N_2) = (2, 2)$

| $(N_1, N_2)$ | $(O_1, O_2)$ | $i_{1,1}$ | $i_{1,2}$ | $i_2$ | TPMI | Precoder |
|---|---|---|---|---|---|---|
| (2, 2) | (1, 1) | 0, 1 | 0, 1 | 0, 1 | Scheme 1: 0, 1, ..., 7 or Scheme 2: 96, ..., 103 | $W_{i_{1,1},i_{1,1}+O_1,i_{1,1}+O_1,i_{1,2},i_{1,2},i_{1,2}+O_2,i_2}^{(5)}$ |

$$W_{l,l',l'',m,m',m'',n}^{(5)} = \frac{1}{S}\begin{bmatrix} v_{l,m} & v_{l,m} & v_{l',m'} & v_{l',m'} & v_{l'',m''} \\ \varphi_n v_{l,m} & -\varphi_n v_{l,m} & v_{l',m'} & -v_{l',m'} & v_{l'',m''} \end{bmatrix}$$

and S is a scaling/normalization factor, e.g., $S = \sqrt{5 \times 8} = 2\sqrt{10}$.

TABLE 28 codebook for 6-layer (rank 6), $(N_1, N_2) = (4, 1)$

| $(N_1, N_2)$ | $(O_1, O_2)$ | $i_{1,1}$ | $i_{1,2}$ | $i_2$ | TPMI | Precoder |
|---|---|---|---|---|---|---|
| (4, 1) | (1, 1) | 0, ..., 3 | 0 | 0, 1 | Scheme 1: 0, 1, ..., 7 or Scheme 2: 104, ..., | $W_{i_{1,1},i_{1,1}+O_1,i_{1,1}+2O_1,0,0,0,i_2}^{(6)}$ |

$$W_{l,l',l'',m,m',m'',n}^{(6)} = \frac{1}{S}\begin{bmatrix} v_{l,m} & v_{l,m} & v_{l',m'} & v_{l',m'} & v_{l'',m''} & v_{l'',m''} \\ \varphi_n v_{l,m} & -\varphi_n v_{l,m} & \varphi_n v_{l',m'} & -\varphi_n v_{l',m'} & v_{l'',m''} & -v_{l'',m''} \end{bmatrix}$$

and S is a scaling/normalization factor, e.g., $S = \sqrt{6 \times 8} = 4\sqrt{3}$.

TABLE 29 codebook for 6-layer (rank 6), $(N_1, N_2) = (2, 2)$

| $(N_1, N_2)$ | $(O_1, O_2)$ | $i_{1,1}$ | $i_{1,2}$ | $i_2$ | TPMI | Precoder |
|---|---|---|---|---|---|---|
| (2, 2) | (1, 1) | 0, 1 | 0, 1 | 0, 1 | Scheme 1: 0, 1, ..., 7 or Scheme 2: 104, ..., 111 | $W_{i_{1,1},i_{1,1}+O_1,i_{1,1}+O_1,i_{1,2},i_{1,2},i_{1,2}+O_2,i_2}^{(6)}$ |

$$W_{l,l',l'',m,m',m'',n}^{(6)} = \frac{1}{S}\begin{bmatrix} v_{l,m} & v_{l,m} & v_{l',m'} & v_{l',m'} & v_{l'',m''} & v_{l'',m''} \\ \varphi_n v_{l,m} & -\varphi_n v_{l,m} & \varphi_n v_{l',m'} & -\varphi_n v_{l',m'} & v_{l'',m''} & -v_{l'',m''} \end{bmatrix}$$

and S is a scaling/normalization factor, e.g., $S = \sqrt{6 \times 8} = 4\sqrt{3}$.

TABLE 30 codebook for 7-layer (rank 7), $(N_1, N_2) = (4, 1)$

| $(N_1, N_2)$ | $(O_1, O_2)$ | $i_{1,1}$ | $i_{1,2}$ | $i_2$ | TPMI | Precoder |
|---|---|---|---|---|---|---|
| (4, 1) | (1, 1) | 0, 1 | 0 | 0, 1 | Scheme 1: 0, 1, ..., 3 or Scheme 2: 112, ..., 115 | $W_{i_{1,1},i_{1,1}+O_1,i_{1,1}+2O_1,i_{1,1}+3O_1,0,0,0,0,i_2}^{(7)}$ |

$$W_{l,l',l'',l''',m,m',m'',m''',n}^{(7)} = \frac{1}{S}\begin{bmatrix} v_{l,m} & v_{l,m} & v_{l',m'} & v_{l'',m''} & v_{l'',m''} & v_{l''',m'''} & v_{l''',m'''} \\ \varphi_n v_{l,m} & -\varphi_n v_{l,m} & \varphi_n v_{l',m'} & v_{l'',m''} & -v_{l'',m''} & v_{l''',m'''} & -v_{l''',m'''} \end{bmatrix}$$

and S is a scaling/normalization factor, e.g., $S = \sqrt{7 \times 8} = 2\sqrt{14}$.

TABLE 31

| $(N_1, N_2)$ | $(O_1, O_2)$ | $i_{1,1}$ | $i_{1,2}$ | $i_2$ | TPMI | Precoder |
|---|---|---|---|---|---|---|
| (2, 2) | (1, 1) | 0, 1 | 0, 1 | 0, 1 | Scheme 1: 0, 1, ... , 7 or Scheme 2: 112, .... , 119 | $W_{i_{1,1},i_{1,1}+O_1,i_{1,1},i_{1,1}+O_1,i_{1,2},i_{1,2},i_{1,2}+O_2,i_{1,2}+O_2,i_2}^{(7)}$ |

$$W_{l,l',l'',l''',m,m',m'',m''',n}^{(7)} = \frac{1}{S}\begin{bmatrix} v_{l,m} & v_{l,m} & v_{l',m'} & v_{l'',m''} & v_{l'',m''} & v_{l''',m'''} & v_{l''',m'''} \\ \varphi_n v_{l,m} & -\varphi_n v_{l,m} & \varphi_n v_{l',m'} & v_{l'',m''} & -v_{l'',m''} & v_{l''',m'''} & -v_{l''',m'''} \end{bmatrix}$$

and S is a scaling/normalization factor, e.g., $S = \sqrt{7 \times 8} = 2\sqrt{14}$.

TABLE 32 codebook for 8-layer (rank 8), $(N_1, N_2) = (4, 1)$

| $(N_1, N_2)$ | $(O_1, O_2)$ | $i_{1,1}$ | $i_{1,2}$ | $i_2$ | TPMI | Precoder |
|---|---|---|---|---|---|---|
| (4, 1) | (1, 1) | 0, 1 | 0 | 0, 1 | Scheme 1: 0, 1, ... , 3 or Scheme 2: 116, ... , 119 | $W_{i_{1,1},i_{1,1}+O_1,i_{1,1}+2O_1,i_{1,1}+3O_1,0,0,0,0,i_2}^{(8)}$ |

$$W_{l,l',l'',l''',m,m',m'',m''',n}^{(8)} = \frac{1}{S}\begin{bmatrix} v_{l,m} & v_{l,m} & v_{l',m'} & v_{l',m'} & v_{l'',m''} & v_{l'',m''} & v_{l''',m'''} & v_{l''',m'''} \\ \varphi_n v_{l,m} & -\varphi_n v_{l,m} & \varphi_n v_{l',m'} & -\varphi_n v_{l',m'} & v_{l'',m''} & -v_{l'',m''} & v_{l''',m'''} & -v_{l''',m'''} \end{bmatrix}$$

and S is a scaling/normalization factor, e.g., $S = \sqrt{8 \times 8} = 8$.

TABLE 33 codebook for 8-layer (rank 8), $(N_1, N_2) = (2, 2)$

| $(N_1, N_2)$ | $(O_1, O_2)$ | $i_{1,1}$ | $i_{1,2}$ | $i_2$ | TPMI | Precoder |
|---|---|---|---|---|---|---|
| (2, 2) | (1, 1) | 0, 1 | 0, 1 | 0, 1 | Scheme 1: 0, 1, ... , 7 or Scheme 2: 120, ... , 127 | $W_{i_{1,1},i_{1,1}+O_1,i_{1,1},i_{1,1}+O_1,i_{1,2},i_{1,2},i_{1,2}+O_2,i_{1,2}+O_2,i_2}^{(8)}$ |

$$W_{l,l',l'',l''',m,m',m'',m''',n}^{(8)} = \frac{1}{S}\begin{bmatrix} v_{l,m} & v_{l,m} & v_{l',m'} & v_{l',m'} & v_{l'',m''} & v_{l'',m''} & v_{l''',m'''} & v_{l''',m'''} \\ \varphi_n v_{l,m} & -\varphi_n v_{l,m} & \varphi_n v_{l',m'} & -\varphi_n v_{l',m'} & v_{l'',m''} & -v_{l'',m''} & v_{l''',m'''} & -v_{l''',m'''} \end{bmatrix}$$

and S is a scaling/normalization factor, e.g., $S = \sqrt{8 \times 8} = 8$.

TABLE 34

| Layout 1 | | | | | | | | | |
|---|---|---|---|---|---|---|---|---|---|
| TPMI index (scheme 1) | TPMI index (scheme 2) | | | | | | | | |
| | | 1-layer Precoder indicated by $(i_{1,1}, i_{1,2}, i_2)$ (ordered from left to right in increasing order of TPMI index) | | | | | | | |
| 0-7 | 0-7 | (0, 0, 0) | (0, 0, 1) | (0, 0, 2) | (0, 0, 3) | (1, 0, 0) | (1, 0, 1) | (1, 0, 2) | (1, 0, 3) |
| 8-15 | 8-15 | (2, 0, 0) | (2, 0, 1) | (2, 0, 2) | (2, 0, 3) | (3, 0, 0) | (3, 0, 1) | (3, 0, 2) | (3, 0, 3) |
| | | 2-layer Precoder indicated by $(i_{1,1}, i_{1,2}, i_{1,3}, i_2)$ | | | | | | | |
| 0-7 | 16-23 | (0, 0, 0, 0) | (0, 0, 0, 1) | (1, 0, 0, 0) | (1, 0, 0, 1) | (2, 0, 0, 0) | (2, 0, 0, 1) | (3, 0, 0, 0) | (3, 0, 0, 1) |
| 8-15 | 24-31 | (0, 0, 1, 0) | (0, 0, 1, 1) | (1, 0, 1, 0) | (1, 0, 1, 1) | (2, 0, 1, 0) | (2, 0, 1, 1) | (3, 0, 1, 0) | (3, 0, 1, 1) |
| 16-23 | 32-39 | (0, 0, 2, 0) | (0, 0, 2, 1) | (1, 0, 2, 0) | (1, 0, 2, 1) | (2, 0, 2, 0) | (2, 0, 2, 1) | (3, 0, 2, 0) | (3, 0, 2, 1) |
| 24-31 | 40-47 | (0, 0, 3, 0) | (0, 0, 3, 1) | (1, 0, 3, 0) | (1, 0, 3, 1) | (2, 0, 3, 0) | (2, 0, 3, 1) | (3, 0, 3, 0) | (3, 0, 3, 1) |
| | | 3-layer Precoder indicated by $(i_{1,1}, i_{1,2}, i_{1,3}, i_2)$ | | | | | | | |
| 0-7 | 48-55 | (0, 0, 0, 0) | (0, 0, 0, 1) | (1, 0, 0, 0) | (1, 0, 0, 1) | (2, 0, 0, 0) | (2, 0, 0, 1) | (3, 0, 0, 0) | (3, 0, 0, 1) |
| 8-15 | 56-63 | (0, 0, 1, 0) | (0, 0, 1, 1) | (1, 0, 1, 0) | (1, 0, 1, 1) | (2, 0, 1, 0) | (2, 0, 1, 1) | (3, 0, 1, 0) | (3, 0, 1, 1) |
| 16-23 | 64-71 | (0, 0, 2, 0) | (0, 0, 2, 1) | (1, 0, 2, 0) | (1, 0, 2, 1) | (2, 0, 2, 0) | (2, 0, 2, 1) | (3, 0, 2, 0) | (3, 0, 2, 1) |
| | | 4-layer Precoder indicated by $(i_{1,1}, i_{1,2}, i_{1,3}, i_2)$ | | | | | | | |
| 0-7 | 72-79 | (0, 0, 0, 0) | (0, 0, 0, 1) | (1, 0, 0, 0) | (1, 0, 0, 1) | (2, 0, 0, 0) | (2, 0, 0, 1) | (3, 0, 0, 0) | (3, 0, 0, 1) |
| 8-15 | 80-87 | (0, 0, 1, 0) | (0, 0, 1, 1) | (1, 0, 1, 0) | (1, 0, 1, 1) | (2, 0, 1, 0) | (2, 0, 1, 1) | (3, 0, 1, 0) | (3, 0, 1, 1) |
| 16-23 | 88-95 | (0, 0, 2, 0) | (0, 0, 2, 1) | (1, 0, 2, 0) | (1, 0, 2, 1) | (2, 0, 2, 0) | (2, 0, 2, 1) | (3, 0, 2, 0) | (3, 0, 2, 1) |

TABLE 34-continued

Layout 1

| TPMI index (scheme 1) | TPMI index (scheme 2) | | | | | | | |
|---|---|---|---|---|---|---|---|---|
| | | 5-layer Precoder indicated by $(i_{1,1}, i_{1,2}, i_2)$ | | | | | | |
| 0-7 | 96-103 | (0, 0, 0) | (0, 0, 1) | (1, 0, 0) | (1, 0, 1) | (2, 0, 0) | (2, 0, 1) | (3, 0, 0) | (3, 0, 1) |
| | | 6-layer Precoder indicated by $(i_{1,1}, i_{1,2}, i_2)$ | | | | | | |
| 0-7 | 104-111 | (0, 0, 0) | (0, 0, 1) | (1, 0, 0) | (1, 0, 1) | (2, 0, 0) | (2, 0, 1) | (3, 0, 0) | (3, 0, 1) |
| | | 7-layer Precoder indicated by $(i_{1,1}, i_{1,2}, i_2)$ | | | | | | |
| 0-3 | 112-115 | (0, 0, 0) | (0, 0, 1) | (1, 0, 0) | (1, 0, 1) | | | | |
| | | 8-layer Precoder indicated by $(i_{1,1}, i_{1,2}, i_2)$ | | | | | | |
| 0-3 | 116-119 | (0, 0, 0) | (0, 0, 1) | (1, 0, 0) | (1, 0, 1) | | | | |

TABLE 35

Layout 2

| TPMI index (scheme 1) | TPMI index (scheme 2) | | | | | | | |
|---|---|---|---|---|---|---|---|---|
| | | 1-layer Precoder indicated by $(i_{1,1}, i_{1,2}, i_2)$ (ordered from left to right in increasing order of TPMI index) | | | | | | |
| 0-7 | 0-7 | (0, 0, 0) | (0, 0, 1) | (0, 0, 2) | (0, 0, 3) | (0, 1, 0) | (0, 1, 1) | (0, 1, 2) | (0, 1, 3) |
| 8-15 | 8-15 | (1, 0, 0) | (1, 0, 1) | (1, 0, 2) | (1, 0, 3) | (1, 1, 0) | (1, 1, 1) | (1, 1, 2) | (1, 1, 3) |
| | | 2-layer Precoder indicated by $(i_{1,1}, i_{1,2}, i_{1,3}, i_2)$ | | | | | | |
| 0-7 | 16-23 | (0, 0, 0, 0) | (0, 0, 0, 1) | (0, 1, 0, 0) | (0, 1, 0, 1) | (1, 0, 0, 0) | (1, 0, 0, 1) | (1, 1, 0, 0) | (1, 1, 0, 1) |
| 8-15 | 24-31 | (0, 0, 1, 0) | (0, 0, 1, 1) | (0, 1, 1, 0) | (0, 1, 1, 1) | (1, 0, 1, 0) | (1, 0, 1, 1) | (1, 1, 1, 0) | (1, 1, 1, 1) |
| 16-23 | 32-39 | (0, 0, 2, 0) | (0, 0, 2, 1) | (0, 1, 2, 0) | (0, 1, 2, 1) | (1, 0, 2, 0) | (1, 0, 2, 1) | (1, 1, 2, 0) | (1, 1, 2, 1) |
| 24-31 | 40-47 | (0, 0, 3, 0) | (0, 0, 3, 1) | (0, 1, 3, 0) | (0, 1, 3, 1) | (1, 0, 3, 0) | (1, 0, 3, 1) | (1, 1, 3, 0) | (1, 1, 3, 1) |
| | | 3-layer Precoder indicated by $(i_{1,1}, i_{1,2}, i_{1,3}, i_2)$ | | | | | | |
| 0-7 | 48-55 | (0, 0, 0, 0) | (0, 0, 0, 1) | (0, 1, 0, 0) | (0, 1, 0, 1) | (1, 0, 0, 0) | (1, 0, 0, 1) | (1, 1, 0, 0) | (1, 1, 0, 1) |
| 8-15 | 56-63 | (0, 0, 1, 0) | (0, 0, 1, 1) | (0, 1, 1, 0) | (0, 1, 1, 1) | (1, 0, 1, 0) | (1, 0, 1, 1) | (1, 1, 1, 0) | (1, 1, 1, 1) |
| 16-23 | 64-71 | (0, 0, 2, 0) | (0, 0, 2, 1) | (0, 1, 2, 0) | (0, 1, 2, 1) | (1, 0, 2, 0) | (1, 0, 2, 1) | (1, 1, 2, 0) | (1, 1, 2, 1) |
| | | 4-layer Precoder indicated by $(i_{1,1}, i_{1,2}, i_{1,3}, i_2)$ | | | | | | |
| 0-7 | 72-79 | (0, 0, 0, 0) | (0, 0, 0, 1) | (0, 1, 0, 0) | (0, 1, 0, 1) | (1, 0, 0, 0) | (1, 0, 0, 1) | (1, 1, 0, 0) | (1, 1, 0, 1) |
| 8-15 | 80-87 | (0, 0, 1, 0) | (0, 0, 1, 1) | (0, 1, 1, 0) | (0, 1, 1, 1) | (1, 0, 1, 0) | (1, 0, 1, 1) | (1, 1, 1, 0) | (1, 1, 1, 1) |
| 16-23 | 88-95 | (0, 0, 2, 0) | (0, 0, 2, 1) | (0, 1, 2, 0) | (0, 1, 2, 1) | (1, 0, 2, 0) | (1, 0, 2, 1) | (1, 1, 2, 0) | (1, 1, 2, 1) |
| | | 5-layer Precoder indicated by $(i_{1,1}, i_{1,2}, i_2)$ | | | | | | |
| 0-7 | 96-103 | (0, 0, 0) | (0, 0, 1) | (0, 1, 0) | (0, 1, 1) | (1, 0, 0) | (1, 0, 1) | (1, 1, 0) | (1, 1, 1) |
| | | 6-layer Precoder indicated by $(i_{1,1}, i_{1,2}, i_2)$ | | | | | | |
| 0-7 | 104-111 | (0, 0, 0) | (0, 0, 1) | (0, 1, 0) | (0, 1, 1) | (1, 0, 0) | (1, 0, 1) | (1, 1, 0) | (1, 1, 1) |
| | | 7-layer Precoder indicated by $(i_{1,1}, i_{1,2}, i_2)$ | | | | | | |
| 0-7 | 112-119 | (0, 0, 0) | (0, 0, 1) | (0, 1, 0) | (0, 1, 1) | (1, 0, 0) | (1, 0, 1) | (1, 1, 0) | (1, 1, 1) |
| | | 8-layer Precoder indicated by $(i_{1,1}, i_{1,2}, i_2)$ | | | | | | |
| 0-7 | 120-127 | (0, 0, 0) | (0, 0, 1) | (0, 1, 0) | (0, 1, 1) | (1, 0, 0) | (1, 0, 1) | (1, 1, 0) | (1, 1, 1) |

In one example, when a single TPMI is used to indicate a precoder indicated by indices $(i_{1,1}, i_{1,2}, i_{1,3}, i_2)$ (in Rel. 15 Type I single panel codebook), then number of TPMIs for a rank r $(K_{TPMI,r})$=number of $i_{1,1}$ indices×number of $i_{1,2}$ indices×number of $i_{1,3}$ indices×number of $i_2$ indices, where number of $i_{1,3}$ indices=4, 3, and 3 for rank 2, 3, and 4, respectively, and 1 for other rank values. Assuming dual-polarized antennae, for 8 antenna ports, there are two antenna layouts, as in Rel. 15 DL Type I codebook, namely layout 1 and layout 2 (a shown in FIG. 7).

For rank r=1, $K_{TPMI,r}=N_1O_1\times N_2O_2\times 1\times 4=4N_1N_2$, which is 16 when $(O_1, O_2)=(1,1)$.

For rank r=2, $K_{TPMI,r}=N_1O_1\times N_2O_2\times 4\times 2=8N_1N_2$, which is 32 when $(O_1, O_2)=(1,1)$.

For rank r=3, 4, $K_{TPMI,r}=N_1O_1\times N_2O_2\times 3\times 2=6N_1N_2$, which is 24 when $(O_1, O_2)=(1,1)$.

For rank r=5, 6, $K_{TPMI,r}=N_1O_1\times N_2O_2\times 1\times 2=2N_1N_2$, which is 8 when $(O_1, O_2)=(1,1)$.

For rank r=7, 8, $$K_{TPMI,r} = \frac{N_1 O_1}{2} \times N_2 O_2 \times 1 \times 2 = N_1 N_2,$$

which is 4 when $(N_1, N_2)=(4,1)$ and $(O_1, O_2)=(1,1)$.

For rank r=7, 8, $K_{TPMI,r}=N_1O_1\times N_2O_2\times 1\times 2=2N_1N_2$, which is 8 when $(N_1, N_2)=(2,2)$ and $(O_1, O_2)=(1,1)$.

The total number of TPMIs is $K_{TPMI}=\Sigma_{r=1}^{8} K_{TPMI,r}=120$ for $(N_1, N_2)=(4,1)$ and 128 for $(N_1, N_2)=(2,2)$.

In TPMI index scheme 1, the rank (number of layers) value and the corresponding precoder are indicated separately via two indicators, e.g., TRI and TPMI, respectively. In TPMI index scheme 2, the rank (number of layers) value and the corresponding precoder are indicated jointly via TPMI.

For Layout 1, $(N_1, N_2)=(4,1)$. When $(O_1, O_2)=(1,1)$, the rank 1-8 precoders are as shown in Table 18, Table 20, . . . Table 32, where $$v_{l,m} \in \left\{ \begin{bmatrix} 1\\1\\1\\1 \end{bmatrix}, \begin{bmatrix} 1\\j\\-1\\-j \end{bmatrix}, \begin{bmatrix} 1\\-1\\1\\-1 \end{bmatrix}, \begin{bmatrix} 1\\-j\\-1\\j \end{bmatrix} \right\}$$

and $\varphi_n \in \{1, j, -1, -j\}$. When a single TPMI is used, an example of mapping/ordering of TPMI indices to the precoders indicated by indices $(i_{1,1}, i_{1,2}, i_2)$ or $(i_{1,1}, i_{1,2}, i_{1,3}, i_2)$ are shown in Table 34.

In Layout 2, $(N_1, N_2)=(2,2)$. When $(O_1, O_2)=(1,1)$, there are 16 rank 1 precoders, as shown Table 19, Table 21, . . . Table 33, where $$v_{l,m} \in \left\{ \begin{bmatrix} 1\\1\\1\\1 \end{bmatrix}, \begin{bmatrix} 1\\1\\-1\\-1 \end{bmatrix}, \begin{bmatrix} 1\\-1\\1\\-1 \end{bmatrix}, \begin{bmatrix} 1\\-1\\-1\\1 \end{bmatrix} \right\} \text{ or } \left\{ \begin{bmatrix} 1\\1\\1\\1 \end{bmatrix}, \begin{bmatrix} 1\\-1\\1\\-1 \end{bmatrix}, \begin{bmatrix} 1\\1\\-1\\-1 \end{bmatrix}, \begin{bmatrix} 1\\-1\\-1\\1 \end{bmatrix} \right\}$$

and $\varphi_n \in \{1, j, -1, -j\}$. When a single TPMI is used, an example of mapping/ordering of TPMI indices to the precoders indicated by indices $(i_{1,1}, i_{1,2}, i_2)$ or $(i_{1,1}, i_{1,2}, i_{1,3}, i_2)$ are shown in Table 35.

The corresponding rank 1-8 precoders are tabulated in Table 36 and Table 51.

The precoders marked as (R1) correspond to the precoders whose columns are permutations of each other. Since the permutation of columns does not change the precoders, only one of these precoders (marked as (R1)) can be included in the table.

TABLE 36

Layout 1: $(N_1, N_2) = (4, 1)$

| TPMI index | Precoder indicated by $(i_{1,1}, i_{1,2}, i_2)$ (ordered from left to right in increasing order of TPMI index) | | | | | | | |
|---|---|---|---|---|---|---|---|---|
| 0-7 | $p_{0,1}$ | $p_{0,j}$ | $p_{0,-1}$ | $p_{0,-j}$ | $p_{1,1}$ | $p_{1,j}$ | $p_{1,-1}$ | $p_{1,-j}$ |
| | $\frac{1}{S}\begin{bmatrix}1\\1\\1\\1\\1\\1\\1\\1\end{bmatrix}$ | $\frac{1}{S}\begin{bmatrix}1\\1\\1\\1\\j\\j\\j\\j\end{bmatrix}$ | $\frac{1}{S}\begin{bmatrix}1\\1\\1\\1\\-1\\-1\\-1\\-1\end{bmatrix}$ | $\frac{1}{S}\begin{bmatrix}1\\1\\1\\1\\-j\\-j\\-j\\-j\end{bmatrix}$ | $\frac{1}{S}\begin{bmatrix}1\\j\\-1\\-j\\1\\j\\-1\\-j\end{bmatrix}$ | $\frac{1}{S}\begin{bmatrix}1\\j\\-1\\-j\\j\\-1\\-j\\1\end{bmatrix}$ | $\frac{1}{S}\begin{bmatrix}1\\j\\-1\\-j\\-1\\-j\\1\\j\end{bmatrix}$ | $\frac{1}{S}\begin{bmatrix}1\\j\\-1\\-j\\-j\\1\\j\\-1\end{bmatrix}$ |
| 8-15 | $p_{2,1}$ | $p_{2,j}$ | $p_{2,-1}$ | $p_{2,-j}$ | $p_{3,1}$ | $p_{3,j}$ | $p_{3,-1}$ | $p_{3,-j}$ |
| | $\frac{1}{S}\begin{bmatrix}1\\-1\\1\\-1\\1\\-1\\1\\-1\end{bmatrix}$ | $\frac{1}{S}\begin{bmatrix}1\\-1\\1\\-1\\j\\-j\\j\\-j\end{bmatrix}$ | $\frac{1}{S}\begin{bmatrix}1\\-1\\1\\-1\\-1\\1\\-1\\1\end{bmatrix}$ | $\frac{1}{S}\begin{bmatrix}1\\-1\\1\\-1\\-j\\j\\-j\\j\end{bmatrix}$ | $\frac{1}{S}\begin{bmatrix}1\\-j\\-1\\j\\1\\-j\\-1\\j\end{bmatrix}$ | $\frac{1}{S}\begin{bmatrix}1\\-j\\-1\\j\\j\\1\\-j\\-1\end{bmatrix}$ | $\frac{1}{S}\begin{bmatrix}1\\-j\\-1\\j\\-1\\j\\1\\-j\end{bmatrix}$ | $\frac{1}{S}\begin{bmatrix}1\\-j\\-1\\j\\-j\\-1\\j\\1\end{bmatrix}$ |

TABLE 37

| | Layout 2: $(N_1, N_2) = (2, 2)$ | | | | | | |
|---|---|---|---|---|---|---|---|
| TPMI index | Precoder indicated by $(i_{1,1}, i_{1,2}, i_2)$ (ordered from left to right in increasing order of TPMI index) | | | | | | |
| 0-7 | $q_{0,1}$ | $q_{0,j}$ | $q_{0,-1}$ | $q_{0,-j}$ | $q_{1,1}$ | $q_{1,j}$ | $q_{1,-1}$ | $q_{1,-j}$ |

$$\frac{1}{S}\begin{bmatrix}1\\1\\1\\1\\1\\1\\1\\1\end{bmatrix} \quad \frac{1}{S}\begin{bmatrix}1\\1\\1\\1\\j\\j\\j\\j\end{bmatrix} \quad \frac{1}{S}\begin{bmatrix}1\\1\\1\\1\\-1\\-1\\-1\\-1\end{bmatrix} \quad \frac{1}{S}\begin{bmatrix}1\\1\\1\\1\\-j\\-j\\-j\\-j\end{bmatrix} \quad \frac{1}{S}\begin{bmatrix}1\\-1\\1\\-1\\1\\-1\\1\\-1\end{bmatrix} \quad \frac{1}{S}\begin{bmatrix}1\\-1\\1\\-1\\j\\-j\\j\\-j\end{bmatrix} \quad \frac{1}{S}\begin{bmatrix}1\\-1\\1\\-1\\-1\\1\\-1\\1\end{bmatrix} \quad \frac{1}{S}\begin{bmatrix}1\\-1\\1\\-1\\-j\\j\\-j\\j\end{bmatrix}$$

| 8-15 | $q2_{,1}$ | $q_{2,j}$ | $q_{2,-1}$ | $q_{2,-j}$ | $q_{3,1}$ | $q_{3,j}$ | $q_{3,-1}$ | $q_{3,-j}$ |

$$\frac{1}{S}\begin{bmatrix}1\\1\\-1\\-1\\1\\1\\-1\\-1\end{bmatrix} \quad \frac{1}{S}\begin{bmatrix}1\\1\\-1\\-1\\j\\j\\-j\\-j\end{bmatrix} \quad \frac{1}{S}\begin{bmatrix}1\\1\\-1\\-1\\-1\\-1\\1\\1\end{bmatrix} \quad \frac{1}{S}\begin{bmatrix}1\\1\\-1\\-1\\-j\\-j\\j\\j\end{bmatrix} \quad \frac{1}{S}\begin{bmatrix}1\\-1\\-1\\1\\1\\-1\\-1\\1\end{bmatrix} \quad \frac{1}{S}\begin{bmatrix}1\\-1\\-1\\1\\j\\-j\\-j\\j\end{bmatrix} \quad \frac{1}{S}\begin{bmatrix}1\\-1\\-1\\1\\-1\\1\\1\\-1\end{bmatrix} \quad \frac{1}{S}\begin{bmatrix}1\\-1\\-1\\1\\-j\\j\\j\\-j\end{bmatrix}$$

TABLE 38

Layout 1: $(N_1, N_2) = (4, 1)$

| TPMI index | Precoder indicated by $(i_{1,1}, i_{1,2}, i_{1,3}, i_2)$ (ordered from left to right in increasing order of TPMI index) | | | | | | | |
|---|---|---|---|---|---|---|---|---|
| 0-7 | $[p_{0,1}, p_{0,-1}]$ | $[p_{0,j}, p_{0,-j}]$ | $[p_{1,1}, p_{1,-1}]$ | $[p_{1,j}, p_{1,-j}]$ | $[p_{2,1}, p_{2,-1}]$ | $[p_{2,j}, p_{2,-j}]$ | $[p_{3,1}, p_{3,-1}]$ | $[p_{3,j}, p_{3,-j}]$ |
| 8-15 | $[p_{0,1}, p_{1,-1}]$ | $[p_{0,j}, p_{1,-j}]$ | $[p_{1,1}, p_{2,-1}]$ | $[p_{1,j}, p_{2,-j}]$ | $[p_{2,1}, p_{3,-1}]$ | $[p_{2,j}, p_{3,-j}]$ | $[p_{3,1}, p_{0,-1}]$ | $[p_{3,j}, p_{0,-j}]$ |
| 16-23 | $[p_{0,1}, p_{2,-1}]$ | $[p_{0,j}, p_{2,-j}]$ | $[p_{1,1}, p_{3,-1}]$ | $[p_{1,j}, p_{3,-j}]$ | $[p_{2,1}, p_{0,-1}]$ | $[p_{2,j}, p_{0,-j}]$ | $[p_{3,1}, p_{1,-1}]$ | $[p_{3,j}, p_{1,-j}]$ |

TABLE 38-continued

Layout 1: $(N_1, N_2) = (4, 1)$

| TPMI index | Precoder indicated by $(i_{1,1}, i_{1,2}, i_{1,3}, i_2)$ (ordered from left to right in increasing order of TPMI index) | | | | | | | |
|---|---|---|---|---|---|---|---|---|
| | $[p_{0,1}, p_{3,-1}]$ | $[p_{0,j}, p_{3,-j}]$ | $[p_{1,1}, p_{0,-1}]$ | $[p_{1,j}, p_{0,-j}]$ | $[p_{2,1}, p_{1,-1}]$ | $[p_{2,j}, p_{1,-j}]$ | $[p_{3,1}, p_{2,-1}]$ | $[p_{3,j}, p_{2,-j}]$ |
| 24-31 | $\frac{1}{\sqrt{5}}\begin{bmatrix} 1 & -j \\ 1 & -1 \\ 1 & j \\ 1 & 1 \\ 1 & -j \\ 1 & -1 \\ 1 & j \\ 1 & 1 \end{bmatrix}$ |

Due to the complexity and visual nature of the matrix entries in this table, the precoder matrices for TPMI indices 24-31 are shown as $4 \times 2$ matrices with entries from $\{1, -1, j, -j\}$ scaled by $\frac{1}{\sqrt{5}}$:

- $[p_{0,1}, p_{3,-1}]$: $\frac{1}{\sqrt{5}}\begin{bmatrix} 1 & -j \\ 1 & -1 \\ 1 & j \\ 1 & 1 \\ 1 & -j \\ 1 & -1 \\ 1 & j \\ 1 & 1 \end{bmatrix}$

- $[p_{0,j}, p_{3,-j}]$: $\frac{1}{\sqrt{5}}\begin{bmatrix} 1 & -1 \\ 1 & -j \\ 1 & 1 \\ 1 & j \\ j & -j \\ j & 1 \\ j & j \\ j & -1 \end{bmatrix}$

TABLE 39

| | Layout 2: $(N_1, N_2) = (4, 1)$ | | | | | | | |
|---|---|---|---|---|---|---|---|---|
| TPMI index | Precoder indicated by $(i_{1,1}, i_{1,2}, i_{1,3}, i_2)$ (ordered from left to right in increasing order of TPMI index) | | | | | | | |
| 0-7 | $[q_{0,1}, q_{0,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{0,j}, q_{0,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{1,1}, q_{1,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{1,j}, q_{1,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{2,1}, q_{2,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{2,j}, q_{2,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{3,1}, q_{3,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{3,j}, q_{3,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ |
| 8-15 | $[q_{0,1}, q_{1,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{0,j}, q_{1,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{1,1}, q_{2,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{1,j}, q_{2,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{2,1}, q_{3,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{2,j}, q_{3,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{3,1}, q_{0,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{3,j}, q_{0,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ |
| 16-23 | $[q_{0,1}, q_{2,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{0,j}, q_{2,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{1,1}, q_{3,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{1,j}, q_{3,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{2,1}, q_{0,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{2,j}, q_{0,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ | $[q_{3,1}, q_{1,-1}]$ $\frac{1}{\sqrt{8}}\begin{bmatrix}1 & 1\\1 & -1\\1 & 1\\1 & -1\\1 & 1\\1 & -1\\1 & 1\\1 & -1\end{bmatrix}$ | $[q_{3,j}, q_{1,-j}]$ $\frac{1}{\sqrt{8}}\begin{bmatrix}1 & 1\\1 & -1\\1 & 1\\1 & -1\\j & j\\j & -j\\j & j\\j & -j\end{bmatrix}$ |

TABLE 39-continued

Layout 2: $(N_1, N_2) = (4, 1)$

| TPMI index | Precoder indicated by $(i_{1,1}, i_{1,2}, i_{1,3}, i_2)$ (ordered from left to right in increasing order of TPMI index) | | | | | | | |
|---|---|---|---|---|---|---|---|---|
| | $[q_{0,1}, q_{3,-1}]$ | $[q_{0,j}, q_{3,-j}]$ | $[q_{1,1}, q_{0,-1}]$ | $[q_{1,j}, q_{0,-j}]$ | $[q_{2,1}, q_{1,-1}]$ | $[q_{2,j}, q_{1,-j}]$ | $[q_{3,1}, q_{2,-1}]$ | $[q_{3,j}, q_{2,-j}]$ |
| 24-31 | $\frac{1}{\sqrt{8}}\begin{bmatrix} 1 & -1 \\ 1 & -1 \\ 1 & -1 \\ 1 & -1 \\ 1 & 1 \\ 1 & 1 \\ 1 & 1 \\ 1 & 1 \end{bmatrix}$ | $\frac{1}{\sqrt{8}}\begin{bmatrix} 1 & -1 \\ 1 & -1 \\ 1 & -1 \\ 1 & -1 \\ j & -j \\ j & -j \\ j & -j \\ j & -j \end{bmatrix}$ | $\frac{1}{\sqrt{8}}\begin{bmatrix} 1 & 1 \\ 1 & -1 \\ -1 & 1 \\ -1 & -1 \\ 1 & 1 \\ 1 & -1 \\ -1 & 1 \\ -1 & -1 \end{bmatrix}$ | $\frac{1}{\sqrt{8}}\begin{bmatrix} 1 & 1 \\ 1 & -1 \\ -1 & 1 \\ -1 & -1 \\ j & j \\ j & -j \\ -j & j \\ -j & -j \end{bmatrix}$ | $\frac{1}{\sqrt{8}}\begin{bmatrix} 1 & -1 \\ 1 & -1 \\ 1 & -1 \\ 1 & -1 \\ 1 & 1 \\ 1 & 1 \\ 1 & 1 \\ 1 & 1 \end{bmatrix}$ | $\frac{1}{\sqrt{8}}\begin{bmatrix} 1 & -1 \\ 1 & -1 \\ 1 & -1 \\ 1 & -1 \\ j & -j \\ j & -j \\ j & -j \\ j & -j \end{bmatrix}$ | $\frac{1}{\sqrt{8}}\begin{bmatrix} 1 & 1 \\ 1 & -1 \\ -1 & 1 \\ -1 & -1 \\ 1 & 1 \\ 1 & -1 \\ -1 & 1 \\ -1 & -1 \end{bmatrix}$ | $\frac{1}{\sqrt{8}}\begin{bmatrix} 1 & 1 \\ 1 & -1 \\ -1 & 1 \\ -1 & -1 \\ j & j \\ j & -j \\ -j & j \\ -j & -j \end{bmatrix}$ |

TABLE 40

| | Layout 1: $(N_1, N_2) = (4, 1)$ |
|---|---|
| TPMI index | Precoder indicated by $(i_{1,1}, i_{1,2}, i_{1,3}, i_2)$ (ordered from left to right in increasing order of TPMI index) |

0-7  $[p_{0,1}, p_{1,1}, p_{0,-1}]$   $[p_{0,j}, p_{1,j}, p_{0,-j}]$   $[p_{1,1}, p_{2,1}, p_{1,-1}]$   $[p_{1,j}, p_{2,j}, p_{1,-j}]$ $$\frac{1}{S}\begin{bmatrix} 1 & 1 & 1 \\ 1 & j & 1 \\ 1 & -1 & 1 \\ 1 & -j & 1 \\ 1 & 1 & -1 \\ 1 & j & -1 \\ 1 & -1 & -1 \\ 1 & -j & -1 \end{bmatrix} \quad \frac{1}{S}\begin{bmatrix} 1 & 1 & 1 \\ 1 & j & 1 \\ 1 & -1 & 1 \\ 1 & -j & 1 \\ j & j & -j \\ j- & 1 & -j \\ j & -j & -j \\ j & 1 & -j \end{bmatrix} \quad \frac{1}{S}\begin{bmatrix} 1 & 1 & 1 \\ j & -1 & j \\ -1 & 1 & -1 \\ -j & -1 & -j \\ 1 & 1 & -1 \\ j & -1 & -j \\ -1 & 1 & 1 \\ -j & -1 & j \end{bmatrix} \quad \frac{1}{S}\begin{bmatrix} 1 & 1 & 1 \\ j & -1 & j \\ -1 & 1 & -1 \\ -j & -1 & -j \\ j & j & -j \\ -1 & -j & 1 \\ -j & j & j \\ 1 & -j & -1 \end{bmatrix}$$

$[p_{2,1}, p_{3,1}, p_{2,-1}]$   $[p_{2,j}, p_{3,j}, p_{2,-j}]$   $[p_{3,1}, p_{,1}, p_{3,-1}]$   $[p_{3,j}, p_{0,j}, p_{3,-j}]$ $$\frac{1}{S}\begin{bmatrix} 1 & 1 & 1 \\ -1 & -j & -1 \\ 1 & -1 & 1 \\ -1 & j & -1 \\ 1 & 1 & -1 \\ -1 & -j & 1 \\ 1 & -1 & -1 \\ -1 & j & 1 \end{bmatrix} \quad \frac{1}{S}\begin{bmatrix} 1 & 1 & 1 \\ -1 & -j & -1 \\ 1 & -1 & 1 \\ -1 & j & -1 \\ j & j & -j \\ -j & 1 & j \\ j & -j & -j \\ -j & -1 & j \end{bmatrix} \quad \frac{1}{S}\begin{bmatrix} 1 & 1 & 1 \\ -j & 1 & -j \\ -1 & 1 & -1 \\ j & 1 & j \\ 1 & 1 & -1 \\ -j & 1 & j \\ -1 & 1 & 1 \\ j & 1 & -j \end{bmatrix} \quad \frac{1}{S}\begin{bmatrix} 1 & 1 & 1 \\ -j & 1 & -j \\ -1 & 1 & -1 \\ j & 1 & j \\ j & j & -j \\ 1 & j & -1 \\ -j & j & j \\ -1 & j & 1 \end{bmatrix}$$

8-15  $[p_{0,1}, p_{2,1}, p_{0,-1}]$   $[p_{0,j}, p_{2,j}, p_{0,-j}]$   $[p_{1,1}, p_{3,1}, p_{1,-1}]$   $[p_{1,j}, p_{3,j}, p_{1,-j}]$ $$\frac{1}{S}\begin{bmatrix} 1 & 1 & 1 \\ 1 & -1 & 1 \\ 1 & 1 & 1 \\ 1 & -1 & 1 \\ 1 & 1 & -1 \\ 1 & -1 & -1 \\ 1 & 1 & -1 \\ 1 & -1 & -1 \end{bmatrix} \quad \frac{1}{S}\begin{bmatrix} 1 & 1 & 1 \\ 1 & -1 & 1 \\ 1 & 1 & 1 \\ 1 & -1 & 1 \\ j & j & -j \\ j & -j & -j \\ j & j & -j \\ j & -j & -j \end{bmatrix} \quad \frac{1}{S}\begin{bmatrix} 1 & 1 & 1 \\ j & -j & j \\ -1 & -1 & -1 \\ -j & j & -j \\ 1 & 1 & -1 \\ j & -j & -j \\ -1 & -1 & 1 \\ -j & j & j \end{bmatrix} \quad \frac{1}{S}\begin{bmatrix} 1 & 1 & 1 \\ j & -j & j \\ -1 & -1 & -1 \\ -j & j & -j \\ j & j & -j \\ -1 & 1 & 1 \\ -j & -j & j \\ 1 & -1 & -1 \end{bmatrix}$$

$[p_{2,1}, p_{0,1}, p_{2,-1}]$   $[p_{2,j}, p_{0,j}, p_{2,-j}]$   $[p_{3,1}, p_{1,1}, p_{3,-1}]$   $[p_{3,j}, p_{1,j}, p_{3,-j}]$ $$\frac{1}{S}\begin{bmatrix} 1 & 1 & 1 \\ -1 & 1 & -1 \\ 1 & 1 & 1 \\ -1 & 1 & -1 \\ 1 & 1 & -1 \\ -1 & 1 & 1 \\ 1 & 1 & -1 \\ -1 & 1 & 1 \end{bmatrix} \quad \frac{1}{S}\begin{bmatrix} 1 & 1 & 1 \\ -1 & 1 & -1 \\ 1 & 1 & 1 \\ -1 & 1 & -1 \\ j & j & -j \\ -j & j & j \\ j & j & -j \\ -j & j & j \end{bmatrix} \quad \frac{1}{S}\begin{bmatrix} 1 & 1 & 1 \\ -j & j & -j \\ -1 & -1 & -1 \\ j & -j & j \\ 1 & 1 & -1 \\ -j & j & j \\ -1 & -1 & 1 \\ j & -j & -j \end{bmatrix} \quad \frac{1}{S}\begin{bmatrix} 1 & 1 & 1 \\ -j & j & -j \\ -1 & -1 & -1 \\ j & -j & j \\ j & j & -j \\ 1 & -1 & -1 \\ -j & -j & j \\ -1 & 1 & 1 \end{bmatrix}$$

16-23  $[p_{0,1}, p_{3,1}, p_{0,-1}]$   $[p_{0,j}, p_{3,j}, p_{0,-j}]$   $[p_{1,1}, p_{0,1}, p_{1,-1}]$   $[p_{1,j}, p_{0,j}, p_{1,-j}]$ $$\frac{1}{S}\begin{bmatrix} 1 & 1 & 1 \\ 1 & -j & 1 \\ 1 & -1 & 1 \\ 1 & j & 1 \\ 1 & 1 & -1 \\ 1 & -j & -1 \\ 1 & -1 & -1 \\ 1 & j & -1 \end{bmatrix} \quad \frac{1}{S}\begin{bmatrix} 1 & 1 & 1 \\ 1 & -j & 1 \\ 1 & -1 & 1 \\ 1 & j & 1 \\ j & j & -j \\ j & 1 & -j \\ j & -j & -j \\ j & -1 & -j \end{bmatrix} \quad \frac{1}{S}\begin{bmatrix} 1 & 1 & 1 \\ j & 1 & j \\ -1 & 1 & -1 \\ -j & 1 & -j \\ 1 & 1 & -1 \\ j & 1 & -j \\ -1 & 1 & 1 \\ -j & 1 & j \end{bmatrix} \quad \frac{1}{S}\begin{bmatrix} 1 & 1 & 1 \\ j & 1 & j \\ -1 & 1 & -1 \\ -j & 1 & -j \\ j & j & -j \\ -1 & j & 1 \\ -j & j & j \\ 1 & j & -1 \end{bmatrix}$$

$[p_{2,1}, p_{1,1}, p_{2,-1}]$   $[p_{2,j}, p_{1,j}, p_{2,-j}]$   $[p_{3,1}, p_{2,1}, p_{3,-1}]$   $[p_{3,j}, p_{2,j}, p_{3,-j}]$ $$\frac{1}{S}\begin{bmatrix} 1 & 1 & 1 \\ -1 & j & -1 \\ 1 & -1 & 1 \\ -1 & -j & -1 \\ 1 & 1 & -1 \\ -1 & j & 1 \\ 1 & -1 & -1 \\ -1 & -j & 1 \end{bmatrix} \quad \frac{1}{S}\begin{bmatrix} 1 & 1 & 1 \\ -1 & j & -1 \\ 1 & -1 & 1 \\ -1 & -j & -1 \\ j & j & -j \\ -j & -1 & j \\ j & -j & -j \\ j & -j & -j \end{bmatrix} \quad \frac{1}{S}\begin{bmatrix} 1 & 1 & 1 \\ -j & -1 & -j \\ -1 & 1 & -1 \\ j & -1 & j \\ 1 & 1 & -1 \\ -j & -1 & j \\ -1 & 1 & 1 \\ j & -1 & -j \end{bmatrix} \quad \frac{1}{S}\begin{bmatrix} 1 & 1 & 1 \\ -j & -1 & -j \\ -1 & 1 & -1 \\ j & -1 & j \\ j & j & -j \\ 1 & -j & 1 \\ -j & j & j \\ -1 & -j & -1 \end{bmatrix}$$

TABLE 41

| | Layout 2: $(N_1, N_2) = (2, 2)$ |
|---|---|
| TPMI index | Precoder indicated by $(i_{1,1}, i_{1,2}, i_{1,3}, i_2)$ (ordered from left to right in increasing order of TPMI index) |

0-7

$[q_{0,1}, q_{1,1}, q_{0,-1}]$    $[q_{0,j}, q_{1,j}, q_{0,-j}]$    $[q_{1,1}, q_{2,1}, q_{1,-1}]$    $[q_{1,j}, q_{2,j}, q_{1,-j}]$ $$\frac{1}{S}\begin{bmatrix} 1 & 1 & 1 \\ 1 & -1 & 1 \\ 1 & 1 & 1 \\ 1 & -1 & 1 \\ 1 & 1 & -1 \\ 1 & -1 & -1 \\ 1 & 1 & -1 \\ 1 & -1 & -1 \end{bmatrix} \quad \frac{1}{S}\begin{bmatrix} 1 & 1 & 1 \\ 1 & -1 & 1 \\ 1 & 1 & 1 \\ 1 & -1 & 1 \\ j & j & -j \\ j & -j & -j \\ j & j & -j \\ j & -j & -j \end{bmatrix} \quad \frac{1}{S}\begin{bmatrix} 1 & 1 & 1 \\ -1 & 1 & -1 \\ 1 & -1 & 1 \\ -1 & -1 & -1 \\ 1 & 1 & -1 \\ -1 & 1 & 1 \\ 1 & -1 & -1 \\ -1 & -1 & 1 \end{bmatrix} \quad \frac{1}{S}\begin{bmatrix} 1 & 1 & 1 \\ -1 & 1 & -1 \\ 1 & -1 & 1 \\ -1 & -1 & -1 \\ j & j & -j \\ -j & j & j \\ j & -j & -j \\ -j & -j & j \end{bmatrix}$$

$[q_{2,1}, q_{3,1}, q_{2,-1}]$    $[q_{2,j}, q_{3,j}, q_{2,-j}]$    $[q_{3,1}, q_{.,1}, q_{3,-1}]$    $[q_{3,j}, q_{0,j}, q_{3,-j}]$ $$\frac{1}{S}\begin{bmatrix} 1 & 1 & 1 \\ 1 & -1 & 1 \\ -1 & -1 & -1 \\ -1 & 1 & -1 \\ 1 & 1 & -1 \\ 1 & -1 & -1 \\ -1 & -1 & 1 \\ -1 & 1 & 1 \end{bmatrix} \quad \frac{1}{S}\begin{bmatrix} 1 & 1 & 1 \\ 1 & -1 & 1 \\ -1 & -1 & -1 \\ -1 & 1 & -1 \\ j & j & -j \\ j & -j & -j \\ -j & -j & j \\ -j & -j & j \end{bmatrix} \quad \frac{1}{S}\begin{bmatrix} 1 & 1 & 1 \\ -1 & 1 & -1 \\ -1 & 1 & -1 \\ 1 & 1 & 1 \\ 1 & 1 & -1 \\ -1 & 1 & 1 \\ -1 & 1 & 1 \\ 1 & 1 & -1 \end{bmatrix} \quad \frac{1}{S}\begin{bmatrix} 1 & 1 & 1 \\ -1 & 1 & -1 \\ -1 & 1 & -1 \\ 1 & 1 & 1 \\ j & j & -j \\ -j & j & j \\ -j & j & j \\ j & j & -j \end{bmatrix}$$

8-15

$[q_{0,1}, q_{2,1}, q_{0,-1}]$    $[q_{0,j}, q_{2,j}, q_{0,-j}]$    $[q_{1,1}, q_{3,1}, q_{1,-1}]$    $[q_{1,j}, q_{3,j}, q_{1,-j}]$ $$\frac{1}{S}\begin{bmatrix} 1 & 1 & 1 \\ 1 & 1 & 1 \\ 1 & -1 & 1 \\ 1 & -1 & 1 \\ 1 & 1 & -1 \\ 1 & 1 & -1 \\ 1 & -1 & -1 \\ 1 & -1 & -1 \end{bmatrix} \quad \frac{1}{S}\begin{bmatrix} 1 & 1 & 1 \\ 1 & 1 & 1 \\ 1 & -1 & 1 \\ 1 & -1 & 1 \\ j & j & -j \\ j & j & -j \\ j & -j & -j \\ j & -j & -j \end{bmatrix} \quad \frac{1}{S}\begin{bmatrix} 1 & 1 & 1 \\ -1 & -1 & -1 \\ 1 & -1 & 1 \\ -1 & 1 & -1 \\ 1 & 1 & -1 \\ -1 & -1 & 1 \\ 1 & -1 & -1 \\ -1 & 1 & 1 \end{bmatrix} \quad \frac{1}{S}\begin{bmatrix} 1 & 1 & 1 \\ -1 & -1 & -1 \\ 1 & -1 & 1 \\ -1 & 1 & -1 \\ j & j & -j \\ -j & -j & j \\ j & -j & -j \\ -j & j & j \end{bmatrix}$$

$[q_{2,1}, q_{0,1}, q_{2,-1}]$    $[q_{2,j}, q_{0,j}, q_{2,-j}]$    $[q_{3,1}, q_{1,1}, q_{3,-1}]$    $[q_{3,j}, q_{1,j}, q_{3,-j}]$ $$\frac{1}{S}\begin{bmatrix} 1 & 1 & 1 \\ 1 & 1 & 1 \\ -1 & 1 & -1 \\ -1 & 1 & -1 \\ 1 & 1 & -1 \\ 1 & 1 & -1 \\ -1 & 1 & 1 \\ -1 & 1 & 1 \end{bmatrix} \quad \frac{1}{S}\begin{bmatrix} 1 & 1 & 1 \\ 1 & 1 & 1 \\ -1 & 1 & -1 \\ -1 & 1 & -1 \\ j & j & -j \\ j & j & -j \\ -j & j & j \\ -j & j & j \end{bmatrix} \quad \frac{1}{S}\begin{bmatrix} 1 & 1 & 1 \\ -1 & -1 & -1 \\ -1 & 1 & -1 \\ 1 & -1 & 1 \\ 1 & 1 & -1 \\ -1 & -1 & 1 \\ -1 & 1 & 1 \\ 1 & -1 & -1 \end{bmatrix} \quad \frac{1}{S}\begin{bmatrix} 1 & 1 & 1 \\ -1 & -1 & -1 \\ -1 & 1 & -1 \\ 1 & -1 & 1 \\ j & j & -j \\ -j & -j & j \\ -j & j & j \\ j & -j & -j \end{bmatrix}$$

16-23

$[q_{0,1}, q_{3,1}, q_{0,-1}]$    $[q_{0,j}, q_{3,j}, q_{0,-j}]$    $[q_{1,1}, q_{0,1}, q_{1,-1}]$    $[q_{1,j}, q_{0,j}, q_{1,-j}]$ $$\frac{1}{S}\begin{bmatrix} 1 & 1 & 1 \\ 1 & -1 & 1 \\ 1 & -1 & 1 \\ 1 & 1 & 1 \\ 1 & 1 & -1 \\ 1 & -1 & -1 \\ 1 & -1 & -1 \\ 1 & 1 & -1 \end{bmatrix} \quad \frac{1}{S}\begin{bmatrix} 1 & 1 & 1 \\ 1 & -1 & 1 \\ 1 & -1 & 1 \\ 1 & 1 & 1 \\ j & j & -j \\ j & -j & -j \\ j & -j & -j \\ j & j & -j \end{bmatrix} \quad \frac{1}{S}\begin{bmatrix} 1 & 1 & 1 \\ -1 & 1 & -1 \\ 1 & 1 & 1 \\ -1 & 1 & -1 \\ 1 & 1 & -1 \\ -1 & 1 & 1 \\ 1 & 1 & -1 \\ -1 & 1 & 1 \end{bmatrix} \quad \frac{1}{S}\begin{bmatrix} 1 & 1 & 1 \\ -1 & 1 & -1 \\ 1 & 1 & 1 \\ -1 & 1 & -1 \\ j & j & -j \\ -j & j & j \\ j & j & -j \\ -j & j & j \end{bmatrix}$$

$[q_{2,1}, q_{1,1}, q_{2,-1}]$    $[q_{2,j}, q_{1,j}, q_{2,-j}]$    $[q_{3,1}, q_{2,1}, q_{3,-1}]$    $[q_{3,j}, q_{2,j}, q_{3,-j}]$ $$\frac{1}{S}\begin{bmatrix} 1 & 1 & 1 \\ 1 & -1 & 1 \\ -1 & 1 & -1 \\ -1 & -1 & -1 \\ 1 & 1 & -1 \\ 1 & -1 & -1 \\ -1 & 1 & 1 \\ -1 & -1 & 1 \end{bmatrix} \quad \frac{1}{S}\begin{bmatrix} 1 & 1 & 1 \\ 1 & -1 & 1 \\ -1 & 1 & -1 \\ -1 & -1 & -1 \\ j & j & -j \\ j & -j & -j \\ -j & j & j \\ -j & -j & j \end{bmatrix} \quad \frac{1}{S}\begin{bmatrix} 1 & 1 & 1 \\ -1 & 1 & -1 \\ -1 & -1 & -1 \\ 1 & -1 & 1 \\ 1 & 1 & -1 \\ -1 & 1 & 1 \\ -1 & -1 & 1 \\ 1 & -1 & -1 \end{bmatrix} \quad \frac{1}{S}\begin{bmatrix} 1 & 1 & 1 \\ -1 & 1 & -1 \\ -1 & -1 & -1 \\ 1 & -1 & 1 \\ j & j & -j \\ -j & j & j \\ -j & -j & j \\ j & -j & -j \end{bmatrix}$$

TABLE 42

Layout 1: $(N_1, N_2) = (4, 1)$

| TPMI index | Precoder indicated by $(i_{1,1}, i_{1,2}, i_{1,3}, i_2)$ (ordered from left to right in increasing order of TPMI index) | | | |
|---|---|---|---|---|
| 0-7 | $[p_{0,1}, p_{1,1}, p_{0,-1}, p_{1,-1}]$ | $[p_{0,j}, p_{1,j}, p_{0,-j}, p_{1,-j}]$ | $[p_{1,1}, p_{2,1}, p_{1,-1}, p_{2,-1}]$ | $[p_{1,j}, p_{2,j}, p_{1,-j}, p_{2,-j}]$ |
| | $\frac{1}{S}\begin{bmatrix} 1 & 1 & 1 & 1 \\ 1 & j & 1 & j \\ 1 & -1 & 1 & -1 \\ 1 & -j & 1 & -j \\ 1 & 1 & -1 & -1 \\ 1 & j & -1 & -j \\ 1 & -1 & -1 & 1 \\ 1 & -j & -1 & j \end{bmatrix}$ | $\frac{1}{S}\begin{bmatrix} 1 & 1 & 1 & 1 \\ 1 & j & 1 & j \\ 1 & -1 & 1 & -1 \\ 1 & -j & 1 & -j \\ j & j & -j & -j \\ j & -1 & -j & 1 \\ j & -j & -j & j \\ j & 1 & -j & -1 \end{bmatrix}$ | $\frac{1}{S}\begin{bmatrix} 1 & 1 & 1 & 1 \\ j & -1 & j & -1 \\ -1 & 1 & -1 & 1 \\ -j & -1 & -j & -1 \\ 1 & 1 & -1 & -1 \\ j & -1 & -j & 1 \\ -1 & 1 & 1 & -1 \\ -j & -1 & j & 1 \end{bmatrix}$ | $\frac{1}{S}\begin{bmatrix} 1 & 1 & 1 & 1 \\ j & -1 & j & -1 \\ -1 & 1 & -1 & 1 \\ -j & -1 & -j & -1 \\ j & j & -j & -j \\ -1 & -j & 1 & j \\ -j & j & j & -j \\ 1 & -j & -1 & j \end{bmatrix}$ |
| | $[p_{2,1}, p_{3,1}, p_{2,-1}, p_{3,-1}]$ | $[p_{2,j}, p_{3,j}, p_{2,-j}, p_{3,-j}]$ | $[p_{3,1}, p_{0,1}, p_{3,-1}, p_{0,-1}]$ | $[p_{3,j}, p_{0,j}, p_{3,-j}, p_{0,-j}]$ |
| | $\frac{1}{S}\begin{bmatrix} 1 & 1 & 1 & 1 \\ -1 & -j & -1 & -j \\ 1 & -1 & 1 & -1 \\ -1 & j & -1 & j \\ 1 & 1 & -1 & -1 \\ -1 & -j & 1 & j \\ 1 & -1 & -1 & 1 \\ -1 & j & 1 & -j \end{bmatrix}$ | $\frac{1}{S}\begin{bmatrix} 1 & 1 & 1 & 1 \\ -1 & -j & -1 & -j \\ 1 & -1 & 1 & -1 \\ -1 & j & -1 & j \\ j & j & -j & -j \\ -j & 1 & j & -1 \\ j & -j & -j & j \\ -j & -1 & j & 1 \end{bmatrix}$ | $\frac{1}{S}\begin{bmatrix} 1 & 1 & 1 & 1 \\ -j & 1 & -j & 1 \\ -1 & 1 & -1 & 1 \\ j & 1 & j & 1 \\ 1 & 1 & -1 & -1 \\ -j & 1 & j & -1 \\ -1 & 1 & 1 & -1 \\ j & 1 & -j & -1 \end{bmatrix}$ | $\frac{1}{S}\begin{bmatrix} 1 & 1 & 1 & 1 \\ -j & 1 & -j & 1 \\ -1 & 1 & -1 & 1 \\ j & 1 & j & 1 \\ j & j & -j & -j \\ 1 & j & -1 & -j \\ j & -j & -j & j \\ -1 & j & 1 & -j \end{bmatrix}$ |
| 8-15 | $[p_{0,1}, p_{2,1}, p_{0,-1}, p_{2,-1}]$ | $[p_{0,j}, p_{2,j}, p_{0,-j}, p_{2,-j}]$ | $[p_{1,1}, p_{3,1}, p_{1,-1}, p_{3,-1}]$ | $[p_{1,j}, p_{3,j}, p_{1,-j}, p_{3,-j}]$ |
| | $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ 1 & 1 & -1 & -1 \\ 1 & -1 & -1 & 1 \\ 1 & 1 & -1 & -1 \\ 1 & -1 & -1 & 1 \end{bmatrix}$ | $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ j & j & -j & -j \\ j & -j & -j & j \\ j & j & -j & -j \\ j & -j & -j & j \end{bmatrix}$ | $\frac{1}{S}\begin{bmatrix} 1 & 1 & 1 & 1 \\ j & -j & -j & j \\ -1 & -1 & -1 & -1 \\ -j & j & -j & j \\ 1 & 1 & -1 & -1 \\ j & -j & -j & j \\ -1 & -1 & 1 & 1 \\ -j & j & j & -j \end{bmatrix}$ | $\frac{1}{S}\begin{bmatrix} 1 & 1 & 1 & 1 \\ j & -j & j & -j \\ -1 & -1 & -1 & -1 \\ -j & j & -j & j \\ j & j & -j & -j \\ j & j & -j & -j \\ -1 & 1 & 1 & -1 \\ 1 & -1 & -1 & 1 \end{bmatrix}$ |
| | $[p_{2,1}, p_{0,1}, p_{2,-1}, p_{0,-1}]$ | $[p_{2,j}, p_{0,j}, p_{2,-j}, p_{0,-j}]$ | $[p_{3,1}, p_{1,1}, p_{3,-1}, p_{1,-1}]$ | $[p_{3,j}, p_{0,j}, p_{1,-j}, p_{0,-j}]$ |
| | $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ 1 & 1 & -1 & -1 \\ -1 & 1 & 1 & -1 \\ 1 & 1 & -1 & -1 \\ -1 & 1 & 1 & -1 \end{bmatrix}$ | $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ j & j & -j & -j \\ -j & j & j & -j \\ j & j & -j & -j \\ -j & j & j & -j \end{bmatrix}$ | $\frac{1}{S}\begin{bmatrix} 1 & 1 & 1 & 1 \\ -j & j & -j & j \\ -1 & -1 & -1 & -1 \\ j & -j & j & -j \\ 1 & 1 & -1 & -1 \\ -j & j & j & -j \\ -1 & -1 & 1 & 1 \\ j & -j & -j & j \end{bmatrix}$ | $\frac{1}{S}\begin{bmatrix} 1 & 1 & 1 & 1 \\ -j & j & -j & j \\ -1 & -1 & -1 & -1 \\ j & -j & j & -j \\ j & j & -j & -j \\ j & j & -j & -j \\ 1 & -1 & -1 & 1 \\ -j & -j & -j & -j \end{bmatrix}$ |
| 16-23 | $[p_{0,1}, p_{3,1}, p_{0,-1}, p_{3,-1}]$ | $[p_{0,j}, p_{3,j}, p_{0,-j}, p_{3,-j}]$ | $[p_{1,1}, p_{0,1}, p_{1,-1}, p_{0,-1}]$ | $[p_{1,j}, p_{0,j}, p_{1,-j}, p_{0,-j}]$ |
| | $\frac{1}{S}\begin{bmatrix} 1 & 1 & 1 & 1 \\ 1 & -j & 1 & -j \\ 1 & -1 & 1 & -1 \\ 1 & j & 1 & j \\ 1 & 1 & -1 & -1 \\ 1 & -j & -1 & j \\ 1 & -1 & -1 & 1 \\ 1 & j & -1 & -j \end{bmatrix}$ | $\frac{1}{S}\begin{bmatrix} 1 & 1 & 1 & 1 \\ 1 & -j & 1 & -j \\ 1 & -1 & 1 & -1 \\ 1 & j & 1 & j \\ j & j & -j & -j \\ j & 1 & -j & -1 \\ j & -j & -j & j \\ j & -1 & -j & 1 \end{bmatrix}$ | $\frac{1}{S}\begin{bmatrix} 1 & 1 & 1 & 1 \\ j & 1 & j & 1 \\ -1 & 1 & -1 & 1 \\ -j & 1 & -j & 1 \\ 1 & 1 & -1 & -1 \\ j & 1 & -j & -1 \\ -1 & 1 & 1 & -1 \\ -j & 1 & j & -1 \end{bmatrix}$ | $\frac{1}{S}\begin{bmatrix} 1 & 1 & 1 & 1 \\ j & 1 & j & 1 \\ -1 & 1 & -1 & 1 \\ -j & 1 & -j & 1 \\ j & j & -j & -j \\ -1 & j & 1 & -j \\ -j & j & j & -j \\ 1 & j & -1 & -j \end{bmatrix}$ |
| | $[p_{2,1}, p_{1,1}, p_{2,-1}, p_{1,-1}]$ | $[p_{2,j}, p_{1,j}, p_{2,-j}, p_{1,-j}]$ | $[p_{3,1}, p_{2,1}, p_{3,-1}, p_{2,-1}]$ | $[p_{3,j}, p_{2,j}, p_{3,-j}, p_{2,-j}]$ |
| | $\frac{1}{S}\begin{bmatrix} 1 & 1 & 1 & 1 \\ -1 & j & -1 & j \\ 1 & -1 & 1 & -1 \\ -1 & -j & -1 & -j \\ 1 & 1 & -1 & -1 \\ -1 & j & 1 & -j \\ 1 & -1 & -1 & 1 \\ -1 & -j & 1 & j \end{bmatrix}$ | $\frac{1}{S}\begin{bmatrix} 1 & 1 & 1 & 1 \\ -1 & j & -1 & j \\ 1 & -1 & 1 & -1 \\ -1 & -j & -1 & -j \\ j & j & -j & -j \\ -j & -1 & j & 1 \\ j & -j & -j & j \\ -j & 1 & j & -1 \end{bmatrix}$ | $\frac{1}{S}\begin{bmatrix} 1 & 1 & 1 & 1 \\ -j & -1 & -j & -1 \\ -1 & 1 & -1 & 1 \\ j & -1 & j & -1 \\ 1 & 1 & -1 & -1 \\ -j & -1 & j & 1 \\ -1 & 1 & 1 & -1 \\ j & -1 & -j & 1 \end{bmatrix}$ | $\frac{1}{S}\begin{bmatrix} 1 & 1 & 1 & 1 \\ -j & -1 & -j & -1 \\ -1 & 1 & -1 & 1 \\ j & -1 & j & -1 \\ j & j & -j & -j \\ 1 & -j & -1 & j \\ -j & j & j & -j \\ -1 & -j & 1 & j \end{bmatrix}$ |

TABLE 43

| | Layout 2: $(N_1, N_2) = (2, 2)$ | | | |
|---|---|---|---|---|
| TPMI index | Precoder indicated by $(i_{1,1}, i_{1,2}, i_{1,3}, i_2)$ (ordered from left to right in increasing order of TPMI index) | | | |
| 0-7 | $[q_{0,1}, q_{1,1}, q_{0,-1}, q_{1,-1}]$ $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ 1 & 1 & -1 & -1 \\ 1 & -1 & -1 & 1 \\ 1 & 1 & -1 & -1 \\ 1 & -1 & -1 & 1 \end{bmatrix}$ | $[q_{0,j}, q_{1,j}, q_{0,-j}, q_{1,-j}]$ $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ j & j & -j & -j \\ j & -j & -j & j \\ j & j & -j & -j \\ j & -j & -j & j \end{bmatrix}$ | $[q_{1,1}, q_{2,1}, q_{1,-1}, q_{2,-1}]$ $\frac{1}{S}\begin{bmatrix} 1 & 1 & 1 & 1 \\ -1 & 1 & -1 & 1 \\ 1 & -1 & 1 & -1 \\ -1 & -1 & -1 & -1 \\ 1 & 1 & -1 & -1 \\ -1 & 1 & 1 & 1 \\ 1 & -1 & -1 & 1 \\ -1 & -1 & 1 & 1 \end{bmatrix}$ | $[q_{1,j}, q_{2,j}, q_{1,-j}, q_{2,-j}]$ $\frac{1}{S}\begin{bmatrix} 1 & 1 & 1 & 1 \\ -1 & 1 & -1 & 1 \\ 1 & -1 & 1 & -1 \\ -1 & -1 & -1 & -1 \\ j & j & -j & -j \\ -j & j & j & j \\ j & -j & -j & j \\ -j & -j & j & j \end{bmatrix}$ |
| | $[q_{2,1}, q_{3,1}, q_{2,-1}, q_{3,-1}]$ $\frac{1}{S}\begin{bmatrix} 1 & 1 & 1 & 1 \\ 1 & -1 & 1 & -1 \\ -1 & -1 & -1 & -1 \\ -1 & 1 & -1 & 1 \\ 1 & 1 & -1 & -1 \\ 1 & -1 & -1 & 1 \\ -1 & -1 & 1 & 1 \\ -1 & 1 & 1 & -1 \end{bmatrix}$ | $[q_{2,j}, q_{3,j}, q_{2,-j}, q_{3,-j}]$ $\frac{1}{S}\begin{bmatrix} 1 & 1 & 1 & 1 \\ 1 & -1 & 1 & -1 \\ -1 & -1 & -1 & -1 \\ -1 & 1 & -1 & 1 \\ j & j & -j & -j \\ j & -j & -j & j \\ -j & -j & j & j \\ -j & j & j & -j \end{bmatrix}$ | $[q_{3,1}, q_{0,1}, q_{3,-1}, q_{0,-1}]$ $\frac{1}{S}\begin{bmatrix} 1 & 1 & 1 & 1 \\ -1 & 1 & -1 & 1 \\ -1 & 1 & -1 & 1 \\ 1 & 1 & 1 & 1 \\ 1 & 1 & -1 & -1 \\ -1 & 1 & 1 & -1 \\ -1 & 1 & 1 & -1 \\ 1 & 1 & -1 & -1 \end{bmatrix}$ | $[q_{3,j}, q_{0,j}, q_{3,-j}, q_{0,-j}]$ $\frac{1}{S}\begin{bmatrix} 1 & 1 & 1 & 1 \\ -1 & 1 & -1 & 1 \\ -1 & 1 & -1 & 1 \\ 1 & 1 & 1 & 1 \\ j & j & -j & -j \\ -j & j & j & -j \\ -j & j & j & -j \\ j & j & -j & -j \end{bmatrix}$ |
| 8-15 | $[q_{0,1}, q_{2,1}, q_{0,-1}, q_{2,-1}]$ $\frac{1}{S}\begin{bmatrix} 1 & 1 & 1 & 1 \\ 1 & 1 & 1 & 1 \\ 1 & -1 & 1 & -1 \\ 1 & -1 & 1 & -1 \\ 1 & 1 & -1 & -1 \\ 1 & 1 & -1 & -1 \\ 1 & -1 & -1 & 1 \\ 1 & -1 & -1 & 1 \end{bmatrix}$ | $[q_{0,j}, q_{2,j}, q_{0,-j}, q_{2,-j}]$ $\frac{1}{S}\begin{bmatrix} 1 & 1 & 1 & 1 \\ 1 & 1 & 1 & 1 \\ 1 & -1 & 1 & -1 \\ 1 & -1 & 1 & -1 \\ j & j & -j & -j \\ j & j & -j & -j \\ j & -j & -j & j \\ j & -j & -j & j \end{bmatrix}$ | $[q_{1,1}, q_{3,1}, q_{1,-1}, q_{3,-1}]$ $\frac{1}{S}\begin{bmatrix} 1 & 1 & 1 & 1 \\ -1 & -1 & -1 & -1 \\ 1 & -1 & 1 & -1 \\ -1 & 1 & -1 & 1 \\ 1 & 1 & -1 & -1 \\ -1 & -1 & 1 & 1 \\ 1 & -1 & -1 & 1 \\ -1 & 1 & 1 & -1 \end{bmatrix}$ | $[q_{1,j}, q_{3,j}, q_{1,-j}, q_{3,-j}]$ $\frac{1}{S}\begin{bmatrix} 1 & 1 & 1 & 1 \\ -1 & -1 & -1 & -1 \\ 1 & -1 & 1 & -1 \\ -1 & 1 & -1 & 1 \\ j & j & -j & -j \\ -j & -j & j & j \\ -j & j & -j & j \\ -j & j & j & -j \end{bmatrix}$ |
| | $[q_{2,1}, q_{0,1}, q_{2,-1}, q_{0,-1}]$ $\frac{1}{S}\begin{bmatrix} 1 & 1 & 1 & 1 \\ 1 & 1 & 1 & 1 \\ -1 & 1 & -1 & 1 \\ -1 & 1 & -1 & 1 \\ 1 & 1 & -1 & -1 \\ 1 & 1 & -1 & -1 \\ -1 & 1 & 1 & -1 \\ -1 & 1 & 1 & -1 \end{bmatrix}$ | $[q_{2,j}, q_{0,j}, q_{2,-j}, q_{0,-j}]$ $\frac{1}{S}\begin{bmatrix} 1 & 1 & 1 & 1 \\ 1 & 1 & 1 & 1 \\ -1 & 1 & -1 & 1 \\ -1 & 1 & -1 & 1 \\ 1 & 1 & -1 & -1 \\ -1 & -1 & 1 & 1 \\ -1 & 1 & 1 & -1 \\ 1 & -1 & -1 & 1 \end{bmatrix}$ | $[q_{3,1}, q_{1,1}, q_{3,-1}, q_{1,-1}]$ $\frac{1}{S}\begin{bmatrix} 1 & 1 & 1 & 1 \\ -1 & -1 & -1 & -1 \\ -1 & 1 & -1 & 1 \\ 1 & -1 & 1 & -1 \\ 1 & -1 & -1 & 1 \\ j & j & -j & -j \\ -j & -j & j & j \\ -j & j & j & -j \end{bmatrix}$ | $[q_{3,j}, q_{0,j}, q_{1,-j}, q_{0,-j}]$ $\frac{1}{S}\begin{bmatrix} 1 & 1 & 1 & 1 \\ 1 & -1 & 1 & -1 \\ 1 & -1 & 1 & -1 \\ 1 & 1 & 1 & 1 \\ 1 & 1 & -1 & -1 \\ 1 & -1 & -1 & 1 \\ 1 & -1 & -1 & 1 \\ 1 & 1 & -1 & -1 \end{bmatrix}$ |
| 16-23 | $[q_{0,1}, q_{3,1}, q_{0,-1}, q_{3,-1}]$ $\frac{1}{S}\begin{bmatrix} 1 & 1 & 1 & 1 \\ 1 & -1 & 1 & -1 \\ 1 & -1 & 1 & -1 \\ 1 & 1 & 1 & 1 \\ j & j & -j & -j \\ j & -j & -j & j \\ j & -j & -j & j \\ j & j & -j & -j \end{bmatrix}$ | $[q_{0,j}, q_{3,j}, q_{0,-j}, q_{3,-j}]$ $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ 1 & 1 & -1 & -1 \\ -1 & 1 & 1 & -1 \\ 1 & 1 & -1 & -1 \\ -1 & 1 & 1 & -1 \end{bmatrix}$ | $[q_{1,1}, q_{0,1}, q_{1,-1}, q_{0,-1}]$ $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ 1 & 1 & -1 & -1 \\ -1 & 1 & 1 & -1 \\ 1 & 1 & -1 & -1 \\ -1 & 1 & 1 & -1 \end{bmatrix}$ | $[q_{1,j}, q_{0,j}, q_{1,-j}, q_{0,-j}]$ $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ j & j & -j & -j \\ -j & j & j & -j \\ j & j & -j & -j \\ -j & j & j & -j \end{bmatrix}$ |
| | $[q_{2,1}, q_{1,1}, q_{2,-1}, q_{1,-1}]$ $\frac{1}{S}\begin{bmatrix} 1 & 1 & 1 & 1 \\ 1 & -1 & 1 & -1 \\ -1 & 1 & -1 & 1 \\ -1 & -1 & -1 & -1 \\ 1 & 1 & -1 & -1 \\ 1 & -1 & -1 & 1 \\ -1 & 1 & 1 & -1 \\ -1 & -1 & 1 & 1 \end{bmatrix}$ | $[q_{2,j}, q_{1,j}, q_{2,-j}, q_{1,-j}]$ $\frac{1}{S}\begin{bmatrix} 1 & 1 & 1 & 1 \\ 1 & -1 & 1 & -1 \\ -1 & 1 & -1 & 1 \\ -1 & -1 & -1 & -1 \\ j & j & -j & -j \\ j & -j & -j & j \\ -j & j & j & -j \\ -j & -j & j & j \end{bmatrix}$ | $[q_{3,1}, q_{2,1}, q_{3,-1}, q_{2,-1}]$ $\frac{1}{S}\begin{bmatrix} 1 & 1 & 1 & 1 \\ -1 & 1 & -1 & 1 \\ -1 & -1 & -1 & -1 \\ 1 & -1 & 1 & -1 \\ 1 & 1 & -1 & -1 \\ -1 & 1 & 1 & -1 \\ -1 & -1 & 1 & 1 \\ 1 & -1 & -1 & 1 \end{bmatrix}$ | $[q_{3,j}, q_{2,j}, q_{3,-j}, q_{2,-j}]$ $\frac{1}{S}\begin{bmatrix} 1 & 1 & 1 & 1 \\ -1 & 1 & -1 & 1 \\ -1 & -1 & -1 & -1 \\ 1 & -1 & 1 & -1 \\ j & j & -j & -j \\ -j & j & j & -j \\ -j & -j & j & j \\ j & -j & -j & j \end{bmatrix}$ |

TABLE 44

Layout 1: $(N_1, N_2) = (4, 1)$

| TPMI index | Precoder indicated by $(i_{1,1}, i_{1,2}, i_2)$ (ordered from left to right in increasing order of TPMI index) | | | |
|---|---|---|---|---|
| 0-3 | $[p_{0,1}, p_{0,-1}, p_{1,1}, p_{1,-1}, p_{2,1}]$ $\frac{1}{S}\begin{bmatrix} 1 & 1 & 1 & 1 & 1 \\ 1 & 1 & j & j & -1 \\ 1 & 1 & -1 & -1 & 1 \\ 1 & 1 & -j & -j & -1 \\ 1 & -1 & 1 & -1 & 1 \\ 1 & -1 & j & -j & -1 \\ 1 & -1 & -1 & 1 & 1 \\ 1 & -1 & -j & j & -1 \end{bmatrix}$ | $[p_{0,j}, p_{0,-j}, p_{1,1}, p_{1,-1}, p_{2,1}]$ $\frac{1}{S}\begin{bmatrix} 1 & 1 & 1 & 1 & 1 \\ 1 & 1 & j & j & -1 \\ 1 & 1 & -1 & -1 & 1 \\ 1 & 1 & -j & -j & -1 \\ j & -j & 1 & -1 & 1 \\ j & -j & j & -j & -1 \\ j & -j & -1 & 1 & 1 \\ j & -j & -j & j & -1 \end{bmatrix}$ | $[p_{1,1}, p_{1,-1}, p_{2,1}, p_{2,-1}, p_{3,1}]$ $\frac{1}{S}\begin{bmatrix} 1 & 1 & 1 & 1 & 1 \\ j & j & -1 & -1 & -j \\ -1 & -1 & 1 & 1 & -1 \\ -j & -j & -1 & -1 & j \\ 1 & -1 & 1 & -1 & 1 \\ j & -j & -1 & 1 & -j \\ -1 & 1 & 1 & -1 & -1 \\ -j & j & -1 & 1 & j \end{bmatrix}$ | $[p_{1,j}, p_{1,-j}, p_{2,1}, p_{2,-1}, p_{3,1}]$ $\frac{1}{S}\begin{bmatrix} 1 & 1 & 1 & 1 & 1 \\ j & j & -1 & -1 & -j \\ -1 & -1 & 1 & 1 & -1 \\ -j & -j & -1 & -1 & 1 \\ j & -j & 1 & -1 & 1 \\ -1 & 1 & -1 & 1 & -j \\ -j & j & 1 & -1 & -1 \\ 1 & -1 & -1 & 1 & j \end{bmatrix}$ |
| 4-7 | $[p_{2,1}, p_{2,-1}, p_{3,1}, p_{3,-1}, p_{0,1}]$ $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ 1 & -1 & 1 & -1 & 1 \\ -1 & 1 & -j & j & 1 \\ 1 & -1 & -1 & 1 & 1 \\ -1 & 1 & j & -j & 1 \end{bmatrix}$ | $[p_{2,j}, p_{2,-j}, p_{3,1}, p_{3,-1}, p_{0,1}]$ $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ j & -j & 1 & -1 & 1 \\ -j & j & -j & j & 1 \\ j & -j & -1 & 1 & 1 \\ -j & j & j & -j & 1 \end{bmatrix}$ | $[p_{3,1}, p_{3,-1}, p_{0,1}, p_{0,-1}, p_{1,1}]$ $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ 1 & -1 & 1 & -1 & 1 \\ -j & j & 1 & -1 & j \\ -1 & 1 & 1 & -1 & -1 \\ j & -j & 1 & -1 & -j \end{bmatrix}$ | $[p_{3,j}, p_{3,-j}, p_{0,1}, p_{0,-1}, p_{1,1}]$ $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ j & -j & 1 & -1 & 1 \\ 1 & -1 & 1 & -1 & j \\ -j & j & 1 & -1 & -1 \\ -1 & 1 & 1 & -1 & -j \end{bmatrix}$ |

TABLE 45

Layout 2: $(N_1, N_2) = (2, 2)$

| TPMI index | Precoder indicated by $(i_{1,1}, i_{1,2}, i_2)$ (ordered from left to right in increasing order of TPMI index) | | | |
|---|---|---|---|---|
| 0-3 | $[q_{0,1}, q_{0,-1}, q_{1,1}, q_{1,-1}, q_{2,1}]$ $\frac{1}{S}\begin{bmatrix} 1 & 1 & 1 & 1 & 1 \\ 1 & 1 & -1 & -1 & 1 \\ 1 & 1 & 1 & 1 & -1 \\ 1 & 1 & -1 & -1 & -1 \\ 1 & -1 & 1 & -1 & 1 \\ 1 & -1 & -1 & 1 & 1 \\ 1 & -1 & 1 & -1 & -1 \\ 1 & -1 & -1 & 1 & -1 \end{bmatrix}$ | $[q_{0,j}, q_{0,-j}, q_{1,1}, q_{1,-1}, q_{2,1}]$ $\frac{1}{S}\begin{bmatrix} 1 & 1 & 1 & 1 & 1 \\ 1 & 1 & -1 & -1 & 1 \\ 1 & 1 & 1 & 1 & -1 \\ 1 & 1 & -1 & -1 & -1 \\ j & -j & 1 & -1 & 1 \\ j & -j & -1 & 1 & 1 \\ j & -j & 1 & -1 & -1 \\ j & -j & -1 & 1 & -1 \end{bmatrix}$ | $[q_{1,1}, q_{1,-1}, q_{2,1}, q_{2,-1}, q_{3,1}]$ $\frac{1}{S}\begin{bmatrix} 1 & 1 & 1 & 1 & 1 \\ -1 & -1 & 1 & 1 & -1 \\ 1 & 1 & -1 & -1 & 1 \\ -1 & -1 & -1 & -1 & 1 \\ 1 & -1 & 1 & -1 & 1 \\ -1 & 1 & 1 & -1 & -1 \\ 1 & -1 & -1 & 1 & -1 \\ -1 & 1 & -1 & 1 & 1 \end{bmatrix}$ | $[q_{1,j}, q_{1,-j}, q_{2,1}, q_{2,-1}, q_{3,1}]$ $\frac{1}{S}\begin{bmatrix} 1 & 1 & 1 & 1 & 1 \\ -1 & -1 & 1 & 1 & -1 \\ 1 & 1 & -1 & -1 & 1 \\ -1 & -1 & -1 & -1 & 1 \\ j & -j & 1 & -1 & 1 \\ -j & j & 1 & -1 & -1 \\ j & -j & -1 & 1 & -1 \\ -j & j & -1 & 1 & 1 \end{bmatrix}$ |
| 4-7 | $[q_{2,1}, q_{2,-1}, q_{3,1}, q_{3,-1}, q_{0,1}]$ $\frac{1}{S}\begin{bmatrix} 1 & 1 & 1 & 1 & 1 \\ 1 & 1 & -1 & -1 & 1 \\ -1 & -1 & -1 & -1 & 1 \\ -1 & -1 & 1 & 1 & 1 \\ 1 & -1 & j & -j & 1 \\ 1 & -1 & -j & j & 1 \\ -1 & 1 & j & -j & 1 \\ -1 & 1 & -j & j & 1 \end{bmatrix}$ | $[q_{2,j}, q_{2,-j}, q_{3,1}, q_{3,-1}, q_{0,1}]$ $\frac{1}{S}\begin{bmatrix} 1 & 1 & 1 & 1 & 1 \\ 1 & 1 & -1 & -1 & 1 \\ -1 & -1 & -1 & -1 & 1 \\ -1 & -1 & 1 & 1 & 1 \\ j & -j & j & -j & 1 \\ j & -j & -j & j & 1 \\ -j & j & j & -j & 1 \\ -j & j & -j & j & 1 \end{bmatrix}$ | $[q_{3,1}, q_{3,-1}, q_{0,1}, q_{0,-1}, q_{1,1}]$ $\frac{1}{S}\begin{bmatrix} 1 & 1 & 1 & 1 & 1 \\ -1 & 1 & 1 & 1 & -1 \\ -1 & -1 & 1 & 1 & 1 \\ 1 & 1 & 1 & 1 & -1 \\ 1 & -1 & 1 & -1 & 1 \\ -1 & 1 & 1 & -1 & -1 \\ -1 & 1 & 1 & -1 & 1 \\ 1 & -1 & 1 & -1 & -1 \end{bmatrix}$ | $[q_{3,j}, q_{3,-j}, q_{0,1}, q_{0,-1}, q_{1,1}]$ $\frac{1}{S}\begin{bmatrix} 1 & 1 & 1 & 1 & 1 \\ -1 & -1 & 1 & 1 & -1 \\ -1 & -1 & 1 & 1 & 1 \\ 1 & 1 & 1 & 1 & -1 \\ j & -j & j & -j & 1 \\ -j & j & j & -j & -1 \\ -j & j & j & -j & 1 \\ j & -j & j & -j & -1 \end{bmatrix}$ |

TABLE 46

Layout 1: $(N_1, N_2) = (4, 1)$

| TPMI index | Precoder indicated by $(i_{1,1}, i_{1,2}, i_2)$ (ordered from left to right in increasing order of TPMI index) | | | |
|---|---|---|---|---|
| 0-3 | $[p_{0,1}, p_{0,-1}, p_{1,1}, p_{1,-1}, p_{2,1}, p_{2,-1}]$ | $[p_{0,j}, p_{0,-j}, p_{1,j}, p_{1,-j}, p_{2,1}, p_{2,-1}]$ | $[p_{1,1}, p_{1,-1}, p_{2,1}, p_{2,-1}, p_{3,1}, p_{3,-1}]$ | $[p_{1,j}, p_{1,-j}, p_{2,j}, p_{2,-j}, p_{3,1}, p_{3,-1}]$ |
| | $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ 1 & -1 & 1 & -1 & 1 & -1 \\ 1 & -1 & j & -j & -1 & 1 \\ 1 & -1 & -1 & 1 & 1 & -1 \\ 1 & -1 & -j & j & -1 & 1 \end{bmatrix}$ | $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ j & -j & j & -j & 1 & -1 \\ j & -j & -1 & 1 & -1 & 1 \\ j & -j & -j & j & 1 & -1 \\ j & -j & 1 & -1 & -1 & 1 \end{bmatrix}$ | $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ 1 & -1 & 1 & -1 & 1 & -1 \\ j & -j & -1 & 1 & -j & j \\ -1 & 1 & 1 & -1 & -1 & 1 \\ -j & j & -1 & 1 & j & -j \end{bmatrix}$ | $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ j & -j & j & -j & 1 & -1 \\ -1 & 1 & -j & j & -j & j \\ -j & j & j & -j & -1 & 1 \\ 1 & -1 & -j & j & 1 & -j \end{bmatrix}$ |
| 4-7 | $[p_{2,1}, p_{2,-1}, p_{3,1}, p_{3,-1}, p_{0,1}, p_{0,-1}]$ | $[p_{2,j}, p_{2,-j}, p_{3,j}, p_{3,-j}, p_{0,1}, p_{0,-1}]$ | $[p_{3,1}, p_{3,-1}, p_{0,1}, p_{0,-1}, p_{1,1}, p_{1,-1}]$ | $[p_{3,j}, p_{3,-j}, p_{0,j}, p_{0,-j}, p_{1,1}, p_{1,-1}]$ |
| | $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ 1 & -1 & 1 & -1 & 1 & -1 \\ -1 & 1 & -j & j & 1 & -1 \\ 1 & -1 & -1 & 1 & 1 & -1 \\ -1 & 1 & j & -j & 1 & -1 \end{bmatrix}$ | $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ j & -j & j & -j & 1 & -1 \\ -j & j & 1 & -1 & 1 & -1 \\ j & -j & -j & j & 1 & -1 \\ -j & j & -1 & 1 & 1 & -1 \end{bmatrix}$ | $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ 1 & -1 & 1 & -1 & 1 & -1 \\ -j & j & 1 & -1 & j & -j \\ -1 & 1 & 1 & -1 & -1 & 1 \\ j & -j & 1 & -1 & -j & j \end{bmatrix}$ | $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ j & -j & j & -j & 1 & -1 \\ 1 & - & j & -j & j & -j \\ -j & -j & j & -j & -1 & 1 \\ -1 & 1 & j & -j & -j & j \end{bmatrix}$ |

TABLE 47

Layout 2: $(N_1, N_2) = (2, 2)$

| TPMI index | Precoder indicated by $(i_{1,1}, i_{1,2}, i_2)$ (ordered from left to right in increasing order of TPMI index) | | | |
|---|---|---|---|---|
| 0-3 | $[q_{0,1}, q_{0,-1}, q_{1,1}, q_{1,-1}, q_{2,1}, q_{2,-1}]$ | $[q_{0,j}, q_{0,-j}, q_{1,j}, q_{1,-j}, q_{2,1}, q_{2,-1}]$ | $[q_{1,1}, q_{1,-1}, q_{2,1}, q_{2,-1}, q_{3,1}, q_{3,-1}]$ | $[q_{1,j}, q_{1,-j}, q_{2,j}, q_{2,-j}, q_{3,1}, q_{3,-1}]$ |
| | $\frac{1}{S}\begin{bmatrix} 1 & 1 & 1 & 1 & 1 & 1 \\ 1 & 1 & -1 & -1 & 1 & 1 \\ 1 & 1 & 1 & 1 & -1 & -1 \\ 1 & 1 & -1 & -1 & -1 & -1 \\ 1 & -1 & 1 & -1 & 1 & -1 \\ 1 & -1 & -1 & 1 & 1 & -1 \\ 1 & -1 & 1 & -1 & -1 & 1 \\ 1 & -1 & -1 & 1 & -1 & 1 \end{bmatrix}$ | $\frac{1}{S}\begin{bmatrix} 1 & 1 & 1 & 1 & 1 & 1 \\ 1 & 1 & -1 & -1 & 1 & 1 \\ 1 & 1 & 1 & 1 & -1 & -1 \\ 1 & 1 & -1 & -1 & -1 & -1 \\ j & -j & j & -j & 1 & -1 \\ j & -j & -j & j & 1 & -1 \\ j & -j & j & -j & -1 & 1 \\ j & -j & -j & j & -1 & 1 \end{bmatrix}$ | $\frac{1}{S}\begin{bmatrix} 1 & 1 & 1 & 1 & 1 & 1 \\ -1 & -1 & 1 & 1 & -1 & -1 \\ 1 & 1 & -1 & -1 & -1 & -1 \\ -1 & -1 & -1 & -1 & 1 & 1 \\ 1 & -1 & 1 & -1 & 1 & -1 \\ -1 & 1 & 1 & -1 & -1 & 1 \\ 1 & -1 & -1 & 1 & -1 & 1 \\ -1 & 1 & -1 & 1 & -1 & -1 \end{bmatrix}$ | $\frac{1}{S}\begin{bmatrix} 1 & 1 & 1 & 1 & 1 & 1 \\ -1 & -1 & 1 & 1 & -1 & -1 \\ 1 & 1 & -1 & -1 & -1 & -1 \\ -1 & -1 & -1 & -1 & 1 & 1 \\ j & -j & j & -j & 1 & -1 \\ -j & j & j & -j & -1 & 1 \\ j & -j & -j & j & -1 & 1 \\ -j & j & -j & j & 1 & -1 \end{bmatrix}$ |
| 4-7 | $[q_{2,1}, q_{2,-1}, q_{3,1}, q_{3,-1}, q_{0,1}, q_{0,-1}]$ | $[q_{2,j}, q_{2,-j}, q_{3,j}, q_{3,-j}, q_{0,1}, q_{0,-1}]$ | $[q_{3,1}, q_{3,-1}, q_{0,1}, q_{0,-1}, q_{1,1}, q_{1,-1}]$ | $[q_{3,j}, q_{3,-j}, q_{0,j}, q_{0,-j}, q_{1,1}, q_{1,-1}]$ |
| | $\frac{1}{S}\begin{bmatrix} 1 & 1 & 1 & 1 & 1 & 1 \\ 1 & 1 & -1 & -1 & 1 & 1 \\ -1 & -1 & -1 & -1 & 1 & 1 \\ -1 & -1 & 1 & 1 & 1 & 1 \\ 1 & -1 & 1 & -1 & 1 & -1 \\ 1 & -1 & -1 & 1 & 1 & -1 \\ -1 & 1 & -1 & 1 & 1 & -1 \\ -1 & 1 & 1 & -1 & 1 & -1 \end{bmatrix}$ | $\frac{1}{S}\begin{bmatrix} 1 & 1 & 1 & 1 & 1 & 1 \\ 1 & 1 & -1 & -1 & 1 & 1 \\ -1 & -1 & -1 & -1 & 1 & 1 \\ -1 & -1 & 1 & 1 & 1 & 1 \\ j & -j & j & -j & 1 & -1 \\ j & -j & -j & j & 1 & -1 \\ -j & j & -j & j & 1 & -1 \\ -j & j & j & -j & 1 & -1 \end{bmatrix}$ | $\frac{1}{S}\begin{bmatrix} 1 & 1 & 1 & 1 & 1 & 1 \\ -1 & -1 & 1 & 1 & -1 & -1 \\ -1 & -1 & 1 & 1 & 1 & 1 \\ 1 & 1 & 1 & 1 & -1 & -1 \\ 1 & -1 & 1 & -1 & 1 & -1 \\ -1 & 1 & 1 & -1 & -1 & 1 \\ -1 & 1 & -1 & 1 & -1 & 1 \\ 1 & -1 & -1 & 1 & -1 & 1 \end{bmatrix}$ | $\frac{1}{S}\begin{bmatrix} 1 & 1 & 1 & 1 & 1 & 1 \\ -1 & -1 & 1 & 1 & -1 & -1 \\ -1 & -1 & 1 & 1 & 1 & 1 \\ 1 & 1 & 1 & 1 & -1 & -1 \\ j & -j & j & -j & 1 & -1 \\ -j & j & j & -j & -1 & 1 \\ -j & j & -j & j & -1 & 1 \\ j & -j & -j & j & -1 & 1 \end{bmatrix}$ |

TABLE 48

Layout 1: $(N_1, N_2) = (4, 1)$

| TPMI index | Precoder indicated by $(i_{1,1}, i_{1,2}, i_2)$ (ordered from left to right in increasing order of TPMI index) |
|---|---|
| 0-3 | $[p_{0,1}, p_{0,-1}, p_{1,1}, p_{2,1}, p_{2,-1}, p_{3,1}, p_{3,-1}]$    $[p_{0,j}, p_{0,-j}, p_{1,j}, p_{2,1}, p_{2,-1}, p_{3,1}, p_{3,-1}]$ |

$$\frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ 1 & -1 & 1 & 1 & -1 & 1 & -1 \\ 1 & -1 & j & -1 & 1 & -j & j \\ 1 & -1 & -1 & 1 & -1 & -1 & 1 \\ 1 & -1 & -j & -1 & 1 & j & -j \end{bmatrix} \quad \frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ j & -j & j & 1 & -1 & 1 & -1 \\ j & -j & -1 & -1 & 1 & -j & j \\ j & -j & -j & 1 & -1 & -1 & 1 \\ j & -j & 1 & -1 & 1 & j & -j \end{bmatrix}$$

$[p_{1,1}, p_{1,-1}, p_{2,1}, p_{3,1}, p_{3,-1}, p_{0,1}, p_{0,-1}]$    $[p_{1,j}, p_{1,-j}, p_{2,j}, p_{3,1}, p_{3,-1}, p_{0,1}, p_{0,-1}]$ $$\frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ 1 & -1 & 1 & 1 & -1 & 1 & -1 \\ j & -j & -1 & -j & j & 1 & -1 \\ -1 & 1 & 1 & -1 & 1 & 1 & -1 \\ -j & j & -1 & j & -j & 1 & -1 \end{bmatrix} \quad \frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ j & -j & j & 1 & -1 & 1 & -1 \\ -1 & 1 & -j & -j & j & 1 & -1 \\ -j & j & j & -1 & 1 & 1 & -1 \\ 1 & -1 & -j & j & -j & 1 & -1 \end{bmatrix}$$

TABLE 49

Layout 2: $(N_1, N_2) = (2, 2)$

| TPMI index | Precoder indicated by $(i_{1,1}, i_{1,2}, i_2)$ (ordered from left to right in increasing order of TPMI index) |
|---|---|
| 0-3 | $[q_{0,1}, q_{0,-1}, q_{1,1}, q_{1,-1}, q_{2,1}, q_{2,-1}, q_{3,1}, q_{3,-1}]$    $[q_{0,j}, q_{0,-j}, q_{1,j}, q_{1,-j}, q_{2,1}, q_{2,-1}, q_{3,1}, q_{3,-1}]$ |

$$\frac{1}{S}\begin{bmatrix} 1 & 1 & 1 & 1 & 1 & 1 & 1 \\ 1 & 1 & -1 & 1 & 1 & -1 & -1 \\ 1 & 1 & 1 & -1 & -1 & -1 & -1 \\ 1 & 1 & -1 & -1 & -1 & 1 & 1 \\ 1 & -1 & 1 & 1 & -1 & 1 & -1 \\ 1 & -1 & -1 & 1 & -1 & -1 & 1 \\ 1 & -1 & 1 & -1 & 1 & -1 & 1 \\ 1 & -1 & -1 & -1 & 1 & 1 & -1 \end{bmatrix} \quad \frac{1}{S}\begin{bmatrix} 1 & 1 & 1 & 1 & 1 & 1 & 1 \\ 1 & 1 & -1 & 1 & 1 & -1 & -1 \\ 1 & 1 & 1 & -1 & -1 & -1 & -1 \\ 1 & 1 & -1 & -1 & -1 & 1 & 1 \\ j & -j & j & 1 & -1 & 1 & -1 \\ j & -j & -j & 1 & -1 & -1 & 1 \\ j & -j & j & -1 & 1 & -1 & 1 \\ j & -j & -j & -1 & 1 & 1 & -1 \end{bmatrix}$$

$[q_{1,1}, q_{1,-1}, q_{2,1}, q_{2,-1}, q_{3,1}, q_{3,-1}, q_{0,1}, q_{0,-1}]$    $[q_{1,j}, q_{1,-j}, q_{2,j}, q_{2,-j}, q_{3,1}, q_{3,-1}, q_{0,1}, q_{0,-1}]$ $$\frac{1}{S}\begin{bmatrix} 1 & 1 & 1 & 1 & 1 & 1 & 1 \\ -1 & -1 & 1 & -1 & -1 & 1 & 1 \\ 1 & 1 & -1 & -1 & -1 & 1 & 1 \\ -1 & -1 & -1 & 1 & 1 & 1 & 1 \\ 1 & -1 & 1 & 1 & -1 & 1 & -1 \\ -1 & 1 & 1 & -1 & 1 & 1 & -1 \\ 1 & -1 & -1 & -1 & 1 & 1 & -1 \\ -1 & 1 & -1 & 1 & -1 & 1 & -1 \end{bmatrix} \quad \frac{1}{S}\begin{bmatrix} 1 & 1 & 1 & 1 & 1 & 1 & 1 \\ -1 & -1 & 1 & -1 & -1 & 1 & 1 \\ 1 & 1 & -1 & -1 & -1 & 1 & 1 \\ -1 & -1 & -1 & 1 & 1 & 1 & 1 \\ j & -j & j & 1 & -1 & 1 & -1 \\ -j & j & j & -1 & 1 & 1 & -1 \\ j & -j & -j & -1 & 1 & 1 & -1 \\ -j & j & -j & 1 & -1 & 1 & -1 \end{bmatrix}$$

4-7    $[q_{2,1}, q_{2,-1}, q_{3,1}, q_{3,-1}, q_{0,1}, q_{0,-1}, q_{1,1}, q_{1,-1}]$    $[q_{2,j}, q_{2,-j}, q_{3,j}, q_{3,-j}, q_{0,1}, q_{0,-1}, q_{1,1}, q_{1,-1}]$ $$\frac{1}{S}\begin{bmatrix} 1 & 1 & 1 & 1 & 1 & 1 & 1 \\ 1 & 1 & -1 & 1 & 1 & -1 & -1 \\ -1 & -1 & -1 & 1 & 1 & 1 & 1 \\ -1 & -1 & 1 & 1 & 1 & -1 & -1 \\ 1 & -1 & 1 & 1 & -1 & 1 & -1 \\ 1 & -1 & -1 & 1 & -1 & -1 & 1 \\ -1 & 1 & -1 & 1 & -1 & 1 & -1 \\ -1 & 1 & 1 & 1 & -1 & -1 & 1 \end{bmatrix} \quad \frac{1}{S}\begin{bmatrix} 1 & 1 & 1 & 1 & 1 & 1 & 1 \\ 1 & 1 & -1 & 1 & 1 & -1 & -1 \\ -1 & -1 & -1 & 1 & 1 & 1 & 1 \\ -1 & -1 & 1 & 1 & 1 & -1 & -1 \\ j & -j & j & 1 & -1 & 1 & -1 \\ j & -j & -j & 1 & -1 & -1 & 1 \\ -j & j & -j & 1 & -1 & 1 & -1 \\ -j & j & j & 1 & -1 & -1 & 1 \end{bmatrix}$$

TABLE 49-continued

Layout 2: $(N_1, N_2) = (2, 2)$

| TPMI index | Precoder indicated by $(i_{1,1}, i_{1,2}, i_2)$ (ordered from left to right in increasing order of TPMI index) | |
|---|---|---|
| | $[q_{3,1}, q_{3,-1}, q_{0,1}, q_{0,-1}, q_{1,1}, q_{1,-1}, q_{2,1}, q_{2,-1}]$ | $[q_{3,j}, q_{3,-j}, q_{0,j}, q_{0,-j}, q_{1,1}, q_{1,-1}, q_{2,1}, q_{2,-1}]$ |
| | $\frac{1}{S}\begin{bmatrix} 1 & 1 & 1 & 1 & 1 & 1 & 1 & 1 \\ -1 & -1 & 1 & -1 & -1 & 1 & 1 & 1 \\ -1 & -1 & 1 & 1 & 1 & -1 & -1 \\ 1 & 1 & 1 & -1 & -1 & -1 & -1 \\ 1 & -1 & 1 & 1 & -1 & 1 & 1 & -1 \\ -1 & 1 & 1 & -1 & 1 & 1 & -1 \\ -1 & 1 & 1 & 1 & -1 & -1 & 1 \\ 1 & -1 & 1 & -1 & 1 & -1 & 1 \end{bmatrix}$ | $\frac{1}{S}\begin{bmatrix} 1 & 1 & 1 & 1 & 1 & 1 & 1 & 1 \\ -1 & -1 & 1 & -1 & -1 & 1 & 1 & 1 \\ -1 & -1 & 1 & 1 & 1 & -1 & -1 \\ 1 & 1 & 1 & -1 & -1 & -1 & -1 \\ j & -j & j & 1 & -1 & 1 & 1 & -1 \\ -j & j & j & -1 & 1 & 1 & -1 \\ -j & j & j & 1 & -1 & -1 & 1 \\ j & -j & j & -1 & 1 & -1 & 1 \end{bmatrix}$ |

TABLE 50

Layout 1: $(N_1, N_2) = (4, 1)$

| TPMI index | Precoder indicated by $(i_{1,1}, i_{1,2}, i_2)$ (ordered from left to right in increasing order of TPMI index) | |
|---|---|---|
| 0-3 | $[p_{0,1}, p_{0,-1}, p_{1,1}, p_{1,-1}, p_{2,1}, p_{2,-1}, p_{3,1}, p_{3,-1}]$ | $[p_{0,j}, p_{0,-j}, p_{1,j}, p_{1,-j}, p_{2,1}, p_{2,-1}, p_{3,1}, p_{3,-1}]$ |
| | $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ 1 & -1 & 1 & -1 & 1 & -1 & 1 & -1 \\ 1 & -1 & j & -j & -1 & 1 & -j & j \\ 1 & -1 & -1 & 1 & 1 & -1 & -1 & 1 \\ 1 & -1 & -j & j & -1 & 1 & j & -j \end{bmatrix}$ (R1) | $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ j & -j & j & -j & 1 & -1 & 1 & -1 \\ j & -j & -1 & 1 & -1 & 1 & -j & j \\ j & -j & -j & j & 1 & -1 & -1 & 1 \\ j & -j & 1 & -1 & -1 & 1 & j & -j \end{bmatrix}$ |
| | $[p_{1,1}, p_{1,-1}, p_{2,1}, p_{2,-1}, p_{3,1}, p_{3,-1}, p_{0,1}, p_{0,-1}]$ | $[p_{1,j}, p_{1,-j}, p_{2,j}, p_{2,-j}, p_{3,1}, p_{3,-1}, p_{0,1}, p_{0,-1}]$ |
| | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ 1 & -1 & 1 & -1 & 1 & -1 & 1 & -1 \\ j & -j & -1 & 1 & -j & j & 1 & -1 \\ -1 & 1 & 1 & -1 & -1 & 1 & 1 & -1 \\ -j & j & -1 & 1 & j & -j & 1 & -1 \end{bmatrix}$ (R1) | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ j & -j & j & -j & 1 & -1 & 1 & -1 \\ -1 & 1 & -j & j & -j & j & 1 & -1 \\ -j & j & -j & j & -1 & 1 & 1 & -1 \\ 1 & -1 & -j & j & j & -j & 1 & -1 \end{bmatrix}$ |

TABLE 51

Layout 2: $(N_1, N_2) = (2, 2)$

| TPMI index | Precoder indicated by $(i_{1,1}, i_{1,2}, i_2)$ (ordered from left to right in increasing order of TPMI index) | |
|---|---|---|
| 0-3 | $[q_{0,1}, q_{0,-1}, q_{1,1}, q_{1,-1}, q_{2,1}, q_{2,-1}, q_{3,1}, q_{3,-1}]$ | $[q_{0,j}, q_{0,-j}, q_{1,j}, q_{1,-j}, q_{2,1}, q_{2,-1}, q_{3,1}, q_{3,-1}]$ |
| | $\frac{1}{S}\begin{bmatrix} 1 & 1 & 1 & 1 & 1 & 1 & 1 & 1 \\ 1 & 1 & -1 & -1 & 1 & 1 & -1 & -1 \\ 1 & 1 & 1 & 1 & -1 & -1 & -1 & -1 \\ 1 & 1 & -1 & -1 & -1 & -1 & 1 & 1 \\ 1 & -1 & 1 & -1 & 1 & -1 & 1 & -1 \\ 1 & -1 & -1 & 1 & 1 & -1 & -1 & 1 \\ 1 & -1 & 1 & -1 & -1 & 1 & -1 & 1 \\ 1 & -1 & -1 & 1 & -1 & 1 & 1 & -1 \end{bmatrix}$ (R1) | $\frac{1}{S}\begin{bmatrix} 1 & 1 & 1 & 1 & 1 & 1 & 1 & 1 \\ 1 & 1 & -1 & -1 & 1 & 1 & -1 & -1 \\ 1 & 1 & 1 & 1 & -1 & -1 & -1 & -1 \\ 1 & 1 & -1 & -1 & -1 & -1 & 1 & 1 \\ j & -j & j & -j & 1 & -1 & 1 & -1 \\ j & -j & -j & j & 1 & -1 & -1 & 1 \\ j & -j & j & -j & -1 & 1 & -1 & 1 \\ j & -j & -j & j & -1 & 1 & 1 & -1 \end{bmatrix}$ |

TABLE 51-continued

Layout 2: $(N_1, N_2) = (2, 2)$

| TPMI index | Precoder indicated by $(i_{1,1}, i_{1,2}, i_2)$ (ordered from left to right in increasing order of TPMI index) |
|---|---|
| 4-7 | $[q_{1,1}, q_{1,-1}, q_{2,1}, q_{2,-1}, q_{3,1}, q_{3,-1}, q_{0,1}, q_{0,-1}]$ $\quad$ $[q_{1,j}, q_{1,-j}, q_{2,j}, q_{2,-j}, q_{3,1}, q_{3,-1}, q_{0,1}, q_{0,-1}]$ $$\frac{1}{S}\begin{bmatrix} 1 & 1 & 1 & 1 & 1 & 1 & 1 & 1 \\ -1 & -1 & 1 & 1 & -1 & -1 & 1 & 1 \\ 1 & 1 & -1 & -1 & -1 & -1 & 1 & 1 \\ -1 & -1 & -1 & -1 & 1 & 1 & 1 & 1 \\ 1 & -1 & 1 & -1 & 1 & -1 & 1 & -1 \\ -1 & 1 & 1 & -1 & -1 & 1 & 1 & -1 \\ 1 & -1 & -1 & 1 & -1 & 1 & 1 & -1 \\ -1 & 1 & -1 & 1 & 1 & -1 & 1 & -1 \end{bmatrix} \text{(R1)} \quad \frac{1}{S}\begin{bmatrix} 1 & 1 & 1 & 1 & 1 & 1 & 1 & 1 \\ -1 & -1 & 1 & 1 & -1 & -1 & 1 & 1 \\ 1 & 1 & -1 & -1 & -1 & -1 & 1 & 1 \\ -1 & -1 & -1 & -1 & 1 & 1 & 1 & 1 \\ j & -j & j & -j & 1 & -1 & 1 & -1 \\ -j & j & j & -j & -1 & 1 & 1 & -1 \\ j & -j & -j & j & -1 & 1 & 1 & -1 \\ -j & j & -j & j & 1 & -1 & 1 & -1 \end{bmatrix}$$ $[q_{2,1}, q_{2,-1}, q_{3,1}, q_{3,-1}, q_{0,1}, q_{0,-1}, q_{1,1}, q_{1,-1}]$ $\quad$ $[q_{2,j}, q_{2,-j}, q_{3,j}, q_{3,-j}, q_{0,1}, q_{0,-1}, q_{1,1}, q_{1,-1}]$ $$\frac{1}{S}\begin{bmatrix} 1 & 1 & 1 & 1 & 1 & 1 & 1 & 1 \\ 1 & 1 & -1 & -1 & 1 & 1 & -1 & -1 \\ -1 & -1 & -1 & -1 & 1 & 1 & 1 & 1 \\ -1 & -1 & 1 & 1 & 1 & 1 & -1 & -1 \\ 1 & -1 & 1 & -1 & 1 & -1 & 1 & -1 \\ 1 & -1 & -1 & 1 & 1 & -1 & -1 & 1 \\ -1 & 1 & -1 & 1 & 1 & -1 & 1 & -1 \\ -1 & 1 & 1 & -1 & 1 & -1 & -1 & 1 \end{bmatrix} \text{(R1)} \quad \frac{1}{S}\begin{bmatrix} 1 & 1 & 1 & 1 & 1 & 1 & 1 & 1 \\ 1 & 1 & -1 & -1 & 1 & 1 & -1 & -1 \\ -1 & -1 & -1 & -1 & 1 & 1 & 1 & 1 \\ -1 & -1 & 1 & 1 & 1 & 1 & -1 & -1 \\ j & -j & j & -j & 1 & -1 & 1 & -1 \\ j & -j & -j & j & 1 & -1 & -1 & 1 \\ -j & j & -j & j & 1 & -1 & 1 & -1 \\ -j & j & j & -j & 1 & -1 & -1 & 1 \end{bmatrix}$$ $[q_{3,1}, q_{3,-1}, q_{0,1}, q_{0,-1}, q_{1,1}, q_{1,-1}, q_{2,1}, q_{2,-1}]$ $\quad$ $[q_{3,j}, q_{3,-j}, q_{0,j}, q_{0,-j}, q_{1,1}, q_{1,-1}, q_{2,1}, q_{2,-1}]$ $$\frac{1}{S}\begin{bmatrix} 1 & 1 & 1 & 1 & 1 & 1 & 1 & 1 \\ -1 & -1 & 1 & 1 & -1 & -1 & 1 & 1 \\ -1 & -1 & 1 & 1 & 1 & 1 & -1 & -1 \\ 1 & 1 & 1 & 1 & -1 & -1 & -1 & -1 \\ 1 & -1 & 1 & -1 & 1 & -1 & 1 & -1 \\ -1 & 1 & 1 & -1 & -1 & 1 & 1 & -1 \\ -1 & 1 & 1 & -1 & 1 & -1 & -1 & 1 \\ 1 & -1 & 1 & -1 & -1 & 1 & -1 & 1 \end{bmatrix} \text{(R1)} \quad \frac{1}{S}\begin{bmatrix} 1 & 1 & 1 & 1 & 1 & 1 & 1 & 1 \\ -1 & -1 & 1 & 1 & -1 & -1 & 1 & 1 \\ -1 & -1 & 1 & 1 & 1 & 1 & -1 & -1 \\ 1 & 1 & 1 & 1 & -1 & -1 & -1 & -1 \\ j & -j & j & -j & 1 & -1 & 1 & -1 \\ -j & j & j & -j & -1 & 1 & 1 & -1 \\ -j & j & j & -j & 1 & -1 & -1 & 1 \\ j & -j & j & -j & -1 & 1 & -1 & 1 \end{bmatrix}$$ |

In one example, the included FC precoding matrices are determined such that the number of FC TPMIs=2 times the number of FC TPMIs in Rel. 15 4Tx UL codebook.

In one embodiment, the UL codebook includes partial-coherent (PC) precoding matrices, and a PC precoding matrix can be defined as a matrix whose each column comprises both zero and non-zero entries, e.g., at least two non-zero and remaining zero elements/entries in each column.

In one embodiment, the UE reports a UE capability information about its support for the UL codebook for 8 antenna ports. The UE is configured with an UL codebook subject to (based on) the UE capability information.

In one example, the UE capability information includes information about the value of $N_g$, where the value of $N_g$ can be from $\{1, 2, 4\}$ or $\{1, 2, 4, 8\}$.

In one example, only one value of $N_g$ can be reported by the UE via the UE capability information.

In one example, one or more than value of $N_g$ can be reported by the UE via the UE capability information.

When the UE reports one value, it can be from $\{1, 2, 4\}$ or $\{1, 2, 4, 8\}$. When the UE reports multiple values, at least one of the following examples is used.

In one example, when the UE reports multiple values, they are restricted to be only $N_g=2, 4$.

In one example, when the UE reports multiple values, they are restricted to be only $N_g=1, 2$.

In one example, when the UE reports multiple values, they are restricted to be only $N_g=1, 4$.

In one example, when the UE reports multiple values, they are restricted to be only $N_g=1, 2, 4$.

In one example, the UE can report one or multiple values from $\{1, 2, 4\}$ or $\{1, 2, 4, 8\}$.

In one example, when the UE reports $N_g=1$, it also reports one or multiple values of $(N_1, N_2)$.

In one example, the UE can only report one value of $(N_1, N_2)$, either (2,2) or (4,1).

In one example, the UE can only report one or two values value of $(N_1, N_2)$, i.e., either (2,2) or (4,1), both (2,2) and (4,1).

In one example, the UE capability information includes information about coherence type.

In one example, when the UE reports a coherence type=full-coherent or full-coherence
In one example, the UE capability information includes coherence type=FC only.
In one example, the UE capability information includes coherence type=FC and $(N_1, N_2)$ value from $\{(2,2), (4,1)\}$.
In one example, the UE reports only one $(N_1, N_2)$ value, either (2,2) or (4,1).
In one example, the UE can either report one $(N_1, N_2)$ value, (2,2) or (4,1), or two values for $(N_1, N_2)$, i.e., both of (2,2) and (4,1).

In one example, when the UE reports a coherence type=partial-coherent or partial-coherence
In one example, the UE capability information includes coherence type=PC only. In this case, the value of $N_g$ (number of PC antenna groups) can be fixed, e.g., 2 or 4, or configured (e.g., via RRC).

In one example, the UE capability information includes coherence type=PC1 or PC2, where PC1 implies $N_g=2$ PC antenna groups, and PC2 implies $N_g=4$ PC antenna groups.

In one example, the UE capability information includes coherence type=PC and $(N_1, N_2)$=(2,1) or (1,1)

In one example, the UE can only report one value of $(N_1, N_2)$, either (2,1) or (1,1).

In one example, the UE can only report one or two values value of $(N_1, N_2)$, i.e., either (2,1) or (1,1), both (2,1) and (1,1).

In one example, the UE capability information includes coherence type and $(N_1, N_2)$, where coherence type=PC1 or PC2, and $(N_1, N_2)$=(2,1) or (1,1). Here, PC1 implies $N_g=2$ PC antenna groups, and PC2 implies $N_g=4$ PC antenna groups, In one example, the UE can only report one value of $(N_1, N_2)$, either (2,1) or (1,1).

In one example, the UE can only report one or two values value of $(N_1, N_2)$, i.e., either (2,1) or (1,1), both (2,1) and (1,1).

In one example, when the UE reports a coherence type=non-coherent or non-coherence.

In one example, the UE capability information includes coherence type=NC only.

In one example, the UE capability information includes information about coherence type and Nq.

In one example, when the UE reports a coherence type=full-coherent or full-coherence.

In one example, the UE capability information includes coherence type=FC and $N_g=1$.

In one example, the UE capability information includes coherence type=FC, $N_g=1$ (for FC precoders) and one value $N_g>1$, e.g., $N_g=2$ or 4 (for PC precoders) or 8 (for NC precoders).

In one example, the UE capability information includes coherence type=FC, $N_g=1$ (for FC precoders) and one value $N_g>1$ (e.g., $N_g=2$ or 4 or 8) or two $N_g>1$ values (e.g., {2, 4}) (for PC precoders) or three $N_g>1$ values (e.g., {2, 4, 8}) (for PC and NC precoders).

In one example, the UE capability information includes coherence type=FC, $N_g=1$ (for FC precoders), one value $N_g>1$, e.g., $N_g=2$ or 4 (for PC precoders), and also includes $(N_1, N_2)$ value from {(2,2), (4,1)}.

In one example, the UE reports only one $(N_1, N_2)$ value, either (2,2) or (4,1).

In one example, the UE can either report one $(N_1, N_2)$ value, (2,2) or (4,1), or two values for $(N_1, N_2)$, i.e., both of (2,2) and (4,1).

In one example, the UE capability information includes coherence type=FC, $N_g=1$ (for FC precoders), one value $N_g>1$ (e.g., $N_g=2$ or 4) or two $N_g>1$ values (e.g., {2, 4}) (for PC precoders), and also includes $(N_1, N_2)$ value from {(2,2), (4,1)}.

In one example, the UE reports only one $(N_1, N_2)$ value, either (2,2) or (4,1).

In one example, the UE can either report one $(N_1, N_2)$ value, (2,2) or (4,1), or two values for $(N_1, N_2)$, i.e., both of (2,2) and (4,1).

In one example, when the UE reports a coherence type=partial-coherent or partial-coherence In one example, the UE capability information includes coherence type=PC and $N_g=2$ or 4.

In one example, the UE reports only one $N_g$ value, e.g., 2 or 4.

In one example, the UE can either report one $N_g$ value, e.g., 2 or 4, or two values for $N_g$, i.e., both 2 and 4.

In one example, the UE capability information includes coherence type=PC and $(N_g, N_1, N_2)$ (2, 2, 1) or (4, 1, 1).

In one example, the UE reports only one $(N_g, N_1, N_2)$ value, e.g., (2, 2, 1) or (4, 1, 1).

In one example, the UE can either report one $(N_g, N_1, N_2)$ value, e.g., (2, 2, 1) or (4, 1, 1), or two values for $(N_g, N_1, N_2)$, i.e., both (2, 2, 1) and (4, 1, 1).

In one example, the UE capability information includes coherence type=PC and $N_g=2$ or 4 or 8.

In one example, the UE reports only one $N_g$ value, e.g., 2 or 4 or 8.

In one example, the UE can either report one $N_g$ value, e.g., 2 or 4 or 8, or two values for {2, 4, 8}.

In one example, the UE can either report one $N_g$ value, e.g., 2 or 4 or 8, or two values for {2, 4, 8}, or three values {2.4.8}.

In one example, the UE capability information includes coherence type=PC and $(N_g, N_1, N_2)$=(2, 2, 1) or (4, 1, 1) or (8, -, -).

In one example, the UE reports only one $(N_g, N_1, N_2)$ value, e.g., (2, 2, 1) or (4, 1, 1) or (8, -, -).

In one example, the UE can either report one $(N_g, N_1, N_2)$ value, e.g., (2, 2, 1) or (4, 1, 1), or two values for $(N_g, N_1, N_2)$, from {(2, 2, 1), (4, 1, 1), (8, -, -)}.

In one example, the UE can either report one $(N_g, N_1, N_2)$ value, e.g., (2, 2, 1) or (4, 1, 1), or two values for $(N_g, N_1, N_2)$, from {(2, 2, 1), (4, 1, 1), (8, -, -)} or three value {(2, 2, 1), (4, 1, 1), (8, -, -)}.

In one example, when the UE reports a coherence type=non-coherent or non-coherence.

In one example, the UE capability information includes coherence type=NC and $N_g=8$.

TABLE 52

| Number of coherence types | codebookSubset | $N_g = 1$ | $N_g = 2$ | $N_g = 4$ | $N_g = 8$ |
|---|---|---|---|---|---|
| 1 | S1 | FC | | | |
|   | S2 | | PC1 | | |
|   | S3 | | | PC2 | |
|   | S4 | | | | NC |
| 2 | S5 | FC | PC1 | | |
|   | S6 | FC | | PC2 | |
|   | S7 | FC | | | NC |
|   | S8 | | PC1 | PC2 | |
|   | S9 | | PC1 | | NC |
|   | S10 | | | PC2 | NC |
| 3 | S11 | FC | PC1 | PC2 | |
|   | S12 | FC | PC1 | | NC |
|   | S13 | FC | | PC2 | NC |
|   | S14 | | PC1 | PC2 | NC |
| 3 | S15 | FC | PC1 | PC2 | NC |

In one embodiment, the UE is configured, e.g., via higher layer, an UL codebook for 8 antenna ports subject to the UE capability information provided by the UE, the details of the UE capability information is as described in earlier.

In one example, a higher layer RRC parameter similar to the legacy (Rel.15) parameter codebookSubset, is used for this purpose. Let codebookSubset-r18 be the parameter for codebook subsets for 8Tx codebook. In the following, a PC UE with $N_g=2$ is referred to as PC1, and a PC UE with $N_g=4$ is referred to as PC2. An example of all possible codebook subsets is shown in Table 52. In one example, a FC UE can support or configured with a codebook subset according to any of subsets S1-S15. In one example, a PC UE can support or configured with a codebook subset according to any subset from {S2, S3, S4, S8, S9, S10, S14}. In one example, a PC UE supporting only $N_g=2$ can support or configured with a codebook subset according to any subset from {S2, S3, S4, S8, S9, S10, S14}. In one example, a PC UE supporting only $N_g=4$ can support or configured with a codebook subset according to any subset from {S3, S4, S10}. In one example, a NC UE can support or configured with a codebook subset according to only S4.

In one example, the UE can be configured with (via codebookSubset-r18) an UL codebook which includes precoding matrices of only one coherence type (e.g., only one of FC, PC, and NC). Note that this example applies to all FC, PC, and NC UEs.

In one example, for a FC UE, the UL codebook can be configured to be subset S1=FC.
In one example, for a FC UE, the UL codebook can be configured to be either subset S1=FC or S2=PC1.
In one example, for a FC UE, the UL codebook can be configured to be either subset S1=FC or S2=PC2.
In one example, for a FC UE, the UL codebook can be configured to be either subset S1=FC or S2=PC1 or S3=PC2.
In one example, for a FC UE, the UL codebook can be configured to be either subset S1=FC or S4=NC.
In one example, for a FC UE, the UL codebook can be configured to be either subset S1=FC or S2=PC1 or S4=NC.
In one example, for a FC UE, the UL codebook can be configured to be either subset S1=FC or S3=PC2 or S4=NC.
In one example, for a FC UE, the UL codebook can be configured to be either subset S1=FC or S2=PC1 or S3=PC2, or S4=NC.
In one example, for a PC UE, the UL codebook can be configured to be either subset S2=PC1.
In one example, for a PC UE, the UL codebook can be configured to be either subset S3=PC2.
In one example, for a PC UE, the UL codebook can be configured to be either subset S2=PC1 or S3=PC2.
In one example, for a PC UE, the UL codebook can be configured to be either subset S2=PC1 or S4=NC.
In one example, for a PC UE, the UL codebook can be configured to be either subset S3=PC2 or S4=NC. In one example, for a PC UE, the UL codebook can be configured to be either subset S2=PC1 or S3=PC2, or S4=NC.
In one example, for a NC UE, the UL codebook can be configured to be S4=NC.
In one example, for a FC UE, if the UE supports multiple ($N_1$, $N_2$) values, e.g., (4,1) and (2,2), then the UE can also be configured with one value ($N_1$, $N_2$), e.g., (4,1) or (2,2).

In one example, for a PC UE, if the UE supports multiple ($N_1$, $N_2$) values, e.g., (2,1) and (1,1), then the UE can also be configured with one ($N_1$, $N_2$), e.g., (2,1) or (1,1).

In one example, for a PC UE, if the UE supports multiple $N_g$ values, e.g., 2 and 4, then the UE can also be configured with one $N_g$ value, e.g., 2 or 4.

In one example, the UE can be configured with (via codebookSubset-r18) an UL codebook which includes precoding matrices of two coherence types (e.g., two of FC, PC, and NC). Note that this applies to FC or PC UEs, but not to NC UEs (since a NC UE can't support FC/PC precoders).

In one example, for a FC UE, the UL codebook can be configured to be subset S5=FC and PC1 (including both FC and PC2 precoding matrices).
In one example, for a FC UE, the UL codebook can be configured to be subset S6=FC and PC2.
In one example, for a FC UE, the UL codebook can be configured to be subset S7=FC and NC.
In one example, for a PC UE, the UL codebook can be configured to be subset S8=PC1 and PC2.
In one example, for a PC UE, the UL codebook can be configured to be subset S9=PC1 and NC.
In one example, for a PC UE, the UL codebook can be configured to be subset S10=PC2 and NC.

In one example, the UE can be configured with (via codebookSubset-r18) an UL codebook which includes precoding matrices of three coherence types (e.g., two of FC, PC, and NC). Note that this applies to FC or PC UEs, but not to NC UEs (since a NC UE can't support FC/PC precoders).

In one example, for a FC UE, the UL codebook can be configured to be subset S11=FC, PC1, and PC2 (including FC, PC1, and PC2 precoding matrices).
In one example, for a FC UE, the UL codebook can be configured to be subset S12=FC, PC1, and NC.
In one example, for a FC UE, the UL codebook can be configured to be subset S13=FC, PC2, and NC.
In one example, for a PC UE, the UL codebook can be configured to be subset S14=PC1, PC2, and NC.
In one example, for a FC UE, the UL codebook can be configured to be subset S15=FC, PC1, PC2, and NC.

In one example, for a FC UE, the UE can be configured with (via codebookSubset-r18) an UL codebook which includes one of the two PC subsets (PC1 or PC2), not both, i.e., codebook subset can be S5, or S6, or S12, or S13, but can't be S8, S11, S14, S15.

In one example, a FC UE can support both PC1 and PC2 ($N_g=2$ and $N_g=4$). So, the UE can support $N_g=\{1, 2, 4\}$ or $\{1, 2, 4, 8\}$. The UE then can be configured with a codebook subset such that $N_g$ is from $\{1, x\}$ or $\{1, x, 8\}$, where x is configured, x=2 or 4 or $\{2, 4\}$. The FC UE reports via capability which one of the two PC ($N_g=2, 4$). Therefore, $\{1, x\}$ or $\{1, x, 8\}$, where x is up to UE capability. The FC UE reports via capability which one of the two PC or both of the two PC ($N_g=2, 4$).

In one example, for a PC UE, the UE can be configured with (via codebookSubset-r18) an UL codebook which includes one of two PC subsets (PC1 or PC2) corresponding to $N_g=2$ or $N_g=4$, not both, i.e., codebook subset can be S2, or S3, or S9, or S10, but can't be S8, or S14.

In one example, a PC UE supporting $N_g=2$ doesn't support a codebook subset precoders for $N_g=4$ or $N_g=\{4, 8\}$. Hence, it can only support S2 or S4, or S9.

In one example, a PC UE supporting $N_g=2$ can also support a codebook subset precoders for $N_g=4$ or $N_g=\{4, 8\}$. Hence, it can only support S2, S3, S4, S8, S9, S10, S14.

In one example, a PC UE supporting $N_g=2$ reports via UE capability whether it also supports $N_g=4$ precoders or codebookSubset.

In one example, a PC UE supporting $N_g=4$ doesn't support a codebook subset precoders for $N_g=8$. Hence, it can only support S3.

In one example, a PC UE supporting $N_g=4$ can also support a codebook subset precoders for $N_g=8$. Hence, it can only support S3, S4, S10.

In one example, a PC UE supporting $N_g=4$ reports via UE capability whether it also supports $N_g=8$ precoders or codebookSubset.

In one example, the codebookSubset can only include at most two coherence types. In one example, FC, or PC, or PC1, or PC2, or NC or, FC+NC, or PC+NC or PC1+NC, or PC2+NC (i.e., S1, S2, S3, S4, S5, S6, S7, S8, S9, S10).

In one example, the codebookSubset can only be configured from one for the following five subsets.
S15 with FC1: FC1+PC1+PC2+NC, where FC1 corresponds to $(N_1, N_2)=(4,1)$
S15 with FC2: FC2+PC1+PC2+NC, where FC1 corresponds to $(N_1, N_2)=(2,2)$
S14: PC1+PC2+NC
S10: PC2+NC
S4: NC In one example, the following codebooks are supported, hence can be configured depending on UE coherence capability and antenna structures.
A UE with FC1 can support a total of 4 codebook subsets (S15 with FC1, or S14, or S10, or S4).
A UE with FC2 can support a total of 4 codebook subsets (S15 with FC2, or S14, or S10, or S4).
A UE with PC1 can support a total of 3 codebook subsets (S14, or S10, or S4).
A UE with PC2 can support a total of 2 codebook subsets (S10, or S4).
A UE with NC can support a total of 1 codebook subset (S4).

In one example, the following codebooks are supported, hence can be configured depending on UE coherence capability and antenna structures
A UE with FC1 can support a total of 3 (S12 with FC1, or S13 with FC1, or S9, or S10)
A UE with FC2 can support a total of 3 (S12 with FC2, or S13 with FC2, or S9, or S10)
A UE with PC1 can support a total of 2 (S9 or S4)
A UE with PC2 can support a total of 2 (S10 or S4)
NC support 1 (S4)

In one embodiment, a FC UE (or a UE reporting being capable FC UL transmission) with 8 antenna ports can have antenna structure with $N_g=1$, and $(N_1, N_2)=(2,2)$ or $(4,1)$, as described above. However, only $(N_1, N_2)=(2,2)$ is supported, i.e., $(N_1, N_2)=(4,1)$ is not supported, which means that the NR specification will not specify the codebook and UE behavior for the case $(N_1, N_2)=(4,1)$. This implies that there is only one type of FC precoding matrices included in the 8Tx UL codebook for 8 antenna ports, and that corresponds to the precoding matrices for $(N_1, N_2)=(2,2)$.

In one example, the one type of FC precoding matrices corresponds to $(N_1, N_2)=(2,2)$, and 8Tx UL codebook includes FC precoding matrices for $(N_1, N_2)=(2,2)$ that are determined based on (CB1) the Rel. 15 DL Type I codebook with $(N_1, N_2)=(2,2)$, and there is no precoding matrices for $(N_1, N_2)=(4,1)$. In this case, a FC UE can only report (e.g., via UE capability) the support for $(N_1, N_2)=(2,2)$, and can't or doesn't report the support for $(N_1, N_2)=(4,1)$.

In one example, the one type of FC precoding matrices corresponds to $(N_1, N_2)=(2,2)$, and 8Tx UL codebook includes FC precoding matrices for $(N_1, N_2)=(2,2)$ that are determined based on (CB2) the Rel-15 NR UL 2Tx/4Tx codebooks and/or 8×1 antenna selection vector(s), and there is no precoding matrices for $(N_1, N_2)=(4,1)$. In this case, a FC UE can only report (e.g., via UE capability) the support for $(N_1, N_2)=(2,2)$, and can't or doesn't report the support for $(N_1, N_2)=(4,1)$.

In one embodiment, a FC UE (or a UE reporting being capable FC UL transmission) with 8 antenna ports can have antenna structure with $N_g=1$, and $(N_1, N_2)=(2,2)$ or $(4,1)$, as described above. Both $(N_1, N_2)=(2,2)$ and $(4,1)$ are supported. However, there is only one type of FC precoding matrices included in the 8Tx UL codebook for 8 antenna ports, and this is for both $(N_1, N_2)=(2,2)$ and $(4,1)$.

In one example, the one type of FC precoding matrices corresponds to $(N_1, N_2)=(2,2)$, and the 8Tx UL codebook includes FC precoding matrices for $(N_1, N_2)=(2,2)$ that are determined based on (CB1) the Rel. 15 DL Type I codebook with $(N_1, N_2)=(2,2)$, and there is no precoding matrices for $(N_1, N_2)=(4,1)$. In this case, a FC UE can only report (e.g., via UE capability) the support for $(N_1, N_2)=(2,2)$, and can't or doesn't report the support for $(N_1, N_2)=(4,1)$.

In one example, the one type of FC precoding matrices corresponds to $(N_1, N_2)=(2,2)$, and 8Tx UL codebook includes FC precoding matrices for $(N_1, N_2)=(2,2)$ that are determined based on (CB2) the Rel-15 NR UL 2Tx/4Tx codebooks and/or 8×1 antenna selection vector(s), and there is no precoding matrices for $(N_1, N_2)=(4,1)$. In this case, a FC UE can only report (e.g., via UE capability) the support for $(N_1, N_2)=(2,2)$, and can't or doesn't report the support for $(N_1, N_2)=(4,1)$.

This is regardless of whether the UE reports $(N_1, N_2)=(2,2)$ or $(4,1)$, i.e., even when the UE reports $(N_1, N_2)=(4,1)$, the configured 8Tx UL codebook includes FC precoding matrices for the case of $(N_1, N_2)=(2,2)$.

Likewise, this is regardless of whether the UE is configured with $(N_1, N_2)=(2,2)$ or $(4,1)$, i.e., even when the UE is configured with $(N_1, N_2)=(4,1)$, the configured 8Tx UL codebook includes FC precoding matrices for the case of $(N_1, N_2)=(2,2)$.

In one embodiment, a FC UE (or a UE reporting being capable FC UL transmission) with 8 antenna ports can have antenna structure with $N_g=1$, and $(N_1, N_2)=(2,2)$ or $(4,1)$, as described above. Both $(N_1, N_2)=(2,2)$ and $(4,1)$ are supported. However, there is only one type of FC precoding matrices included in the 8Tx UL codebook for 8 antenna ports, and this is for both $(N_1, N_2)=(2,2)$ and $(4,1)$. The only one type of FC precoding matrices corresponds to the 8Tx UL codebook that includes FC precoding matrices determined based on a combination or mixture of (CB1) and (CB2).

In one example, (CB1) is based on the Rel. 15 DL Type I codebook with $(N_1, N_2)=(2,2)$, and (CB2) is based on the NR Rel-15 UL 2TX/4TX codebooks and/or 8×1 antenna selection vector(s) for $(N_1, N_2)=(4,1)$.

In one example, (CB1) is based on the Rel. 15 DL Type I codebook with $(N_1, N_2)=(4,1)$, and (CB2) is based on the NR Rel-15 UL 2TX/4TX codebooks and/or 8×1 antenna selection vector(s) for $(N_1, N_2)=(4,1)$.

In one example, (CB1) is based on the Rel. 15 DL Type I codebook with $(N_1, N_2)=(2,2)$, and (CB2) is based on the NR Rel-15 UL 2TX/4TX codebooks and/or 8×1 antenna selection vector(s) for $(N_1, N_2)=(2,2)$.

In one example, (CB1) is based on the Rel. 15 DL Type I codebook with $(N_1, N_2)=(4,1)$, and (CB2) is based on the NR Rel-15 UL 2TX/4TX codebooks and/or 8×1 antenna selection vector(s) for $(N_1, N_2)=(2,2)$.

In one example, for the case of other examples herein, the CB1 portion (subset) of the FC precoding matrices can be configured only when the UE reports (e.g., via UE capability, separate or joint) that it can support the CB1 portion (subset). That is, if the UE can't support the CB1 portion, then only CB2 portion (subset) of the FC precoding matrices can be configured in the UL codebook. In one example, this UE capability reporting is applicable to the case when $(N_1, N_2)$ (4,1).

In one example, when $(N_1, N_2)=(2,2)$, only one of CB1 or CB2 portion of the FC precoding matrices corresponding to $(N_1, N_2)=(2,2)$ can be configured in the UL codebook.

This is regardless of whether the UE reports $(N_1, N_2)=(2,2)$ or (4,1), i.e., even when the UE reports $(N_1, N_2)=(4,1)$, the configured 8Tx UL codebook includes FC precoding matrices for the case of $(N_1, N_2)=(2,2)$.

Likewise, this is regardless of whether the UE is configured with $(N_1, N_2)=(2,2)$ or (4,1), i.e., even when the UE is configured with $(N_1, N_2)=(4,1)$, the configured 8Tx UL codebook includes FC precoding matrices for the case of $(N_1, N_2)=(2,2)$.

In one embodiment, a FC UE (or a UE reporting being capable FC UL transmission) with 8 antenna ports can have antenna structure with $N_g=1$, and $(N_1, N_2)=(2,2)$ or (4,1), as described above. Both $(N_1, N_2)=(2,2)$ and (4,1) are supported, and there is two types (CB1 and CB2) of FC precoding matrices included in the 8Tx UL codebook for 8 antenna ports, one for each of $(N_1, N_2)=(2,2)$ and (4,1), where (CB1) is based on the Rel. 15 DL Type I codebook with $(N_1, N_2)=(2,2)$, and (CB2) is based on the Rel. 15 DL Type I codebook with $(N_1, N_2)=(4,1)$.

In one example, the UE reports (e.g., via UE capability) whether one of (CB1) and (CB2), and also one of $(N_1, N_2)=(2,2)$ and (4,1). The UE is then configured with the UL codebook, CB1 or CB2, depending on the UE capability reporting.

In one example, for $(N_1, N_2)=(2,2)$, CB1 is used as the UL codebook, and for $(N_1, N_2)=(4,1)$, the UE reports (e.g., via UE capability) whether it supports (CB2). If the UE supports, then the UE can be configured with the UL codebook, CB2; otherwise, the UE is configured with the UL codebook CB1.

In one example, for $(N_1, N_2)=(2,2)$, CB1 is used as the UL codebook, and for $(N_1, N_2)=(4,1)$, the UE reports (e.g., via UE capability) whether it supports (CB1 or CB2). The UE is then configured with the UL codebook, CB1 or CB2, depending on the UE capability reporting.

In one embodiment, a FC UE (or a UE reporting being capable FC UL transmission) with 8 antenna ports can have antenna structure with $N_g=1$, and $(N_1, N_2)=(2,2)$ or (4,1), as described above. Both $(N_1, N_2)=(2,2)$ and (4,1) are supported, and there is three types (CB1, CB2 and CB3) of FC precoding matrices included in the 8Tx UL codebook for 8 antenna ports, where (CB1) is based on the Rel. 15 DL Type I codebook with $(N_1, N_2)=(2,2)$, (CB2) is based on the Rel. 15 DL Type I codebook with $(N_1, N_2)=(4,1)$, and (CB3) is based on NR Rel-15 UL 2TX/4TX codebooks and/or 8×1 antenna selection vector(s) for $(N_1, N_2)=(4,1)$.

In one example, for $(N_1, N_2)=(2,2)$, CB1 is used as the UL codebook, and for $(N_1, N_2)=(4,1)$, the UE reports (e.g., via UE capability) whether it supports (CB2). If the UE supports, then the UE can be configured with the UL codebook, CB2; otherwise, the UE is configured with the UL codebook CB3.

In one example, for $(N_1, N_2)=(2,2)$, CB1 is used as the UL codebook, and for $(N_1, N_2)=(4,1)$, the UE reports (e.g., via UE capability) whether it supports (CB2 or CB3). The UE is then configured with the UL codebook, CB2 or CB3, depending on the UE capability reporting.

Figure 8:
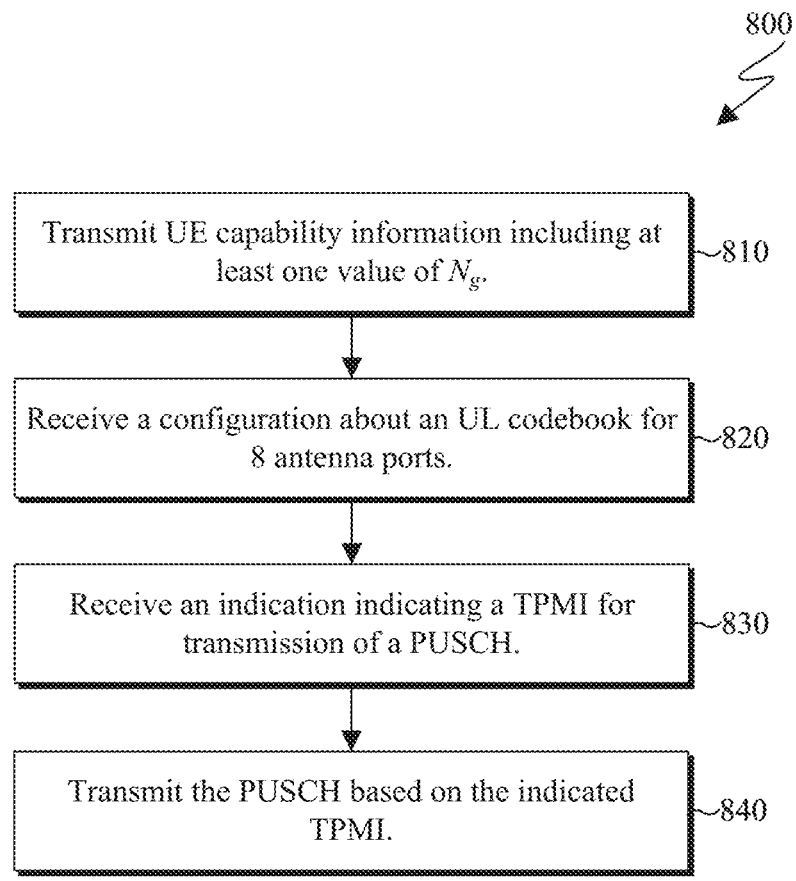
FIG. 8 illustrates an example method performed by a UE in a wireless communication system according to embodiments of the present disclosure.

FIG. 8 illustrates an example method 800 performed by a UE in a wireless communication system according to embodiments of the present disclosure. The method 800 of FIG. 8 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 800 is for illustration only and other embodiments can be used without departing from the scope of the present disclosure.

The method 800 begins with the UE transmitting UE capability information including at least one value of $N_g$ (810). For example, in 810, the value is from $\{1, 2, 4, 8\}$ and each value indicating a number of antenna port groups with each group comprising $N_g$ antenna ports, where N is a number of antenna ports at the UE. In various embodiments, the UE has at least 8 antenna ports. In various embodiments, when the at least one value of $N_g$ includes $N_g=1$, the UE capability information further includes at least one value for $(N_1, N_2)$ from (4,1) and (2,2), where $N_1$ and $N_2$ are number of antenna ports with the same polarization in the first and second dimensions, respectively. In various embodiments, the configuration is via an RRC parameter, and the UL codebook is one of: a first codebook corresponding to $N_g=1$ and comprising FC precoding matrices, a second codebook corresponding to $N_g=2$ and comprising PC precoding matrices, a third codebook corresponding to $N_g=4$ and comprising PC precoding matrices, or a fourth codebook corresponding to $N_g=8$ and comprising NC precoding matrices. In various embodiments, the first codebook corresponds to one of $(N_g, N_1, N_2)=(1, 4, 1)$ and $(1, 2, 2)$.

The UE then receives a configuration about an UL codebook for 8 antenna ports (820). For example, in 820, the UL codebook is according to one of the at least one value of $N_g$. The UE then receives an indication indicating a TPMI for transmission of a PUSCH (830). In various embodiments, the indication is via a DCI field in an UL-DCI granting the PUSCH transmission. The UE then transmits the PUSCH based on the indicated TPMI (840). For example, in 840, the TPMI indicates a precoding matrix (W) from the UL codebook for 8 antenna ports.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a processor; and
a transceiver operably coupled to the processor, the transceiver configured to:
  transmit UE capability information including at least one value of $N_g$ from {1, 2, 4, 8}, each value indicating a number of antenna port groups with each group comprising $N/N_g$ antenna ports, where N is a number of antenna ports at the UE;
  receive a configuration about (i) an uplink (UL) codebook for N antenna ports and (ii) a configured $N_g$ value, wherein the UL codebook is according to the configured $N_g$ value and the configured $N_g$ value is based on the at least one value of $N_g$;
  receive an indication indicating a transmit precoding matrix indicator (TPMI) for transmission of a physical uplink shared channel (PUSCH); and
  transmit the PUSCH based on the indicated TPMI,
wherein the TPMI indicates a precoding matrix (W) from the UL codebook for N antenna ports, and
wherein at least one value of N is 8.

2. The UE of claim 1, wherein the indication is via a downlink control information (DCI) field in an UL-DCI granting the PUSCH transmission.

3. The UE of claim 1, wherein, when the at least one value of $N_g$ includes $N_g=1$, the UE capability information further includes at least one value for $(N_1, N_2)$ from (4,1) and (2,2), where $N_1$ and $N_2$ are number of antenna ports with the same polarization in the first and second dimensions, respectively.

4. The UE of claim 1, wherein the configuration is via a radio resource control (RRC) parameter, and the UL codebook is one of:
  a first codebook corresponding to $N_g=1$ and comprising full-coherent (FC) precoding matrices,
  a second codebook corresponding to $N_g=2$ and comprising partial-coherent (PC) precoding matrices,
  a third codebook corresponding to $N_g=4$ and comprising partial-coherent (PC) precoding matrices, or
  a fourth codebook corresponding to $N_g=8$ and comprising non-coherent (NC) precoding matrices.

5. The UE of claim 4, wherein the first codebook corresponds to one of $(N_g, N_1, N_2)=(1, 4, 1)$ and $(1, 2, 2)$.

6. The UE of claim 5, wherein when $(N_g, N_1, N_2)=(1, 4, 1)$:
  the UL codebook for two layers includes all of or a subset of the following, where S=4:

| TPMI index | W (ordered from left to right in increasing order of TPMI index) |
|---|---|
| 0-7 | $\frac{1}{S}\begin{bmatrix}1&1\\1&1\\1&1\\1&1\\1&-1\\1&-1\\1&-1\\1&-1\end{bmatrix}$, $\frac{1}{S}\begin{bmatrix}1&1\\1&1\\1&1\\1&1\\j&-j\\j&-j\\j&-j\\j&-j\end{bmatrix}$, $\frac{1}{S}\begin{bmatrix}1&1\\j&j\\-1&-1\\-j&-j\\1&-1\\j&-j\\-1&1\\-j&j\end{bmatrix}$, $\frac{1}{S}\begin{bmatrix}1&1\\j&j\\-1&-1\\-j&-j\\j&-j\\-1&1\\-j&j\\1&-1\end{bmatrix}$, $\frac{1}{S}\begin{bmatrix}1&1\\-1&-1\\1&1\\-1&-1\\1&-1\\-1&1\\1&-1\\-1&1\end{bmatrix}$, $\frac{1}{S}\begin{bmatrix}1&1\\-1&-1\\1&1\\-1&-1\\j&-j\\-j&j\\-j&j\\j&-j\end{bmatrix}$, $\frac{1}{S}\begin{bmatrix}1&1\\-j&-j\\-1&-1\\j&j\\1&-1\\-j&j\\-1&1\\j&-j\end{bmatrix}$, $\frac{1}{S}\begin{bmatrix}1&1\\-j&-j\\-1&-1\\j&j\\j&-j\\1&-1\\-j&-j\\-1&1\end{bmatrix}$ |
| 8-15 | $\frac{1}{S}\begin{bmatrix}1&1\\1&j\\1&-1\\1&-j\\1&-1\\1&-j\\1&1\\1&j\end{bmatrix}$, $\frac{1}{S}\begin{bmatrix}1&1\\1&j\\1&-1\\1&-j\\j&-j\\j&1\\j&j\\j&-1\end{bmatrix}$, $\frac{1}{S}\begin{bmatrix}1&1\\j&-1\\-1&1\\-j&-1\\1&-1\\j&1\\-1&-1\\-j&1\end{bmatrix}$, $\frac{1}{S}\begin{bmatrix}1&1\\j&-1\\-1&1\\-j&-1\\j&-j\\-1&j\\-j&-j\\1&j\end{bmatrix}$, $\frac{1}{S}\begin{bmatrix}1&1\\-1&-j\\-1&1\\-1&j\\-1&j\\-1&-1\\1&1\\-1&-j\end{bmatrix}$, $\frac{1}{S}\begin{bmatrix}1&1\\-1&-j\\-1&1\\-1&j\\-1&-1\\j&-j\\-j&-1\\1&-j\end{bmatrix}$, $\frac{1}{S}\begin{bmatrix}1&1\\-j&1\\-1&-1\\j&-1\\1&1\\j&-1\\-j&-1\\j&1\end{bmatrix}$, $\frac{1}{S}\begin{bmatrix}1&1\\-j&1\\-1&-1\\j&-1\\j&1\\1&-j\\-j&-j\\-1&-j\end{bmatrix}$ |
| 16-23 | $\frac{1}{S}\begin{bmatrix}1&1\\1&-1\\1&1\\1&-1\\1&-1\\1&1\\1&-1\\1&1\end{bmatrix}$, $\frac{1}{S}\begin{bmatrix}1&1\\1&-1\\1&1\\1&-1\\j&-j\\j&j\\j&-j\\j&j\end{bmatrix}$, $\frac{1}{S}\begin{bmatrix}1&1\\j&-j\\-1&-1\\-j&j\\1&-1\\j&j\\-1&1\\-j&-j\end{bmatrix}$, $\frac{1}{S}\begin{bmatrix}1&1\\j&-j\\-1&-1\\-j&j\\j&-j\\-1&-1\\-j&j\\1&1\end{bmatrix}$, $\frac{1}{S}\begin{bmatrix}1&1\\-1&1\\1&1\\-1&1\\-1&1\\-1&-1\\1&-1\\-1&-1\end{bmatrix}$, $\frac{1}{S}\begin{bmatrix}1&1\\-1&1\\1&1\\-1&1\\-1&1\\j&-j\\-j&-j\\-1&-1\end{bmatrix}$, $\frac{1}{S}\begin{bmatrix}1&1\\-j&j\\-1&-1\\j&-j\\-j&-j\\1&1\\-j&-j\\-1&-1\end{bmatrix}$, $\frac{1}{S}\begin{bmatrix}1&1\\-j&j\\-1&-1\\j&-j\\1&1\\j&-j\\-1&1\\-1&-1\end{bmatrix}$ |
| 24-31 | $\frac{1}{S}\begin{bmatrix}1&1\\1&-j\\1&-1\\1&j\\1&-1\\1&j\\1&1\\1&-j\end{bmatrix}$, $\frac{1}{S}\begin{bmatrix}1&1\\1&-j\\1&-1\\1&j\\j&-j\\j&-1\\j&j\\j&1\end{bmatrix}$, $\frac{1}{S}\begin{bmatrix}1&1\\j&1\\-1&1\\-j&1\\1&-1\\-j&1\\j&-1\\-j&-1\end{bmatrix}$, $\frac{1}{S}\begin{bmatrix}1&1\\j&1\\-1&1\\-j&1\\j&-j\\-1&-j\\-j&-j\\1&-j\end{bmatrix}$, $\frac{1}{S}\begin{bmatrix}1&1\\-1&j\\1&-1\\-1&-j\\-1&-j\\-1&-j\\-j&1\\1&1\end{bmatrix}$, $\frac{1}{S}\begin{bmatrix}1&1\\-1&j\\1&-1\\-1&-j\\-1&-j\\-1&-j\\-j&1\\-j&1\end{bmatrix}$, $\frac{1}{S}\begin{bmatrix}1&1\\-j&-1\\-1&1\\j&-1\\j&-1\\j&-1\\-j&1\\j&1\end{bmatrix}$, $\frac{1}{S}\begin{bmatrix}1&1\\-j&-1\\-1&1\\j&-1\\j&-1\\j&-1\\1&j\\-j&-j\end{bmatrix}$ | the UL codebook for three layers includes all of or a subset of the following, S=$2\sqrt{6}$:

| TPMI index | W (ordered from left to right in increasing order of TPMI index) |
|---|---|
| 0-23 | $\frac{1}{S}\begin{bmatrix} 1 & 1 & 1 \\ 1 & j & 1 \\ 1 & -1 & 1 \\ 1 & -j & 1 \\ 1 & 1 & -1 \\ 1 & j & -1 \\ 1 & -1 & -1 \\ 1 & -j & -1 \end{bmatrix}$ $\frac{1}{S}\begin{bmatrix} 1 & 1 & 1 \\ 1 & j & 1 \\ -1 & -1 & 1 \\ 1 & -j & 1 \\ j & j & -j \\ j & -1 & -j \\ j & -j & -j \\ j & 1 & -j \end{bmatrix}$ $\frac{1}{S}\begin{bmatrix} 1 & 1 & 1 \\ j & -1 & j \\ -1 & 1 & -1 \\ -j & -1 & -j \\ 1 & 1 & -1 \\ j & -1 & -j \\ -1 & 1 & 1 \\ -j & -1 & j \end{bmatrix}$ $\frac{1}{S}\begin{bmatrix} 1 & 1 & 1 \\ j & -1 & j \\ -1 & 1 & -1 \\ -j & -1 & -j \\ j & j & -j \\ -1 & -j & 1 \\ -j & j & j \\ 1 & -j & -1 \end{bmatrix}$ $\frac{1}{S}\begin{bmatrix} 1 & 1 & 1 \\ -1 & -j & -1 \\ 1 & -1 & 1 \\ -1 & j & -1 \\ 1 & 1 & -1 \\ -1 & -j & 1 \\ 1 & -1 & -1 \\ -1 & j & 1 \end{bmatrix}$ $\frac{1}{S}\begin{bmatrix} 1 & 1 & 1 \\ -1 & -j & -1 \\ 1 & -1 & 1 \\ -1 & j & -1 \\ j & j & -j \\ -j & 1 & j \\ j & -j & -j \\ -j & -1 & j \end{bmatrix}$ $\frac{1}{S}\begin{bmatrix} 1 & 1 & 1 \\ -j & 1 & -j \\ -1 & 1 & -1 \\ j & 1 & j \\ 1 & 1 & -1 \\ -j & 1 & j \\ -1 & 1 & 1 \\ j & 1 & -j \end{bmatrix}$ |
| | $\frac{1}{S}\begin{bmatrix} 1 & 1 & 1 \\ -j & 1 & -j \\ -1 & 1 & -1 \\ j & 1 & j \\ j & j & -j \\ 1 & j & -1 \\ -j & j & j \\ -1 & j & 1 \end{bmatrix}$ $\frac{1}{S}\begin{bmatrix} 1 & 1 & 1 \\ 1 & -1 & 1 \\ 1 & 1 & 1 \\ 1 & -1 & 1 \\ 1 & 1 & -1 \\ 1 & -1 & -1 \\ 1 & 1 & -1 \\ 1 & -1 & -1 \end{bmatrix}$ $\frac{1}{S}\begin{bmatrix} 1 & 1 & 1 \\ 1 & -1 & 1 \\ 1 & 1 & 1 \\ 1 & -1 & 1 \\ j & j & -j \\ j & -j & -j \\ j & j & -j \\ j & -j & -j \end{bmatrix}$ $\frac{1}{S}\begin{bmatrix} 1 & 1 & 1 \\ j & -j & j \\ -1 & -1 & -1 \\ -j & j & -j \\ 1 & 1 & -1 \\ j & -j & j \\ -1 & -1 & 1 \\ -j & j & -j \end{bmatrix}$ $\frac{1}{S}\begin{bmatrix} 1 & 1 & 1 \\ j & -j & j \\ -1 & -1 & -1 \\ -j & j & -j \\ j & j & -j \\ -1 & 1 & 1 \\ -j & -j & j \\ 1 & -1 & -1 \end{bmatrix}$ $\frac{1}{S}\begin{bmatrix} 1 & 1 & 1 \\ -1 & 1 & -1 \\ 1 & 1 & 1 \\ -1 & 1 & -1 \\ 1 & 1 & -1 \\ -1 & 1 & 1 \\ 1 & 1 & -1 \\ -1 & 1 & 1 \end{bmatrix}$ $\frac{1}{S}\begin{bmatrix} 1 & 1 & 1 \\ -1 & 1 & -1 \\ 1 & 1 & 1 \\ -1 & 1 & -1 \\ j & j & -j \\ -j & j & j \\ j & j & -j \\ -j & j & j \end{bmatrix}$ |
| | $\frac{1}{S}\begin{bmatrix} 1 & 1 & 1 \\ -j & j & -j \\ -1 & -1 & -1 \\ j & -j & j \\ 1 & 1 & -1 \\ -j & j & j \\ -1 & -1 & 1 \\ j & -j & -j \end{bmatrix}$ $\frac{1}{S}\begin{bmatrix} 1 & 1 & 1 \\ -j & j & -j \\ -1 & -1 & -1 \\ j & -j & j \\ j & j & -j \\ 1 & -1 & -1 \\ -j & -j & j \\ -1 & 1 & 1 \end{bmatrix}$ $\frac{1}{S}\begin{bmatrix} 1 & 1 & 1 \\ 1 & -j & 1 \\ 1 & -1 & 1 \\ 1 & j & 1 \\ 1 & 1 & -1 \\ 1 & -j & -1 \\ 1 & -1 & -1 \\ 1 & j & -1 \end{bmatrix}$ $\frac{1}{S}\begin{bmatrix} 1 & 1 & 1 \\ 1 & -j & 1 \\ 1 & -1 & 1 \\ 1 & j & 1 \\ j & j & -j \\ j & 1 & -j \\ j & -j & -j \\ j & -1 & -j \end{bmatrix}$ $\frac{1}{S}\begin{bmatrix} 1 & 1 & 1 \\ j & 1 & j \\ -1 & 1 & -1 \\ -j & 1 & -j \\ 1 & 1 & -1 \\ j & 1 & -j \\ -1 & 1 & 1 \\ -j & 1 & j \end{bmatrix}$ $\frac{1}{S}\begin{bmatrix} 1 & 1 & 1 \\ j & 1 & j \\ -1 & 1 & -1 \\ -j & 1 & -j \\ j & j & -j \\ -1 & j & 1 \\ -j & j & j \\ 1 & j & -1 \end{bmatrix}$ $\frac{1}{S}\begin{bmatrix} 1 & 1 & 1 \\ -1 & j & -1 \\ 1 & -1 & 1 \\ -1 & -j & -1 \\ 1 & 1 & -1 \\ -1 & j & 1 \\ 1 & -1 & -1 \\ -1 & -j & 1 \end{bmatrix}$ |
| | $\frac{1}{S}\begin{bmatrix} 1 & 1 & 1 \\ -1 & j & -1 \\ 1 & -1 & 1 \\ -1 & -j & -1 \\ j & j & -j \\ -j & -1 & j \\ j & -j & -j \\ -j & 1 & j \end{bmatrix}$ $\frac{1}{S}\begin{bmatrix} 1 & 1 & 1 \\ -j & -1 & -j \\ -1 & 1 & -1 \\ j & -1 & j \\ 1 & 1 & -1 \\ -j & -1 & j \\ -1 & 1 & 1 \\ j & -1 & -j \end{bmatrix}$ $\frac{1}{S}\begin{bmatrix} 1 & 1 & 1 \\ -j & -1 & -j \\ -1 & 1 & -1 \\ j & -1 & j \\ j & j & -j \\ 1 & -j & -1 \\ -j & j & j \\ -1 & -j & 1 \end{bmatrix}$ | the UL codebook for four layers includes all of or a subset of the following, $S=4\sqrt{2}$:

| TPMI index | W (ordered from left to right in increasing order of TPMI index) |
|---|---|
| 0-23 | $\frac{1}{S}\begin{bmatrix} 1 & 1 & 1 & 1 \\ 1 & j & 1 & j \\ 1 & -1 & 1 & -1 \\ 1 & -j & 1 & -j \\ 1 & 1 & -1 & -1 \\ 1 & j & -1 & -j \\ 1 & -1 & -1 & 1 \\ 1 & -j & -1 & j \end{bmatrix}$ $\frac{1}{S}\begin{bmatrix} 1 & 1 & 1 & 1 \\ 1 & j & 1 & j \\ 1 & -1 & 1 & -1 \\ 1 & -j & 1 & -j \\ j & j & -j & -j \\ j & -1 & -j & 1 \\ j & -j & -j & j \\ j & 1 & -j & -1 \end{bmatrix}$ $\frac{1}{S}\begin{bmatrix} 1 & 1 & 1 & 1 \\ j & -1 & j & -1 \\ -1 & 1 & -1 & 1 \\ -j & -1 & -j & -1 \\ 1 & 1 & -1 & -1 \\ j & -1 & -j & 1 \\ -1 & 1 & 1 & -1 \\ -j & -1 & j & 1 \end{bmatrix}$ $\frac{1}{S}\begin{bmatrix} 1 & 1 & 1 & 1 \\ j & -1 & j & -1 \\ -1 & 1 & -1 & 1 \\ -j & -1 & -j & -1 \\ j & j & -j & -j \\ -1 & -j & 1 & j \\ -j & j & j & -j \\ 1 & -j & -1 & j \end{bmatrix}$ |
| | $\frac{1}{S}\begin{bmatrix} 1 & 1 & 1 & 1 \\ -1 & -j & -1 & -j \\ 1 & -1 & 1 & -1 \\ -1 & j & -1 & j \\ 1 & 1 & -1 & -1 \\ -1 & -j & 1 & j \\ 1 & -1 & -1 & 1 \\ -1 & j & 1 & -j \end{bmatrix}$ $\frac{1}{S}\begin{bmatrix} 1 & 1 & 1 & 1 \\ -1 & -j & -1 & -j \\ 1 & -1 & 1 & -1 \\ -1 & j & -1 & j \\ j & j & -j & -j \\ -j & 1 & j & -1 \\ j & -j & -j & j \\ -j & -1 & j & 1 \end{bmatrix}$ $\frac{1}{S}\begin{bmatrix} 1 & 1 & 1 & 1 \\ -j & 1 & -j & 1 \\ -1 & 1 & -1 & 1 \\ j & 1 & j & 1 \\ 1 & 1 & -1 & -1 \\ -j & 1 & j & -1 \\ -1 & 1 & 1 & -1 \\ j & 1 & -j & -1 \end{bmatrix}$ $\frac{1}{S}\begin{bmatrix} 1 & 1 & 1 & 1 \\ -j & 1 & -j & 1 \\ -1 & 1 & -1 & 1 \\ j & 1 & j & 1 \\ j & j & -j & -j \\ 1 & j & -1 & -j \\ -j & j & j & -j \\ -1 & j & 1 & -j \end{bmatrix}$ |

| TPMI index | W (ordered from left to right in increasing order of TPMI index) |
|---|---|
| | $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ 1 & 1 & -1 & -1 \\ 1 & -1 & -1 & 1 \\ 1 & 1 & -1 & -1 \\ 1 & -1 & -1 & 1 \end{bmatrix}$ $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ j & j & -j & -j \\ j & -j & -j & j \\ j & j & -j & -j \\ j & -j & -j & j \end{bmatrix}$ $\frac{1}{S}\begin{bmatrix} 1 & 1 & 1 & 1 \\ j & -j & j & -j \\ -1 & -1 & -1 & -1 \\ -j & j & -j & j \\ 1 & 1 & -1 & -1 \\ j & -j & -j & j \\ -1 & -1 & 1 & 1 \\ -j & j & j & -j \end{bmatrix}$ $\frac{1}{S}\begin{bmatrix} 1 & 1 & 1 & 1 \\ j & -j & j & -j \\ -1 & -1 & -1 & -1 \\ -j & j & -j & j \\ j & j & -j & -j \\ -1 & 1 & 1 & -1 \\ -j & -j & j & -j \\ 1 & -1 & -1 & 1 \end{bmatrix}$ |
| | $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ 1 & 1 & -1 & -1 \\ -1 & 1 & 1 & -1 \\ 1 & 1 & -1 & -1 \\ -1 & 1 & 1 & -1 \end{bmatrix}$ $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ j & j & -j & -j \\ -j & j & j & -j \\ j & j & -j & -j \\ -j & j & j & -j \end{bmatrix}$ $\frac{1}{S}\begin{bmatrix} 1 & 1 & 1 & 1 \\ -j & j & -j & j \\ -1 & -1 & -1 & -1 \\ j & -j & j & -j \\ 1 & 1 & -1 & -1 \\ -j & j & j & -j \\ -1 & -1 & 1 & 1 \\ j & -j & -j & j \end{bmatrix}$ $\frac{1}{S}\begin{bmatrix} 1 & 1 & 1 & 1 \\ -j & j & -j & j \\ -1 & -1 & -1 & -1 \\ j & -j & j & -j \\ j & j & -j & -j \\ 1 & -1 & -1 & 1 \\ -j & -j & -j & j \\ -1 & 1 & 1 & -1 \end{bmatrix}$ |
| | $\frac{1}{S}\begin{bmatrix} 1 & 1 & 1 & 1 \\ 1 & -j & 1 & -j \\ 1 & -1 & 1 & -1 \\ 1 & j & 1 & j \\ 1 & 1 & -1 & -1 \\ 1 & -j & -1 & j \\ 1 & -1 & -1 & 1 \\ 1 & j & -1 & -j \end{bmatrix}$ $\frac{1}{S}\begin{bmatrix} 1 & 1 & 1 & 1 \\ 1 & -j & 1 & -j \\ 1 & -1 & 1 & -1 \\ 1 & j & 1 & j \\ j & j & -j & -j \\ j & 1 & -j & -1 \\ j & -j & -j & j \\ j & -1 & -j & -j \end{bmatrix}$ $\frac{1}{S}\begin{bmatrix} 1 & 1 & 1 & 1 \\ j & 1 & j & 1 \\ -1 & 1 & -1 & 1 \\ -j & 1 & -j & 1 \\ 1 & 1 & -1 & -1 \\ j & 1 & -j & -1 \\ -1 & 1 & 1 & -1 \\ -j & 1 & j & -1 \end{bmatrix}$ $\frac{1}{S}\begin{bmatrix} 1 & 1 & 1 & 1 \\ j & 1 & j & 1 \\ -1 & 1 & -1 & 1 \\ -j & 1 & -j & 1 \\ j & j & -j & -j \\ -1 & j & 1 & -j \\ -j & j & j & -j \\ 1 & j & -1 & -j \end{bmatrix}$ |
| | $\frac{1}{S}\begin{bmatrix} 1 & 1 & 1 & 1 \\ -1 & j & -1 & j \\ 1 & -1 & 1 & -1 \\ -1 & -j & -1 & -j \\ 1 & 1 & -1 & -1 \\ -1 & j & 1 & -j \\ 1 & -1 & -1 & 1 \\ -1 & -j & 1 & j \end{bmatrix}$ $\frac{1}{S}\begin{bmatrix} 1 & 1 & 1 & 1 \\ -1 & j & -1 & j \\ 1 & -1 & 1 & -1 \\ -1 & -j & -1 & -j \\ j & j & -j & -j \\ -j & -1 & j & 1 \\ j & -j & -j & j \\ -j & 1 & j & -1 \end{bmatrix}$ $\frac{1}{S}\begin{bmatrix} 1 & 1 & 1 & 1 \\ -j & -1 & -j & -1 \\ -1 & 1 & -1 & 1 \\ j & -1 & j & -1 \\ 1 & 1 & -1 & -1 \\ -j & -1 & j & 1 \\ -1 & 1 & 1 & -1 \\ j & -1 & -j & 1 \end{bmatrix}$ $\frac{1}{S}\begin{bmatrix} 1 & 1 & 1 & 1 \\ -j & -1 & -j & -1 \\ -1 & 1 & -1 & 1 \\ j & -1 & j & -1 \\ j & j & -j & -j \\ 1 & -j & -1 & j \\ -j & j & j & -j \\ -1 & -j & 1 & j \end{bmatrix}$ | the UL codebook for five layers includes all of or a subset of the following, where $S=2\sqrt{10}$:

| TPMI index | W (ordered from left to right in increasing order of TPMI index) |
|---|---|
| 0-3 | $\frac{1}{S}\begin{bmatrix} 1 & 1 & 1 & 1 & 1 \\ 1 & 1 & j & j & -1 \\ 1 & 1 & -1 & -1 & 1 \\ 1 & 1 & -j & -j & -1 \\ 1 & -1 & 1 & -1 & 1 \\ 1 & -1 & j & -j & -1 \\ 1 & -1 & -1 & 1 & 1 \\ 1 & -1 & -j & j & -1 \end{bmatrix}$ $\frac{1}{S}\begin{bmatrix} 1 & 1 & 1 & 1 & 1 \\ 1 & 1 & j & j & -1 \\ 1 & 1 & -1 & -1 & 1 \\ 1 & 1 & -j & -j & -1 \\ j & -j & 1 & -1 & 1 \\ j & -j & j & -j & -1 \\ j & -j & -1 & 1 & 1 \\ j & -j & -j & j & -1 \end{bmatrix}$ $\frac{1}{S}\begin{bmatrix} 1 & 1 & 1 & 1 & 1 \\ j & j & -1 & -1 & -j \\ -1 & -1 & 1 & 1 & -1 \\ -j & -j & -1 & -1 & j \\ 1 & -1 & 1 & -1 & 1 \\ j & -j & -1 & 1 & -j \\ -1 & 1 & 1 & -1 & -1 \\ -j & j & -1 & 1 & j \end{bmatrix}$ $\frac{1}{S}\begin{bmatrix} 1 & 1 & 1 & 1 & 1 \\ j & j & -1 & -1 & -j \\ -1 & -1 & 1 & 1 & -1 \\ -j & -j & -1 & -1 & j \\ j & -j & 1 & -1 & 1 \\ -1 & 1 & -1 & 1 & -j \\ -j & j & 1 & -1 & -1 \\ 1 & -1 & 1 & -1 & j \end{bmatrix}$ |
| 4-7 | $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ 1 & -1 & 1 & -1 & 1 \\ -1 & 1 & -j & j & 1 \\ 1 & -1 & -1 & 1 & 1 \\ -1 & 1 & j & -j & 1 \end{bmatrix}$ $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ j & -j & 1 & -1 & 1 \\ -j & j & -j & j & 1 \\ j & -j & -1 & 1 & 1 \\ -j & j & j & -j & 1 \end{bmatrix}$ $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ 1 & -1 & 1 & -1 & 1 \\ -j & j & 1 & -1 & j \\ -1 & 1 & 1 & -1 & -1 \\ j & -j & 1 & -1 & -j \end{bmatrix}$ $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ j & -j & 1 & -1 & 1 \\ 1 & -1 & 1 & -1 & j \\ -j & j & 1 & -1 & -1 \\ -1 & 1 & 1 & -1 & -j \end{bmatrix}$ | the UL codebook for six layers includes all of or a subset of the following, where $S=4\sqrt{3}$:

| TPMI index | W (ordered from left to right in increasing order of TPMI index) |
|---|---|
| 0-3 | $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ 1 & -1 & 1 & -1 & 1 & -1 \\ 1 & -1 & j & -j & -1 & 1 \\ 1 & -1 & -1 & 1 & 1 & -1 \\ 1 & -1 & -j & j & -1 & 1 \end{bmatrix}$ $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ j & -j & j & -j & 1 & -1 \\ j & -j & -1 & 1 & -1 & 1 \\ j & -j & -j & j & 1 & -1 \\ j & -j & 1 & -1 & -1 & 1 \end{bmatrix}$ $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ 1 & -1 & 1 & -1 & 1 & -1 \\ j & -j & -1 & 1 & -j & j \\ -1 & 1 & 1 & -1 & -1 & 1 \\ -j & j & -1 & 1 & j & -j \end{bmatrix}$ $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ j & -j & j & -j & 1 & -1 \\ -1 & 1 & -j & j & -j & j \\ -j & j & j & -j & -1 & 1 \\ 1 & -1 & -j & j & j & -j \end{bmatrix}$ |
| 4-7 | $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ 1 & -1 & 1 & -1 & 1 & -1 \\ -1 & 1 & -j & j & 1 & -1 \\ 1 & -1 & -1 & 1 & 1 & -1 \\ -1 & 1 & j & -j & 1 & -1 \end{bmatrix}$ $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ j & -j & j & -j & 1 & -1 \\ -j & j & -1 & 1 & 1 & -1 \\ j & -j & -j & -j & 1 & -1 \\ -j & j & 1 & -1 & 1 & -1 \end{bmatrix}$ $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ 1 & -1 & 1 & -1 & 1 & -1 \\ -j & j & 1 & -1 & j & -j \\ -1 & 1 & 1 & -1 & -1 & 1 \\ j & -j & 1 & -1 & -j & j \end{bmatrix}$ $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ j & -j & j & -j & 1 & -1 \\ 1 & -1 & j & -j & j & -j \\ -j & -j & j & -j & -1 & 1 \\ -1 & 1 & j & -j & -j & j \end{bmatrix}$ | the UL codebook for seven layers includes all of or a subset of the following, where $S=2\sqrt{14}$:

| TPMI index | W (ordered from left to right in increasing order of TPMI index) |
|---|---|
| 0-3 | $\frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ 1 & -1 & 1 & 1 & -1 & 1 & -1 \\ 1 & -1 & j & -1 & 1 & -j & j \\ 1 & -1 & -1 & 1 & -1 & -1 & 1 \\ 1 & -1 & -j & -1 & 1 & j & -j \end{bmatrix}$ $\frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ j & -j & j & 1 & -1 & 1 & -1 \\ j & -j & -1 & -1 & 1 & -j & j \\ j & -j & -j & 1 & -1 & -1 & 1 \\ j & -j & 1 & -1 & 1 & j & -j \end{bmatrix}$ |
|  | $\frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ 1 & -1 & 1 & 1 & -1 & 1 & -1 \\ j & -j & -1 & -j & j & 1 & -1 \\ -1 & 1 & 1 & -1 & 1 & 1 & -1 \\ -j & j & -1 & j & -j & 1 & -1 \end{bmatrix}$ $\frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ j & -j & j & 1 & -1 & 1 & -1 \\ -1 & 1 & -j & -j & j & 1 & -1 \\ -j & j & j & -1 & 1 & 1 & -1 \\ 1 & -1 & -j & j & -j & 1 & -1 \end{bmatrix}$ | the UL codebook for eight layers includes all of or a subset of the following, where $S=8$:

| TPMI index | W (ordered from left to right in increasing order of TPMI index) |
|---|---|
| 0-3 | $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ 1 & -1 & 1 & -1 & 1 & -1 & 1 & -1 \\ 1 & -1 & j & -j & -1 & 1 & -j & j \\ 1 & -1 & -1 & 1 & 1 & -1 & -1 & 1 \\ 1 & -1 & -j & j & -1 & 1 & j & -j \end{bmatrix}$ $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ j & -j & j & -j & 1 & -1 & 1 & -1 \\ j & -j & -1 & 1 & -1 & 1 & -j & j \\ j & -j & -j & j & 1 & -1 & -1 & 1 \\ j & -j & 1 & -1 & -1 & 1 & j & -j \end{bmatrix}$ |
|  | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ 1 & -1 & 1 & -1 & 1 & -1 & 1 & -1 \\ j & -j & -1 & 1 & -j & j & 1 & -1 \\ -1 & 1 & 1 & -1 & -1 & 1 & 1 & -1 \\ -j & j & -1 & 1 & j & -j & 1 & -1 \end{bmatrix}$ $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ j & -j & -1 & -1 & j & j & 1 & 1 \\ j & -j & -1 & -1 & j & j & 1 & -1 \\ j & -j & -j & j & 1 & -1 & 1 & -1 \\ -j & j & -j & -1 & 1 & 1 & -1 \\ 1 & -1 & -j & j & j & -j & 1 & -1 \end{bmatrix}$. |

7. The UE of claim 5, wherein $(N_g, N_1, N_2)=(1, 2, 2)$:
the UL codebook for two layers includes all of or a subset of the following, where S=4:

| W (ordered from left to right in increasing order of TPMI index) |
|---|

$$\frac{1}{S}\begin{bmatrix}1&1\\1&1\\1&1\\1&1\\1&-1\\1&-1\\1&-1\\1&-1\end{bmatrix} \quad \frac{1}{S}\begin{bmatrix}1&1\\1&1\\1&1\\1&1\\j&-j\\j&-j\\j&-j\\j&-j\end{bmatrix} \quad \frac{1}{S}\begin{bmatrix}1&1\\-1&-1\\1&1\\-1&-1\\1&-1\\-1&1\\1&-1\\-1&1\end{bmatrix} \quad \frac{1}{S}\begin{bmatrix}1&1\\-1&-1\\1&1\\-1&-1\\j&-j\\-j&j\\j&-j\\-j&j\end{bmatrix} \quad \frac{1}{S}\begin{bmatrix}1&1\\1&1\\-1&-1\\-1&-1\\1&-1\\1&-1\\-1&1\\-1&1\end{bmatrix} \quad \frac{1}{S}\begin{bmatrix}1&1\\1&1\\-1&-1\\-1&-1\\j&-j\\j&-j\\-j&j\\-j&j\end{bmatrix} \quad \frac{1}{S}\begin{bmatrix}1&1\\-1&-1\\-1&-1\\1&1\\1&-1\\-1&1\\-1&1\\1&-1\end{bmatrix} \quad \frac{1}{S}\begin{bmatrix}1&1\\-1&-1\\-1&-1\\1&1\\j&-j\\-j&j\\-j&j\\j&-j\end{bmatrix}$$

$$\frac{1}{S}\begin{bmatrix}1&1\\1&-1\\1&1\\1&-1\\1&-1\\1&1\\1&-1\\1&1\end{bmatrix} \quad \frac{1}{S}\begin{bmatrix}1&1\\1&-1\\1&1\\1&-1\\j&-j\\j&j\\j&-j\\j&j\end{bmatrix} \quad \frac{1}{S}\begin{bmatrix}1&1\\-1&1\\1&-1\\-1&-1\\1&-1\\-1&1\\1&1\\-1&1\end{bmatrix} \quad \frac{1}{S}\begin{bmatrix}1&1\\-1&1\\1&-1\\-1&-1\\j&-j\\-j&-j\\j&j\\-j&j\end{bmatrix} \quad \frac{1}{S}\begin{bmatrix}1&1\\1&-1\\-1&-1\\-1&-1\\1&-1\\1&1\\-1&1\\-1&-1\end{bmatrix} \quad \frac{1}{S}\begin{bmatrix}1&1\\1&-1\\-1&-1\\-1&-1\\j&-j\\j&j\\-j&-j\\-j&-j\end{bmatrix} \quad \frac{1}{S}\begin{bmatrix}1&1\\-1&1\\-1&1\\-1&1\\1&-1\\-1&-1\\-1&-1\\1&-1\end{bmatrix} \quad \frac{1}{S}\begin{bmatrix}1&1\\-1&1\\-1&1\\-1&1\\j&-j\\-j&-j\\-j&-j\\j&-j\end{bmatrix}$$

$$\frac{1}{S}\begin{bmatrix}1&1\\1&1\\1&-1\\1&-1\\1&-1\\1&-1\\1&1\\1&1\end{bmatrix} \quad \frac{1}{S}\begin{bmatrix}1&1\\1&1\\1&-1\\1&-1\\j&-j\\j&-j\\j&j\\j&j\end{bmatrix} \quad \frac{1}{S}\begin{bmatrix}1&1\\-1&-1\\1&-1\\-1&1\\1&-1\\-1&1\\1&1\\-1&-1\end{bmatrix} \quad \frac{1}{S}\begin{bmatrix}1&1\\-1&-1\\1&-1\\-1&1\\j&-j\\-j&j\\j&j\\-j&-j\end{bmatrix} \quad \frac{1}{S}\begin{bmatrix}1&1\\1&1\\-1&1\\-1&1\\1&-1\\1&-1\\-1&-1\\-1&-1\end{bmatrix} \quad \frac{1}{S}\begin{bmatrix}1&1\\1&1\\-1&1\\-1&1\\j&-j\\j&-j\\-j&-j\\-j&-j\end{bmatrix} \quad \frac{1}{S}\begin{bmatrix}1&1\\-1&-1\\-1&1\\1&-1\\1&-1\\-1&1\\-1&-1\\1&1\end{bmatrix} \quad \frac{1}{S}\begin{bmatrix}1&1\\-1&-1\\-1&1\\1&-1\\j&-j\\-j&j\\-j&-j\\j&j\end{bmatrix}$$

$$\frac{1}{S}\begin{bmatrix}1&1\\1&-1\\1&-1\\1&1\\1&-1\\1&1\\1&1\\1&-1\end{bmatrix} \quad \frac{1}{S}\begin{bmatrix}1&1\\1&-1\\1&-1\\1&1\\j&-j\\j&j\\j&j\\j&-j\end{bmatrix} \quad \frac{1}{S}\begin{bmatrix}1&1\\-1&1\\1&1\\-1&1\\1&-1\\-1&-1\\1&-1\\-1&-1\end{bmatrix} \quad \frac{1}{S}\begin{bmatrix}1&1\\-1&1\\1&1\\-1&1\\j&-j\\-j&-j\\j&-j\\-j&-j\end{bmatrix} \quad \frac{1}{S}\begin{bmatrix}1&1\\1&-1\\-1&1\\-1&-1\\1&-1\\1&1\\-1&1\\-1&1\end{bmatrix} \quad \frac{1}{S}\begin{bmatrix}1&1\\1&-1\\-1&1\\-1&-1\\j&-j\\j&j\\-j&j\\-j&j\end{bmatrix} \quad \frac{1}{S}\begin{bmatrix}1&1\\-1&1\\-1&-1\\1&-1\\1&-1\\-1&-1\\-1&1\\1&1\end{bmatrix} \quad \frac{1}{S}\begin{bmatrix}1&1\\-1&1\\-1&-1\\1&-1\\j&-j\\-j&-j\\-j&-j\\j&j\end{bmatrix}$$

the UL codebook for three layers includes all of or a subset of the following, where $S=2\sqrt{6}$:

| W (ordered from left to right in increasing order of TPMI index) |
|---|

$$\frac{1}{S}\begin{bmatrix}1&1&1\\1&-1&1\\1&1&1\\1&-1&1\\1&1&-1\\1&-1&-1\\1&1&-1\\1&-1&-1\end{bmatrix} \quad \frac{1}{S}\begin{bmatrix}1&1&1\\1&-1&1\\1&1&1\\1&-1&1\\j&j&-j\\j&-j&-j\\j&j&-j\\j&-j&-j\end{bmatrix} \quad \frac{1}{S}\begin{bmatrix}1&1&1\\-1&1&-1\\1&-1&1\\-1&-1&-1\\1&1&-1\\-1&1&1\\1&-1&-1\\-1&-1&1\end{bmatrix} \quad \frac{1}{S}\begin{bmatrix}1&1&1\\-1&1&-1\\1&-1&1\\-1&-1&-1\\j&j&-j\\-j&j&j\\j&-j&-j\\-j&-j&j\end{bmatrix} \quad \frac{1}{S}\begin{bmatrix}1&1&1\\1&-1&1\\-1&-1&-1\\-1&1&-1\\1&1&-1\\1&-1&-1\\-1&-1&1\\-1&1&1\end{bmatrix}$$

$$\frac{1}{S}\begin{bmatrix}1&1&1\\1&-1&1\\-1&-1&-1\\-1&1&-1\\j&j&-j\\j&-j&-j\\-j&-j&j\\-j&j&j\end{bmatrix} \quad \frac{1}{S}\begin{bmatrix}1&1&1\\-1&1&-1\\-1&1&-1\\1&1&1\\1&1&-1\\-1&1&1\\-1&1&1\\1&1&-1\end{bmatrix} \quad \frac{1}{S}\begin{bmatrix}1&1&1\\-1&1&-1\\-1&1&-1\\1&1&1\\j&j&-j\\-j&j&j\\-j&j&j\\j&j&-j\end{bmatrix} \quad \frac{1}{S}\begin{bmatrix}1&1&1\\1&1&1\\1&-1&1\\1&-1&1\\1&1&-1\\1&1&-1\\1&-1&-1\\1&-1&-1\end{bmatrix} \quad \frac{1}{S}\begin{bmatrix}1&1&1\\1&1&1\\1&-1&1\\1&-1&1\\j&j&-j\\j&j&-j\\j&-j&-j\\j&-j&-j\end{bmatrix}$$

| W (ordered from left to right in increasing order of TPMI index) |

$$\frac{1}{S}\begin{bmatrix} 1 & 1 & 1 \\ -1 & -1 & -1 \\ 1 & -1 & 1 \\ -1 & 1 & -1 \\ 1 & 1 & -1 \\ -1 & -1 & 1 \\ 1 & -1 & -1 \\ -1 & 1 & 1 \end{bmatrix} \quad \frac{1}{S}\begin{bmatrix} 1 & 1 & 1 \\ -1 & -1 & -1 \\ 1 & -1 & 1 \\ -1 & 1 & -1 \\ j & j & -j \\ -j & -j & j \\ j & -j & -j \\ -j & j & j \end{bmatrix} \quad \frac{1}{S}\begin{bmatrix} 1 & 1 & 1 \\ 1 & 1 & 1 \\ -1 & 1 & -1 \\ -1 & 1 & -1 \\ 1 & 1 & -1 \\ 1 & 1 & -1 \\ -1 & 1 & 1 \\ -1 & 1 & 1 \end{bmatrix} \quad \frac{1}{S}\begin{bmatrix} 1 & 1 & 1 \\ 1 & 1 & 1 \\ -1 & 1 & -1 \\ -1 & 1 & -1 \\ j & j & -j \\ j & j & -j \\ -j & j & j \\ -j & j & j \end{bmatrix} \quad \frac{1}{S}\begin{bmatrix} 1 & 1 & 1 \\ -1 & -1 & -1 \\ -1 & 1 & -1 \\ 1 & -1 & 1 \\ 1 & 1 & -1 \\ -1 & -1 & 1 \\ -1 & 1 & 1 \\ 1 & -1 & -1 \end{bmatrix}$$

$$\frac{1}{S}\begin{bmatrix} 1 & 1 & 1 \\ -1 & -1 & -1 \\ -1 & 1 & -1 \\ 1 & -1 & 1 \\ j & j & -j \\ -j & -j & j \\ -j & j & j \\ j & -j & -j \end{bmatrix} \quad \frac{1}{S}\begin{bmatrix} 1 & 1 & 1 \\ 1 & -1 & 1 \\ 1 & -1 & 1 \\ 1 & 1 & 1 \\ 1 & 1 & -1 \\ 1 & -1 & -1 \\ 1 & -1 & -1 \\ 1 & 1 & -1 \end{bmatrix} \quad \frac{1}{S}\begin{bmatrix} 1 & 1 & 1 \\ 1 & -1 & 1 \\ 1 & -1 & 1 \\ 1 & 1 & 1 \\ j & j & -j \\ j & -j & -j \\ j & -j & -j \\ j & j & -j \end{bmatrix} \quad \frac{1}{S}\begin{bmatrix} 1 & 1 & 1 \\ -1 & 1 & -1 \\ 1 & 1 & 1 \\ -1 & 1 & -1 \\ 1 & 1 & -1 \\ -1 & 1 & 1 \\ 1 & 1 & -1 \\ -1 & 1 & 1 \end{bmatrix} \quad \frac{1}{S}\begin{bmatrix} 1 & 1 & 1 \\ -1 & 1 & -1 \\ 1 & 1 & 1 \\ -1 & 1 & -1 \\ j & j & -j \\ -j & j & j \\ j & j & -j \\ -j & j & j \end{bmatrix}$$

$$\frac{1}{S}\begin{bmatrix} 1 & 1 & 1 \\ 1 & -1 & 1 \\ -1 & 1 & -1 \\ -1 & -1 & -1 \\ 1 & 1 & -1 \\ 1 & -1 & -1 \\ -1 & 1 & 1 \\ -1 & -1 & 1 \end{bmatrix} \quad \frac{1}{S}\begin{bmatrix} 1 & 1 & 1 \\ 1 & -1 & 1 \\ -1 & 1 & -1 \\ -1 & -1 & -1 \\ j & j & -j \\ j & -j & -j \\ -j & j & j \\ -j & -j & j \end{bmatrix} \quad \frac{1}{S}\begin{bmatrix} 1 & 1 & 1 \\ -1 & 1 & -1 \\ -1 & -1 & -1 \\ 1 & -1 & 1 \\ 1 & 1 & -1 \\ -1 & 1 & 1 \\ -1 & -1 & 1 \\ 1 & -1 & -1 \end{bmatrix} \quad \frac{1}{S}\begin{bmatrix} 1 & 1 & 1 \\ -1 & 1 & -1 \\ -1 & -1 & -1 \\ 1 & -1 & 1 \\ j & j & -j \\ -j & j & j \\ -j & -j & j \\ j & -j & -j \end{bmatrix}$$

the UL codebook for four layers includes all of or a subset of the following, where $S=4\sqrt{2}$:

| W (ordered from left to right in increasing order of TPMI index) |

$$\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ 1 & 1 & -1 & -1 \\ 1 & -1 & -1 & 1 \\ 1 & 1 & -1 & -1 \\ 1 & -1 & -1 & 1 \end{bmatrix} \quad \frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ j & j & -j & -j \\ j & -j & -j & j \\ j & j & -j & -j \\ j & -j & -j & j \end{bmatrix} \quad \frac{1}{S}\begin{bmatrix} 1 & 1 & 1 & 1 \\ -1 & 1 & -1 & 1 \\ 1 & -1 & 1 & -1 \\ -1 & -1 & -1 & -1 \\ 1 & 1 & -1 & -1 \\ -1 & 1 & 1 & -1 \\ 1 & -1 & -1 & 1 \\ -1 & -1 & 1 & 1 \end{bmatrix} \quad \frac{1}{S}\begin{bmatrix} 1 & 1 & 1 & 1 \\ -1 & 1 & -1 & 1 \\ 1 & -1 & 1 & -1 \\ -1 & -1 & -1 & -1 \\ j & j & -j & -j \\ -j & j & j & -j \\ j & -j & -j & j \\ -j & -j & j & j \end{bmatrix}$$

$$\frac{1}{S}\begin{bmatrix} 1 & 1 & 1 & 1 \\ 1 & -1 & 1 & -1 \\ -1 & -1 & -1 & -1 \\ -1 & 1 & -1 & 1 \\ 1 & 1 & -1 & -1 \\ 1 & -1 & -1 & 1 \\ -1 & -1 & 1 & 1 \\ -1 & 1 & 1 & -1 \end{bmatrix} \quad \frac{1}{S}\begin{bmatrix} 1 & 1 & 1 & 1 \\ 1 & -1 & 1 & -1 \\ -1 & -1 & -1 & -1 \\ -1 & 1 & -1 & 1 \\ j & j & -j & -j \\ j & -j & -j & j \\ -j & -j & j & j \\ -j & j & j & -j \end{bmatrix} \quad \frac{1}{S}\begin{bmatrix} 1 & 1 & 1 & 1 \\ -1 & 1 & -1 & 1 \\ -1 & 1 & -1 & 1 \\ 1 & 1 & 1 & 1 \\ 1 & 1 & -1 & -1 \\ -1 & 1 & 1 & -1 \\ -1 & 1 & 1 & -1 \\ 1 & 1 & -1 & -1 \end{bmatrix} \quad \frac{1}{S}\begin{bmatrix} 1 & 1 & 1 & 1 \\ -1 & 1 & -1 & 1 \\ -1 & 1 & -1 & 1 \\ 1 & 1 & 1 & 1 \\ j & j & -j & -j \\ -j & j & j & -j \\ -j & j & j & -j \\ j & j & -j & -j \end{bmatrix}$$

$$\frac{1}{S}\begin{bmatrix} 1 & 1 & 1 & 1 \\ 1 & 1 & 1 & 1 \\ 1 & -1 & 1 & -1 \\ 1 & -1 & 1 & -1 \\ 1 & 1 & -1 & -1 \\ 1 & 1 & -1 & -1 \\ 1 & -1 & -1 & 1 \\ 1 & -1 & -1 & 1 \end{bmatrix} \quad \frac{1}{S}\begin{bmatrix} 1 & 1 & 1 & 1 \\ 1 & 1 & 1 & 1 \\ 1 & -1 & 1 & -1 \\ 1 & -1 & 1 & -1 \\ j & j & -j & -j \\ j & j & -j & -j \\ j & -j & -j & j \\ j & -j & -j & j \end{bmatrix} \quad \frac{1}{S}\begin{bmatrix} 1 & 1 & 1 & 1 \\ -1 & -1 & -1 & -1 \\ 1 & -1 & 1 & -1 \\ -1 & 1 & -1 & 1 \\ 1 & 1 & -1 & -1 \\ -1 & -1 & 1 & 1 \\ 1 & -1 & -1 & 1 \\ -1 & 1 & 1 & -1 \end{bmatrix} \quad \frac{1}{S}\begin{bmatrix} 1 & 1 & 1 & 1 \\ -1 & -1 & -1 & -1 \\ 1 & -1 & 1 & -1 \\ -1 & 1 & -1 & 1 \\ j & j & -j & -j \\ -j & -j & j & j \\ j & -j & -j & j \\ -j & j & j & -j \end{bmatrix}$$

W (ordered from left to right in increasing order of TPMI index)

$$\frac{1}{S}\begin{bmatrix} 1 & 1 & 1 & 1 \\ 1 & 1 & 1 & 1 \\ -1 & 1 & -1 & 1 \\ -1 & 1 & -1 & 1 \\ 1 & 1 & -1 & -1 \\ 1 & 1 & -1 & -1 \\ -1 & 1 & 1 & -1 \\ -1 & 1 & 1 & -1 \end{bmatrix} \quad \frac{1}{S}\begin{bmatrix} 1 & 1 & 1 & 1 \\ 1 & 1 & 1 & 1 \\ -1 & 1 & -1 & 1 \\ -1 & 1 & -1 & 1 \\ j & j & -j & -j \\ j & j & -j & -j \\ -j & j & j & -j \\ -j & j & j & -j \end{bmatrix} \quad \frac{1}{S}\begin{bmatrix} 1 & 1 & 1 & 1 \\ -1 & -1 & -1 & -1 \\ -1 & 1 & -1 & 1 \\ 1 & -1 & 1 & -1 \\ 1 & 1 & -1 & -1 \\ -1 & -1 & 1 & 1 \\ -1 & 1 & 1 & -1 \\ 1 & -1 & -1 & 1 \end{bmatrix} \quad \frac{1}{S}\begin{bmatrix} 1 & 1 & 1 & 1 \\ -1 & -1 & -1 & -1 \\ -1 & 1 & -1 & 1 \\ 1 & -1 & 1 & -1 \\ j & j & -j & -j \\ -j & -j & j & j \\ -j & j & j & -j \\ j & -j & -j & j \end{bmatrix}$$

$$\frac{1}{S}\begin{bmatrix} 1 & 1 & 1 & 1 \\ 1 & -1 & 1 & -1 \\ 1 & -1 & 1 & -1 \\ 1 & 1 & 1 & 1 \\ 1 & 1 & -1 & -1 \\ 1 & -1 & -1 & 1 \\ 1 & -1 & -1 & 1 \\ 1 & 1 & -1 & -1 \end{bmatrix} \quad \frac{1}{S}\begin{bmatrix} 1 & 1 & 1 & 1 \\ 1 & -1 & 1 & -1 \\ 1 & -1 & 1 & -1 \\ 1 & 1 & 1 & 1 \\ j & j & -j & -j \\ j & -j & -j & j \\ j & -j & -j & j \\ j & j & -j & -j \end{bmatrix} \quad \frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ 1 & 1 & -1 & -1 \\ -1 & 1 & 1 & -1 \\ 1 & 1 & -1 & -1 \\ -1 & 1 & 1 & -1 \end{bmatrix} \quad \frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ j & j & -j & -j \\ -j & j & j & -j \\ j & j & -j & -j \\ -j & j & j & -j \end{bmatrix}$$

$$\frac{1}{S}\begin{bmatrix} 1 & 1 & 1 & 1 \\ 1 & -1 & 1 & -1 \\ -1 & 1 & -1 & 1 \\ -1 & -1 & -1 & -1 \\ 1 & 1 & -1 & -1 \\ 1 & -1 & -1 & 1 \\ -1 & 1 & 1 & -1 \\ -1 & -1 & 1 & 1 \end{bmatrix} \quad \frac{1}{S}\begin{bmatrix} 1 & 1 & 1 & 1 \\ 1 & -1 & 1 & -1 \\ -1 & 1 & -1 & 1 \\ -1 & -1 & -1 & -1 \\ j & j & -j & -j \\ j & -j & -j & j \\ -j & j & j & -j \\ -j & -j & j & j \end{bmatrix} \quad \frac{1}{S}\begin{bmatrix} 1 & 1 & 1 & 1 \\ -1 & 1 & -1 & 1 \\ -1 & -1 & -1 & -1 \\ 1 & -1 & 1 & -1 \\ 1 & 1 & -1 & -1 \\ -1 & 1 & 1 & -1 \\ -1 & -1 & 1 & 1 \\ 1 & -1 & -1 & 1 \end{bmatrix} \quad \frac{1}{S}\begin{bmatrix} 1 & 1 & 1 & 1 \\ -1 & 1 & -1 & 1 \\ -1 & -1 & -1 & -1 \\ 1 & -1 & 1 & -1 \\ j & j & -j & -j \\ -j & j & j & -j \\ -j & -j & j & j \\ j & -j & -j & j \end{bmatrix}$$

the UL codebook for five layers includes all of or a subset of the following, where $S=2\sqrt{10}$:

W (ordered from left to right in increasing order of TPMI index)

$$\frac{1}{S}\begin{bmatrix} 1 & 1 & 1 & 1 & 1 \\ 1 & 1 & -1 & -1 & 1 \\ 1 & 1 & 1 & 1 & -1 \\ 1 & 1 & -1 & -1 & -1 \\ 1 & -1 & 1 & -1 & 1 \\ 1 & -1 & -1 & 1 & 1 \\ 1 & -1 & 1 & -1 & -1 \\ 1 & -1 & -1 & 1 & -1 \end{bmatrix} \quad \frac{1}{S}\begin{bmatrix} 1 & 1 & 1 & 1 & 1 \\ 1 & 1 & -1 & -1 & 1 \\ 1 & 1 & 1 & 1 & -1 \\ 1 & 1 & -1 & -1 & -1 \\ j & -j & 1 & -1 & 1 \\ j & -j & -1 & 1 & 1 \\ j & -j & 1 & -1 & -1 \\ j & -j & -1 & 1 & -1 \end{bmatrix} \quad \frac{1}{S}\begin{bmatrix} 1 & 1 & 1 & 1 & 1 \\ -1 & -1 & 1 & 1 & -1 \\ 1 & 1 & -1 & -1 & -1 \\ -1 & -1 & -1 & -1 & 1 \\ 1 & -1 & 1 & -1 & 1 \\ -1 & 1 & 1 & -1 & -1 \\ 1 & -1 & -1 & 1 & -1 \\ -1 & 1 & -1 & 1 & 1 \end{bmatrix} \quad \frac{1}{S}\begin{bmatrix} 1 & 1 & 1 & 1 & 1 \\ -1 & -1 & 1 & 1 & -1 \\ 1 & 1 & -1 & -1 & -1 \\ -1 & -1 & -1 & -1 & 1 \\ j & -j & 1 & -1 & 1 \\ -j & j & 1 & -1 & -1 \\ j & -j & -1 & 1 & -1 \\ -j & j & -1 & 1 & 1 \end{bmatrix}$$

$$\frac{1}{S}\begin{bmatrix} 1 & 1 & 1 & 1 & 1 \\ 1 & 1 & -1 & -1 & 1 \\ -1 & -1 & -1 & -1 & 1 \\ -1 & -1 & 1 & 1 & 1 \\ 1 & -1 & j & -j & 1 \\ 1 & -1 & -j & j & 1 \\ -1 & 1 & -j & j & 1 \\ -1 & 1 & j & -j & 1 \end{bmatrix} \quad \frac{1}{S}\begin{bmatrix} 1 & 1 & 1 & 1 & 1 \\ 1 & 1 & -1 & -1 & 1 \\ -1 & -1 & -1 & -1 & 1 \\ -1 & -1 & 1 & 1 & 1 \\ j & -j & j & -j & 1 \\ j & -j & -j & j & 1 \\ -j & j & -j & j & 1 \\ -j & j & j & -j & 1 \end{bmatrix} \quad \frac{1}{S}\begin{bmatrix} 1 & 1 & 1 & 1 & 1 \\ -1 & -1 & 1 & 1 & -1 \\ -1 & -1 & 1 & 1 & 1 \\ 1 & 1 & 1 & 1 & -1 \\ 1 & -1 & 1 & -1 & 1 \\ 1 & -1 & 1 & -1 & -1 \\ -1 & 1 & 1 & -1 & -1 \\ -1 & 1 & 1 & -1 & 1 \end{bmatrix} \quad \frac{1}{S}\begin{bmatrix} 1 & 1 & 1 & 1 & 1 \\ -1 & -1 & 1 & 1 & -1 \\ -1 & -1 & 1 & 1 & 1 \\ 1 & 1 & 1 & 1 & -1 \\ j & -j & j & -j & 1 \\ j & -j & j & -j & -1 \\ -j & j & j & -j & -1 \\ -j & j & j & -j & 1 \end{bmatrix}$$

the UL codebook for six layers includes all of or a subset of the following, where $S=4\sqrt{3}$:

W (ordered from left to right in increasing order of TPMI index)

$$\frac{1}{S}\begin{bmatrix} 1 & 1 & 1 & 1 & 1 & 1 \\ 1 & 1 & -1 & -1 & 1 & 1 \\ 1 & 1 & 1 & 1 & -1 & -1 \\ 1 & 1 & -1 & -1 & -1 & -1 \\ 1 & -1 & 1 & -1 & 1 & -1 \\ 1 & -1 & -1 & 1 & 1 & -1 \\ 1 & -1 & 1 & -1 & -1 & 1 \\ 1 & -1 & -1 & 1 & -1 & 1 \end{bmatrix} \quad \frac{1}{S}\begin{bmatrix} 1 & 1 & 1 & 1 & 1 & 1 \\ 1 & 1 & -1 & -1 & 1 & 1 \\ 1 & 1 & 1 & 1 & -1 & -1 \\ 1 & 1 & -1 & -1 & -1 & -1 \\ j & -j & j & -j & 1 & -1 \\ j & -j & -j & j & 1 & -1 \\ j & -j & j & -j & -1 & 1 \\ j & -j & -j & j & -1 & 1 \end{bmatrix} \quad \frac{1}{S}\begin{bmatrix} 1 & 1 & 1 & 1 & 1 & 1 \\ -1 & -1 & 1 & 1 & -1 & -1 \\ 1 & 1 & -1 & -1 & -1 & -1 \\ -1 & -1 & -1 & -1 & 1 & 1 \\ 1 & -1 & 1 & -1 & 1 & -1 \\ -1 & 1 & 1 & -1 & -1 & 1 \\ 1 & -1 & -1 & 1 & -1 & 1 \\ -1 & 1 & -1 & 1 & 1 & -1 \end{bmatrix} \quad \frac{1}{S}\begin{bmatrix} 1 & 1 & 1 & 1 & 1 & 1 \\ -1 & -1 & 1 & 1 & -1 & -1 \\ 1 & 1 & -1 & -1 & -1 & -1 \\ -1 & -1 & -1 & -1 & 1 & 1 \\ j & -j & j & -j & 1 & -1 \\ -j & j & j & -j & -1 & 1 \\ j & -j & -j & j & -1 & 1 \\ -j & j & -j & j & 1 & -1 \end{bmatrix}$$

| W (ordered from left to right in increasing order of TPMI index) |
| --- |
| $\frac{1}{S}\begin{bmatrix} 1 & 1 & 1 & 1 & 1 & 1 \\ 1 & 1 & -1 & -1 & 1 & 1 \\ -1 & -1 & -1 & -1 & 1 & 1 \\ -1 & -1 & 1 & 1 & 1 & 1 \\ 1 & -1 & 1 & -1 & 1 & -1 \\ 1 & -1 & 1 & 1 & 1 & -1 \\ -1 & 1 & -1 & 1 & 1 & -1 \\ -1 & 1 & 1 & -1 & 1 & -1 \end{bmatrix}$ $\frac{1}{S}\begin{bmatrix} 1 & 1 & 1 & 1 & 1 & 1 \\ 1 & 1 & -1 & -1 & 1 & 1 \\ -1 & -1 & -1 & -1 & 1 & 1 \\ -1 & -1 & 1 & 1 & 1 & 1 \\ j & -j & j & -j & 1 & -1 \\ j & -j & -j & j & 1 & -1 \\ -j & j & -j & j & 1 & -1 \\ -j & j & j & -j & 1 & -1 \end{bmatrix}$ $\frac{1}{S}\begin{bmatrix} 1 & 1 & 1 & 1 & 1 & 1 \\ -1 & -1 & 1 & 1 & -1 & -1 \\ -1 & -1 & 1 & 1 & 1 & 1 \\ 1 & 1 & 1 & 1 & -1 & -1 \\ 1 & -1 & 1 & -1 & 1 & -1 \\ -1 & 1 & 1 & -1 & 1 & 1 \\ -1 & 1 & 1 & -1 & -1 & 1 \\ 1 & -1 & 1 & -1 & -1 & 1 \end{bmatrix}$ $\frac{1}{S}\begin{bmatrix} 1 & 1 & 1 & 1 & 1 & 1 \\ -1 & -1 & 1 & 1 & -1 & -1 \\ -1 & -1 & 1 & 1 & 1 & 1 \\ 1 & 1 & 1 & 1 & -1 & -1 \\ j & -j & j & -j & 1 & -1 \\ -j & j & j & -j & 1 & 1 \\ -j & j & j & -j & -1 & 1 \\ j & -j & j & -j & -1 & 1 \end{bmatrix}$ | the UL codebook for seven layers includes all of or a subset of the following, where $S=2\sqrt{14}$:

| W (ordered from left to right in increasing order of TPMI index) |
| --- |
| $\frac{1}{S}\begin{bmatrix} 1 & 1 & 1 & 1 & 1 & 1 & 1 \\ 1 & 1 & -1 & 1 & 1 & -1 & -1 \\ 1 & 1 & 1 & -1 & -1 & -1 & -1 \\ 1 & 1 & -1 & -1 & -1 & 1 & 1 \\ 1 & -1 & 1 & 1 & -1 & 1 & -1 \\ 1 & -1 & -1 & 1 & -1 & -1 & 1 \\ 1 & -1 & 1 & -1 & 1 & -1 & 1 \\ 1 & -1 & -1 & -1 & 1 & 1 & -1 \end{bmatrix}$ $\frac{1}{S}\begin{bmatrix} 1 & 1 & 1 & 1 & 1 & 1 & 1 \\ 1 & 1 & -1 & 1 & 1 & -1 & -1 \\ 1 & 1 & 1 & -1 & -1 & -1 & -1 \\ 1 & 1 & -1 & -1 & -1 & 1 & 1 \\ j & -j & j & 1 & -1 & 1 & -1 \\ j & -j & -j & 1 & -1 & -1 & 1 \\ j & -j & j & -1 & 1 & -1 & 1 \\ j & -j & -j & -1 & 1 & 1 & -1 \end{bmatrix}$ |
| $\frac{1}{S}\begin{bmatrix} 1 & 1 & 1 & 1 & 1 & 1 & 1 \\ -1 & -1 & 1 & -1 & -1 & 1 & 1 \\ 1 & 1 & -1 & -1 & -1 & 1 & 1 \\ -1 & -1 & -1 & 1 & 1 & 1 & 1 \\ 1 & -1 & 1 & 1 & -1 & 1 & -1 \\ -1 & 1 & 1 & -1 & 1 & 1 & -1 \\ 1 & -1 & -1 & -1 & 1 & 1 & -1 \\ -1 & 1 & -1 & 1 & -1 & 1 & -1 \end{bmatrix}$ $\frac{1}{S}\begin{bmatrix} 1 & 1 & 1 & 1 & 1 & 1 & 1 \\ -1 & -1 & 1 & -1 & -1 & 1 & 1 \\ 1 & 1 & -1 & -1 & -1 & 1 & 1 \\ -1 & -1 & -1 & 1 & 1 & 1 & 1 \\ j & -j & j & 1 & -1 & 1 & -1 \\ -j & j & j & -1 & 1 & 1 & -1 \\ j & -j & -j & -1 & 1 & 1 & -1 \\ -j & j & -j & 1 & -1 & 1 & -1 \end{bmatrix}$ |
| $\frac{1}{S}\begin{bmatrix} 1 & 1 & 1 & 1 & 1 & 1 & 1 \\ 1 & 1 & -1 & 1 & 1 & -1 & -1 \\ -1 & -1 & -1 & 1 & 1 & 1 & 1 \\ -1 & -1 & 1 & 1 & 1 & -1 & -1 \\ 1 & -1 & 1 & 1 & -1 & 1 & -1 \\ 1 & -1 & -1 & 1 & -1 & -1 & 1 \\ -1 & 1 & -1 & 1 & -1 & 1 & -1 \\ -1 & 1 & 1 & -1 & -1 & -1 & 1 \end{bmatrix}$ $\frac{1}{S}\begin{bmatrix} 1 & 1 & 1 & 1 & 1 & 1 & 1 \\ 1 & 1 & -1 & 1 & 1 & -1 & -1 \\ -1 & -1 & -1 & 1 & 1 & 1 & 1 \\ -1 & -1 & 1 & 1 & 1 & -1 & -1 \\ j & -j & j & 1 & -1 & 1 & -1 \\ j & -j & -j & 1 & -1 & -1 & 1 \\ -j & j & -j & 1 & -1 & 1 & -1 \\ -j & j & j & 1 & -1 & -1 & 1 \end{bmatrix}$ |
| $\frac{1}{S}\begin{bmatrix} 1 & 1 & 1 & 1 & 1 & 1 & 1 \\ -1 & -1 & 1 & -1 & -1 & 1 & 1 \\ -1 & -1 & 1 & 1 & 1 & -1 & -1 \\ 1 & 1 & 1 & -1 & -1 & -1 & -1 \\ 1 & -1 & 1 & 1 & -1 & 1 & -1 \\ -1 & 1 & 1 & 1 & -1 & 1 & -1 \\ -1 & 1 & 1 & -1 & 1 & -1 & 1 \\ 1 & -1 & 1 & -1 & 1 & -1 & 1 \end{bmatrix}$ $\frac{1}{S}\begin{bmatrix} 1 & 1 & 1 & 1 & 1 & 1 & 1 \\ -1 & -1 & 1 & -1 & -1 & 1 & 1 \\ -1 & -1 & 1 & 1 & 1 & -1 & -1 \\ 1 & 1 & 1 & -1 & -1 & -1 & -1 \\ j & -j & j & 1 & -1 & 1 & -1 \\ -j & j & -j & -1 & 1 & -1 & 1 \\ -j & j & j & 1 & -1 & -1 & 1 \\ j & -j & j & -1 & 1 & -1 & 1 \end{bmatrix}$ | the UL codebook for eight layers includes all of or a subset of the following, where $S=8$:

| W (ordered from left to right in increasing order of TPMI index) |
| --- |
| $\frac{1}{S}\begin{bmatrix} 1 & 1 & 1 & 1 & 1 & 1 & 1 & 1 \\ 1 & 1 & -1 & -1 & 1 & 1 & -1 & -1 \\ 1 & 1 & 1 & 1 & -1 & -1 & -1 & -1 \\ 1 & 1 & -1 & -1 & -1 & -1 & 1 & 1 \\ 1 & -1 & 1 & -1 & 1 & -1 & 1 & -1 \\ 1 & -1 & -1 & 1 & 1 & -1 & -1 & 1 \\ 1 & -1 & 1 & -1 & -1 & 1 & -1 & 1 \\ 1 & -1 & -1 & 1 & -1 & 1 & 1 & -1 \end{bmatrix}$ $\frac{1}{S}\begin{bmatrix} 1 & 1 & 1 & 1 & 1 & 1 & 1 & 1 \\ 1 & 1 & -1 & -1 & 1 & 1 & -1 & -1 \\ 1 & 1 & 1 & 1 & -1 & -1 & -1 & -1 \\ 1 & 1 & -1 & -1 & -1 & -1 & 1 & 1 \\ j & -j & j & -j & 1 & -1 & 1 & -1 \\ j & -j & -j & j & 1 & -1 & -1 & 1 \\ j & -j & j & -j & -1 & 1 & -1 & 1 \\ j & -j & -j & j & -1 & 1 & 1 & -1 \end{bmatrix}$ |

| W (ordered from left to right in increasing order of TPMI index) |
|---|

$$\frac{1}{\sqrt{S}}\begin{bmatrix} 1 & 1 & 1 & 1 & 1 & 1 & 1 & 1 \\ -1 & -1 & 1 & 1 & -1 & -1 & 1 & 1 \\ 1 & 1 & -1 & -1 & -1 & -1 & 1 & 1 \\ -1 & -1 & -1 & -1 & 1 & 1 & 1 & 1 \\ 1 & -1 & 1 & -1 & 1 & -1 & 1 & -1 \\ -1 & 1 & -1 & 1 & -1 & 1 & 1 & -1 \\ 1 & -1 & -1 & 1 & -1 & 1 & 1 & -1 \\ -1 & 1 & -1 & 1 & 1 & -1 & 1 & -1 \end{bmatrix} \quad \frac{1}{\sqrt{S}}\begin{bmatrix} 1 & 1 & 1 & 1 & 1 & 1 & 1 & 1 \\ -1 & -1 & 1 & 1 & -1 & -1 & 1 & 1 \\ 1 & 1 & -1 & -1 & -1 & -1 & 1 & 1 \\ -1 & -1 & -1 & -1 & 1 & 1 & 1 & 1 \\ j & -j & j & -j & 1 & -1 & 1 & -1 \\ -j & j & j & -j & -1 & 1 & 1 & -1 \\ j & -j & -j & j & -1 & 1 & 1 & -1 \\ -j & j & -j & j & 1 & -1 & 1 & -1 \end{bmatrix}$$

$$\frac{1}{\sqrt{S}}\begin{bmatrix} 1 & 1 & 1 & 1 & 1 & 1 & 1 & 1 \\ 1 & 1 & -1 & -1 & 1 & 1 & -1 & -1 \\ -1 & -1 & -1 & -1 & 1 & 1 & 1 & 1 \\ -1 & -1 & 1 & 1 & 1 & 1 & -1 & -1 \\ 1 & -1 & 1 & -1 & 1 & -1 & 1 & -1 \\ 1 & -1 & -1 & 1 & 1 & -1 & -1 & 1 \\ -1 & 1 & -1 & 1 & 1 & -1 & 1 & -1 \\ -1 & 1 & 1 & -1 & 1 & -1 & -1 & 1 \end{bmatrix} \quad \frac{1}{\sqrt{S}}\begin{bmatrix} 1 & 1 & 1 & 1 & 1 & 1 & 1 & 1 \\ 1 & 1 & -1 & -1 & 1 & 1 & -1 & -1 \\ -1 & -1 & -1 & -1 & 1 & 1 & 1 & 1 \\ -1 & -1 & 1 & 1 & 1 & 1 & -1 & -1 \\ j & -j & j & -j & 1 & -1 & 1 & -1 \\ j & -j & -j & j & 1 & -1 & -1 & 1 \\ -j & j & -j & j & 1 & -1 & 1 & -1 \\ -j & j & j & -j & 1 & -1 & -1 & 1 \end{bmatrix}$$

$$\frac{1}{\sqrt{S}}\begin{bmatrix} 1 & 1 & 1 & 1 & 1 & 1 & 1 & 1 \\ -1 & -1 & 1 & 1 & -1 & -1 & 1 & 1 \\ -1 & -1 & 1 & 1 & 1 & 1 & -1 & -1 \\ 1 & 1 & 1 & 1 & -1 & -1 & -1 & -1 \\ 1 & -1 & 1 & -1 & 1 & -1 & 1 & -1 \\ -1 & 1 & 1 & -1 & -1 & 1 & 1 & -1 \\ -1 & 1 & 1 & -1 & 1 & -1 & -1 & 1 \\ 1 & -1 & 1 & -1 & -1 & 1 & -1 & 1 \end{bmatrix} \quad \frac{1}{\sqrt{S}}\begin{bmatrix} 1 & 1 & 1 & 1 & 1 & 1 & 1 & 1 \\ -1 & -1 & 1 & 1 & -1 & -1 & 1 & 1 \\ -1 & -1 & 1 & 1 & 1 & 1 & -1 & -1 \\ 1 & 1 & 1 & 1 & -1 & -1 & -1 & -1 \\ j & -j & j & -j & 1 & -1 & 1 & -1 \\ -j & j & j & -j & -1 & 1 & 1 & -1 \\ -j & j & j & -j & 1 & -1 & -1 & 1 \\ j & -j & j & -j & -1 & 1 & -1 & 1 \end{bmatrix}.$$

8. A base station (BS) comprising:
a processor; and
a transceiver operably coupled to the processor, the transceiver configured to:
  receive user equipment (UE) capability information including at least one value of $N_g$ from {1, 2, 4, 8}, each value indicating a number of antenna port groups with each group comprising $N/N_g$ antenna ports, where N is a number of antenna ports at the UE;
  transmit a configuration about (i) an uplink (UL) codebook for N antenna ports and (ii) a configured $N_g$ value, wherein the UL codebook is according to the configured $N_g$ value and the configured $N_g$ value is based on the at least one value of $N_g$;
  transmit an indication indicating a transmit precoding matrix indicator (TPMI) for transmission of a physical uplink shared channel (PUSCH); and
  receive the PUSCH based on the indicated TPMI,
wherein the TPMI indicates a precoding matrix (W) from the UL codebook for N antenna ports, and
wherein at least one value of N is 8.

9. The BS of claim 8, wherein the indication is via a downlink control information (DCI) field in an UL-DCI granting the PUSCH transmission.

10. The BS of claim 8, wherein, when the at least one value of $N_g$ includes $N_g=1$, the UE capability information further includes at least one value for $(N_1, N_2)$ from (4,1) and (2,2), where $N_1$ and $N_2$ are number of antenna ports with the same polarization in the first and second dimensions, respectively.

11. The BS of claim 8, wherein the configuration is via a radio resource control (RRC) parameter, and the UL codebook is one of:
  a first codebook corresponding to $N_g=1$ and comprising full-coherent (FC) precoding matrices,
  a second codebook corresponding to $N_g=2$ and comprising partial-coherent (PC) precoding matrices,
  a third codebook corresponding to $N_g=4$ and comprising partial-coherent (PC) precoding matrices, or
  a fourth codebook couponing to $N_g=8$ and comprising non-coherent (NC) precoding matrices.

12. The BS of claim 11, wherein the first codebook corresponds to one of $(N_g, N_1, N_2)=(1, 4, 1)$ and (1, 2, 2).

13. The BS of claim 12, wherein when $(N_g, N_1, N_2)=(1, 4, 1)$:
  the UL codebook for two layers includes all of or a subset of the following, where S=4:

| TPMI index | W (ordered from left to right in increasing order of TPMI index) |
|---|---|
| 0-7 | $\frac{1}{\sqrt{S}}\begin{bmatrix} 1 & 1 \\ 1 & 1 \\ 1 & 1 \\ 1 & 1 \\ 1 & -1 \\ 1 & -1 \\ 1 & -1 \\ 1 & -1 \end{bmatrix} \quad \frac{1}{\sqrt{S}}\begin{bmatrix} 1 & 1 \\ 1 & 1 \\ 1 & 1 \\ 1 & 1 \\ j & -j \\ j & -j \\ j & -j \\ j & -j \end{bmatrix} \quad \frac{1}{\sqrt{S}}\begin{bmatrix} 1 & 1 \\ j & j \\ -1 & -1 \\ -j & -j \\ 1 & -1 \\ j & -j \\ -1 & 1 \\ -j & j \end{bmatrix} \quad \frac{1}{\sqrt{S}}\begin{bmatrix} 1 & 1 \\ j & j \\ -1 & -1 \\ -j & -j \\ j & -j \\ -1 & 1 \\ -j & j \\ 1 & -1 \end{bmatrix}$ |

-continued

| TPMI index | W (ordered from left to right in increasing order of TPMI index) | | | |
|---|---|---|---|---|
| | $\frac{1}{S}\begin{bmatrix} 1 & 1 \\ -1 & -1 \\ 1 & 1 \\ -1 & -1 \\ 1 & -1 \\ -1 & 1 \\ 1 & -1 \\ -1 & 1 \end{bmatrix}$ | $\frac{1}{S}\begin{bmatrix} 1 & 1 \\ -1 & -1 \\ 1 & 1 \\ -1 & -1 \\ j & -j \\ -j & j \\ j & -j \\ -j & j \end{bmatrix}$ | $\frac{1}{S}\begin{bmatrix} 1 & 1 \\ -j & -j \\ -1 & -1 \\ j & j \\ 1 & -1 \\ -j & j \\ -1 & 1 \\ j & -j \end{bmatrix}$ | $\frac{1}{S}\begin{bmatrix} 1 & 1 \\ -j & -j \\ -1 & -1 \\ j & j \\ j & -j \\ 1 & -1 \\ -j & -j \\ -1 & 1 \end{bmatrix}$ |
| 8-15 | $\frac{1}{S}\begin{bmatrix} 1 & 1 \\ 1 & j \\ 1 & -1 \\ 1 & -j \\ 1 & -1 \\ 1 & -j \\ 1 & 1 \\ 1 & j \end{bmatrix}$ | $\frac{1}{S}\begin{bmatrix} 1 & 1 \\ 1 & j \\ 1 & -1 \\ 1 & -j \\ j & -j \\ j & 1 \\ j & j \\ j & -1 \end{bmatrix}$ | $\frac{1}{S}\begin{bmatrix} 1 & 1 \\ j & -1 \\ -1 & 1 \\ -j & -1 \\ 1 & -1 \\ j & 1 \\ -1 & -1 \\ -j & 1 \end{bmatrix}$ | $\frac{1}{S}\begin{bmatrix} 1 & 1 \\ j & -1 \\ -1 & 1 \\ -j & -1 \\ j & -j \\ -1 & j \\ -j & -j \\ 1 & j \end{bmatrix}$ |
| | $\frac{1}{S}\begin{bmatrix} 1 & 1 \\ -1 & -j \\ 1 & -1 \\ -1 & j \\ 1 & -1 \\ -1 & j \\ 1 & 1 \\ -1 & -j \end{bmatrix}$ | $\frac{1}{S}\begin{bmatrix} 1 & 1 \\ -1 & -j \\ 1 & -1 \\ -1 & j \\ j & -j \\ -j & -1 \\ j & -j \\ -j & 1 \end{bmatrix}$ | $\frac{1}{S}\begin{bmatrix} 1 & 1 \\ -j & 1 \\ -1 & 1 \\ j & 1 \\ 1 & -1 \\ -j & -1 \\ -1 & -1 \\ j & -1 \end{bmatrix}$ | $\frac{1}{S}\begin{bmatrix} 1 & 1 \\ -j & 1 \\ -1 & 1 \\ j & 1 \\ j & -j \\ 1 & -j \\ -j & -j \\ -1 & -j \end{bmatrix}$ |
| 16-23 | $\frac{1}{S}\begin{bmatrix} 1 & 1 \\ 1 & -1 \\ 1 & 1 \\ 1 & -1 \\ 1 & -1 \\ 1 & 1 \\ 1 & -1 \\ 1 & 1 \end{bmatrix}$ | $\frac{1}{S}\begin{bmatrix} 1 & 1 \\ 1 & -1 \\ 1 & 1 \\ 1 & -1 \\ j & -j \\ j & j \\ j & -j \\ j & j \end{bmatrix}$ | $\frac{1}{S}\begin{bmatrix} 1 & 1 \\ j & -j \\ -1 & -1 \\ -j & j \\ 1 & -1 \\ j & j \\ -1 & 1 \\ -j & -j \end{bmatrix}$ | $\frac{1}{S}\begin{bmatrix} 1 & 1 \\ j & -j \\ -1 & -1 \\ -j & j \\ j & -j \\ -1 & -1 \\ -j & j \\ 1 & 1 \end{bmatrix}$ |
| | $\frac{1}{S}\begin{bmatrix} 1 & 1 \\ -1 & 1 \\ 1 & 1 \\ -1 & 1 \\ 1 & -1 \\ -1 & -1 \\ 1 & -1 \\ -1 & -1 \end{bmatrix}$ | $\frac{1}{S}\begin{bmatrix} 1 & 1 \\ -1 & 1 \\ 1 & 1 \\ -1 & 1 \\ j & -j \\ -j & -j \\ j & -j \\ -j & -j \end{bmatrix}$ | $\frac{1}{S}\begin{bmatrix} 1 & 1 \\ -j & j \\ -1 & -1 \\ j & -j \\ 1 & -1 \\ -j & -j \\ -1 & 1 \\ j & j \end{bmatrix}$ | $\frac{1}{S}\begin{bmatrix} 1 & 1 \\ -j & j \\ -1 & -1 \\ j & -j \\ j & -j \\ 1 & 1 \\ -j & j \\ -1 & -1 \end{bmatrix}$ |
| 24-31 | $\frac{1}{S}\begin{bmatrix} 1 & 1 \\ 1 & -j \\ 1 & -1 \\ 1 & j \\ 1 & -1 \\ 1 & j \\ 1 & 1 \\ 1 & -j \end{bmatrix}$ | $\frac{1}{S}\begin{bmatrix} 1 & 1 \\ 1 & -j \\ 1 & -1 \\ 1 & j \\ j & -j \\ j & -1 \\ j & -j \\ j & j \end{bmatrix}$ | $\frac{1}{S}\begin{bmatrix} 1 & 1 \\ j & 1 \\ -1 & 1 \\ -j & 1 \\ 1 & -1 \\ j & -1 \\ -1 & -1 \\ -j & -1 \end{bmatrix}$ | $\frac{1}{S}\begin{bmatrix} 1 & 1 \\ j & 1 \\ -1 & 1 \\ -j & 1 \\ j & -j \\ -1 & -j \\ -j & -j \\ 1 & -j \end{bmatrix}$ |
| | $\frac{1}{S}\begin{bmatrix} 1 & 1 \\ -1 & j \\ 1 & -1 \\ -1 & -j \\ 1 & -1 \\ -1 & -j \\ 1 & 1 \\ -1 & j \end{bmatrix}$ | $\frac{1}{S}\begin{bmatrix} 1 & 1 \\ -1 & j \\ 1 & -1 \\ -1 & -j \\ j & -j \\ -j & 1 \\ j & j \\ -j & -1 \end{bmatrix}$ | $\frac{1}{S}\begin{bmatrix} 1 & 1 \\ -j & -1 \\ -1 & 1 \\ j & -1 \\ 1 & -1 \\ -j & 1 \\ -1 & -1 \\ j & 1 \end{bmatrix}$ | $\frac{1}{S}\begin{bmatrix} 1 & 1 \\ -j & -1 \\ -1 & 1 \\ j & -1 \\ j & -j \\ 1 & j \\ -j & -j \\ -1 & j \end{bmatrix}$ | the UL codebook for three layers includes all of or a subset of the following, where $S=2\sqrt{6}$:

| TPMI index | W (ordered from left to right in increasing order of TPMI index) |
|---|---|
| 0-23 | $\frac{1}{S}\begin{bmatrix} 1 & 1 & 1 \\ 1 & j & 1 \\ 1 & -1 & 1 \\ 1 & -j & 1 \\ 1 & 1 & -1 \\ 1 & j & -1 \\ 1 & -1 & -1 \\ 1 & -j & -1 \end{bmatrix}$, $\frac{1}{S}\begin{bmatrix} 1 & 1 & 1 \\ 1 & j & 1 \\ 1 & -1 & 1 \\ 1 & -j & 1 \\ j & j & -j \\ j & -1 & -j \\ j & -j & -j \\ j & 1 & -j \end{bmatrix}$, $\frac{1}{S}\begin{bmatrix} 1 & 1 & 1 \\ j & -1 & j \\ -1 & 1 & -1 \\ -j & -1 & -j \\ 1 & 1 & -1 \\ j & -1 & -j \\ -1 & 1 & 1 \\ -j & -1 & j \end{bmatrix}$, $\frac{1}{S}\begin{bmatrix} 1 & 1 & 1 \\ j & -1 & j \\ -1 & 1 & -1 \\ -j & -1 & -j \\ j & j & -j \\ -1 & -j & 1 \\ -j & j & j \\ 1 & -j & -1 \end{bmatrix}$, $\frac{1}{S}\begin{bmatrix} 1 & 1 & 1 \\ -1 & -j & -1 \\ 1 & -1 & 1 \\ -1 & j & -1 \\ 1 & 1 & -1 \\ -1 & -j & 1 \\ 1 & -1 & -1 \\ -1 & j & 1 \end{bmatrix}$, $\frac{1}{S}\begin{bmatrix} 1 & 1 & 1 \\ -1 & -j & -1 \\ 1 & -1 & 1 \\ -1 & j & -1 \\ j & j & -j \\ -j & 1 & j \\ j & -j & -j \\ -j & -1 & j \end{bmatrix}$, $\frac{1}{S}\begin{bmatrix} 1 & 1 & 1 \\ -j & 1 & -j \\ -1 & 1 & -1 \\ j & 1 & j \\ 1 & 1 & -1 \\ -j & 1 & j \\ -1 & 1 & 1 \\ j & 1 & -j \end{bmatrix}$, $\frac{1}{S}\begin{bmatrix} 1 & 1 & 1 \\ -j & 1 & -j \\ -1 & 1 & -1 \\ j & 1 & j \\ j & j & -j \\ 1 & j & 1 \\ -j & j & j \\ -1 & j & 1 \end{bmatrix}$, $\frac{1}{S}\begin{bmatrix} 1 & 1 & 1 \\ 1 & -1 & 1 \\ 1 & 1 & 1 \\ 1 & -1 & 1 \\ 1 & 1 & -1 \\ 1 & -1 & -1 \\ 1 & 1 & -1 \\ 1 & -1 & -1 \end{bmatrix}$, $\frac{1}{S}\begin{bmatrix} 1 & 1 & 1 \\ 1 & -1 & 1 \\ 1 & 1 & 1 \\ 1 & -1 & 1 \\ j & j & -j \\ j & -j & -j \\ j & j & -j \\ j & -j & -j \end{bmatrix}$, $\frac{1}{S}\begin{bmatrix} 1 & 1 & 1 \\ j & -j & j \\ -1 & -1 & -1 \\ -j & j & -j \\ 1 & 1 & -1 \\ j & -j & -j \\ -1 & -1 & 1 \\ -j & j & j \end{bmatrix}$, $\frac{1}{S}\begin{bmatrix} 1 & 1 & 1 \\ j & -j & j \\ -1 & -1 & -1 \\ -j & j & -j \\ j & j & -j \\ -1 & 1 & 1 \\ -j & j & j \\ 1 & -1 & -1 \end{bmatrix}$, $\frac{1}{S}\begin{bmatrix} 1 & 1 & 1 \\ -1 & 1 & -1 \\ 1 & 1 & 1 \\ -1 & 1 & -1 \\ 1 & 1 & -1 \\ -1 & 1 & 1 \\ 1 & 1 & -1 \\ -1 & 1 & 1 \end{bmatrix}$, $\frac{1}{S}\begin{bmatrix} 1 & 1 & 1 \\ -1 & 1 & -1 \\ 1 & 1 & 1 \\ -1 & 1 & -1 \\ j & j & -j \\ -j & j & j \\ j & j & -j \\ -j & j & j \end{bmatrix}$, $\frac{1}{S}\begin{bmatrix} 1 & 1 & 1 \\ -j & j & -j \\ -1 & -1 & -1 \\ j & -j & j \\ 1 & 1 & -1 \\ -j & j & j \\ -1 & -1 & 1 \\ j & -j & -j \end{bmatrix}$, $\frac{1}{S}\begin{bmatrix} 1 & 1 & 1 \\ -j & j & -j \\ -1 & -1 & -1 \\ j & -j & j \\ j & j & -j \\ 1 & -j & -1 \\ -j & j & j \\ -1 & j & 1 \end{bmatrix}$, $\frac{1}{S}\begin{bmatrix} 1 & 1 & 1 \\ 1 & -j & 1 \\ 1 & -1 & 1 \\ 1 & j & 1 \\ 1 & 1 & -1 \\ 1 & -j & -1 \\ 1 & -1 & -1 \\ 1 & j & -1 \end{bmatrix}$, $\frac{1}{S}\begin{bmatrix} 1 & 1 & 1 \\ 1 & -j & 1 \\ 1 & -1 & 1 \\ 1 & j & 1 \\ j & j & -j \\ j & 1 & -j \\ j & -j & -j \\ j & -1 & -j \end{bmatrix}$, $\frac{1}{S}\begin{bmatrix} 1 & 1 & 1 \\ j & 1 & j \\ -1 & 1 & -1 \\ -j & 1 & -j \\ 1 & 1 & -1 \\ j & 1 & -j \\ -1 & 1 & 1 \\ -j & 1 & j \end{bmatrix}$, $\frac{1}{S}\begin{bmatrix} 1 & 1 & 1 \\ j & 1 & j \\ -1 & 1 & -1 \\ -j & 1 & -j \\ j & j & -j \\ -1 & j & 1 \\ -j & j & j \\ 1 & j & -1 \end{bmatrix}$, $\frac{1}{S}\begin{bmatrix} 1 & 1 & 1 \\ -1 & j & -1 \\ 1 & -1 & 1 \\ -1 & -j & -1 \\ 1 & 1 & -1 \\ -1 & j & 1 \\ 1 & -1 & -1 \\ -1 & -j & 1 \end{bmatrix}$, $\frac{1}{S}\begin{bmatrix} 1 & 1 & 1 \\ -1 & j & -1 \\ 1 & -1 & 1 \\ -1 & -j & -1 \\ j & j & -j \\ -j & -1 & j \\ j & -j & -j \\ -j & 1 & j \end{bmatrix}$, $\frac{1}{S}\begin{bmatrix} 1 & 1 & 1 \\ -j & -1 & -j \\ -1 & 1 & -1 \\ j & -1 & j \\ 1 & 1 & -1 \\ -j & -1 & j \\ -1 & 1 & 1 \\ j & -1 & -j \end{bmatrix}$, $\frac{1}{S}\begin{bmatrix} 1 & 1 & 1 \\ -j & -1 & -j \\ -1 & 1 & -1 \\ j & -1 & j \\ j & j & -j \\ 1 & -j & -1 \\ -j & j & j \\ -1 & -j & 1 \end{bmatrix}$ | the UL codebook for three layers includes all of or a subset of the following, where $S=4\sqrt{2}$:

| TPMI index | W (ordered from left to right in increasing order of TPMI index) |
|---|---|
| 0-23 | $\frac{1}{S}\begin{bmatrix} 1 & 1 & 1 & 1 \\ 1 & j & 1 & j \\ 1 & -1 & 1 & -1 \\ 1 & -j & 1 & -j \\ 1 & 1 & -1 & -1 \\ 1 & j & -1 & -j \\ 1 & -1 & -1 & 1 \\ 1 & -j & -1 & j \end{bmatrix}$, $\frac{1}{S}\begin{bmatrix} 1 & 1 & 1 & 1 \\ 1 & j & 1 & j \\ 1 & -1 & 1 & -1 \\ 1 & -j & 1 & -j \\ j & j & -j & -j \\ j & -1 & -j & 1 \\ j & -j & -j & j \\ j & 1 & -j & -1 \end{bmatrix}$, $\frac{1}{S}\begin{bmatrix} 1 & 1 & 1 & 1 \\ j & -1 & j & -1 \\ -1 & 1 & -1 & 1 \\ -j & -1 & -j & -1 \\ 1 & 1 & -1 & -1 \\ j & -1 & -j & 1 \\ -1 & 1 & 1 & -1 \\ -j & -1 & j & 1 \end{bmatrix}$, $\frac{1}{S}\begin{bmatrix} 1 & 1 & 1 & 1 \\ j & -1 & j & -1 \\ -1 & 1 & -1 & 1 \\ -j & -1 & -j & -1 \\ j & j & -j & -j \\ -1 & -j & 1 & j \\ -j & j & j & -j \\ 1 & -j & -1 & j \end{bmatrix}$ |

| TPMI index | W (ordered from left to right in increasing order of TPMI index) |
|---|---|
| | $\frac{1}{S}\begin{bmatrix} 1 & 1 & 1 & 1 \\ -1 & -j & -1 & -j \\ 1 & -1 & 1 & -1 \\ -1 & j & -1 & j \\ 1 & 1 & -1 & -1 \\ -1 & -j & 1 & j \\ 1 & -1 & -1 & 1 \\ -1 & j & 1 & -j \end{bmatrix}$ $\frac{1}{S}\begin{bmatrix} 1 & 1 & 1 & 1 \\ -1 & -j & -1 & -j \\ 1 & -1 & 1 & -1 \\ -1 & j & -1 & j \\ j & j & -j & -j \\ -j & 1 & j & -1 \\ j & -j & -j & j \\ -j & -1 & j & 1 \end{bmatrix}$ $\frac{1}{S}\begin{bmatrix} 1 & 1 & 1 & 1 \\ -j & 1 & -j & 1 \\ -1 & 1 & -1 & 1 \\ j & 1 & j & 1 \\ 1 & 1 & -1 & -1 \\ -j & 1 & j & -1 \\ -1 & 1 & 1 & -1 \\ j & 1 & -j & -1 \end{bmatrix}$ $\frac{1}{S}\begin{bmatrix} 1 & 1 & 1 & 1 \\ -j & 1 & -j & 1 \\ -1 & 1 & -1 & 1 \\ j & 1 & j & 1 \\ j & j & -j & -j \\ 1 & j & -1 & -j \\ -j & j & j & -j \\ -1 & j & 1 & -j \end{bmatrix}$ |
| | $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ 1 & 1 & -1 & -1 \\ 1 & -1 & -1 & 1 \\ 1 & 1 & -1 & -1 \\ 1 & -1 & -1 & 1 \end{bmatrix}$ $\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ j & j & -j & -j \\ j & -j & -j & j \\ j & j & -j & -j \\ j & -j & -j & j \end{bmatrix}$ $\frac{1}{S}\begin{bmatrix} 1 & 1 & 1 & 1 \\ j & -j & j & -j \\ -1 & -1 & -1 & -1 \\ -j & j & -j & j \\ 1 & 1 & -1 & -1 \\ j & -j & -j & j \\ -1 & -1 & 1 & 1 \\ -j & j & j & -j \end{bmatrix}$ $\frac{1}{S}\begin{bmatrix} 1 & 1 & 1 & 1 \\ j & -j & j & -j \\ -1 & -1 & -1 & -1 \\ -j & j & -j & j \\ j & j & -j & -j \\ -1 & 1 & 1 & -1 \\ -j & -j & j & j \\ 1 & -1 & -1 & 1 \end{bmatrix}$ |
| | $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ 1 & 1 & -1 & -1 \\ -1 & 1 & 1 & -1 \\ 1 & 1 & -1 & -1 \\ -1 & 1 & 1 & -1 \end{bmatrix}$ $\frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ j & j & -j & -j \\ -j & j & j & -j \\ j & j & -j & -j \\ -j & j & j & -j \end{bmatrix}$ $\frac{1}{S}\begin{bmatrix} 1 & 1 & 1 & 1 \\ -j & j & -j & j \\ -1 & -1 & -1 & -1 \\ j & -j & j & -j \\ 1 & 1 & -1 & -1 \\ -j & j & j & -j \\ -1 & -1 & 1 & 1 \\ j & -j & -j & j \end{bmatrix}$ $\frac{1}{S}\begin{bmatrix} 1 & 1 & 1 & 1 \\ -j & j & -j & j \\ -1 & -1 & -1 & -1 \\ j & -j & j & -j \\ j & j & -j & -j \\ 1 & -1 & -1 & 1 \\ -j & -j & j & j \\ -1 & 1 & 1 & -1 \end{bmatrix}$ |
| | $\frac{1}{S}\begin{bmatrix} 1 & 1 & 1 & 1 \\ 1 & -j & 1 & -j \\ 1 & -1 & 1 & -1 \\ 1 & j & 1 & j \\ 1 & 1 & -1 & -1 \\ 1 & -j & -1 & j \\ 1 & -1 & -1 & 1 \\ 1 & j & -1 & -j \end{bmatrix}$ $\frac{1}{S}\begin{bmatrix} 1 & 1 & 1 & 1 \\ 1 & -j & 1 & -j \\ 1 & -1 & 1 & -1 \\ 1 & j & 1 & j \\ j & j & -j & -j \\ j & 1 & -j & -1 \\ j & -j & -j & j \\ j & -1 & -j & 1 \end{bmatrix}$ $\frac{1}{S}\begin{bmatrix} 1 & 1 & 1 & 1 \\ j & 1 & j & 1 \\ -1 & 1 & -1 & 1 \\ -j & 1 & -j & 1 \\ 1 & 1 & -1 & -1 \\ j & 1 & -j & -1 \\ -1 & 1 & 1 & -1 \\ -j & 1 & j & -1 \end{bmatrix}$ $\frac{1}{S}\begin{bmatrix} 1 & 1 & 1 & 1 \\ j & 1 & j & 1 \\ -1 & 1 & -1 & 1 \\ -j & 1 & -j & 1 \\ j & j & -j & -j \\ -1 & j & 1 & -j \\ -j & j & j & -j \\ 1 & j & -1 & -j \end{bmatrix}$ |
| | $\frac{1}{S}\begin{bmatrix} 1 & 1 & 1 & 1 \\ -1 & j & -1 & j \\ 1 & -1 & 1 & -1 \\ -1 & -j & -1 & -j \\ 1 & 1 & -1 & -1 \\ -1 & j & 1 & -j \\ 1 & -1 & -1 & 1 \\ -1 & -j & 1 & j \end{bmatrix}$ $\frac{1}{S}\begin{bmatrix} 1 & 1 & 1 & 1 \\ -1 & j & -1 & j \\ 1 & -1 & 1 & -1 \\ -1 & -j & -1 & -j \\ j & j & -j & -j \\ -j & -1 & j & 1 \\ j & -j & -j & j \\ -j & 1 & j & -1 \end{bmatrix}$ $\frac{1}{S}\begin{bmatrix} 1 & 1 & 1 & 1 \\ -j & -1 & -j & -1 \\ -1 & 1 & -1 & 1 \\ j & -1 & j & -1 \\ 1 & 1 & -1 & -1 \\ -j & -1 & j & 1 \\ -1 & 1 & 1 & -1 \\ j & -1 & -j & 1 \end{bmatrix}$ $\frac{1}{S}\begin{bmatrix} 1 & 1 & 1 & 1 \\ -j & -1 & -j & -1 \\ -1 & 1 & -1 & 1 \\ j & -1 & j & -1 \\ j & j & -j & -j \\ 1 & -j & -1 & j \\ -j & j & j & -j \\ -1 & -j & 1 & j \end{bmatrix}$ | the UL codebook for five layers includes all of or a subset of the following, where $S=2\sqrt{10}$:

| TPMI index | W (ordered from left to right in increasing order of TPMI index) |
|---|---|
| 0-3 | $\frac{1}{S}\begin{bmatrix} 1 & 1 & 1 & 1 & 1 \\ 1 & 1 & j & j & -1 \\ 1 & 1 & -1 & -1 & 1 \\ 1 & 1 & -j & -j & -1 \\ 1 & -1 & 1 & -1 & 1 \\ 1 & -1 & j & -j & -1 \\ 1 & -1 & -1 & 1 & 1 \\ 1 & -1 & -j & j & -1 \end{bmatrix}$ $\frac{1}{S}\begin{bmatrix} 1 & 1 & 1 & 1 & 1 \\ 1 & 1 & j & j & -1 \\ 1 & 1 & -1 & -1 & 1 \\ 1 & 1 & -j & -j & -1 \\ j & -j & 1 & -1 & 1 \\ j & -j & j & -j & -1 \\ j & -j & -1 & 1 & 1 \\ j & -j & -j & j & -1 \end{bmatrix}$ $\frac{1}{S}\begin{bmatrix} 1 & 1 & 1 & 1 & 1 \\ j & j & -1 & -1 & -j \\ -1 & -1 & 1 & 1 & -1 \\ -j & -j & -1 & -1 & j \\ 1 & -1 & 1 & -1 & 1 \\ j & -j & -1 & 1 & -j \\ -1 & 1 & 1 & -1 & -1 \\ -j & j & -1 & 1 & j \end{bmatrix}$ $\frac{1}{S}\begin{bmatrix} 1 & 1 & 1 & 1 & 1 \\ j & j & -1 & -1 & -j \\ -1 & -1 & 1 & 1 & -1 \\ -j & -j & -1 & -1 & j \\ j & -j & 1 & -1 & 1 \\ -1 & 1 & -1 & 1 & -j \\ -j & j & 1 & -1 & -1 \\ 1 & -1 & -1 & 1 & j \end{bmatrix}$ |

-continued

| TPMI index | W (ordered from left to right in increasing order of TPMI index) |
|---|---|
| 4-7 | $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ 1 & -1 & 1 & -1 & 1 \\ -1 & 1 & -j & j & 1 \\ 1 & -1 & -1 & 1 & 1 \\ -1 & 1 & j & -j & 1 \end{bmatrix}$  $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ j & -j & 1 & -1 & 1 \\ -j & j & -j & j & 1 \\ j & -j & -1 & 1 & 1 \\ -j & j & j & -j & 1 \end{bmatrix}$  $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ 1 & -1 & 1 & -1 & 1 \\ -j & j & 1 & -1 & j \\ -1 & 1 & 1 & -1 & -1 \\ j & -j & 1 & -1 & -j \end{bmatrix}$  $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ j & -j & 1 & -1 & 1 \\ 1 & -1 & 1 & -1 & j \\ -j & -j & 1 & -1 & -1 \\ -1 & 1 & 1 & -1 & -j \end{bmatrix}$ | the UL codebook for six layers includes all of or a subset of the following, where $S=4\sqrt{3}$:

| TPMI index | W (ordered from left to right in increasing order of TPMI index) |
|---|---|
| 0-3 | $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ 1 & -1 & 1 & -1 & 1 & -1 \\ 1 & -1 & j & -j & -1 & 1 \\ 1 & -1 & -1 & 1 & 1 & -1 \\ 1 & -1 & -j & j & -1 & 1 \end{bmatrix}$  $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ j & -j & j & -j & 1 & -1 \\ j & -j & -1 & 1 & -1 & 1 \\ j & -j & -j & j & 1 & -1 \\ j & -j & 1 & -1 & -1 & 1 \end{bmatrix}$  $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ 1 & -1 & 1 & -1 & 1 & -1 \\ j & -j & -1 & 1 & -j & j \\ -1 & 1 & 1 & -1 & -1 & 1 \\ -j & j & -1 & 1 & j & -j \end{bmatrix}$  $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ j & -j & j & -j & 1 & -1 \\ -1 & 1 & -j & j & -j & j \\ -j & j & - & -j & -1 & 1 \\ 1 & -1 & -j & j & j & -j \end{bmatrix}$ |
| 4-7 | $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ 1 & -1 & 1 & -1 & 1 & -1 \\ -1 & 1 & -j & j & 1 & -1 \\ 1 & -1 & -1 & 1 & 1 & -1 \\ -1 & 1 & j & -j & 1 & -1 \end{bmatrix}$  $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ j & -j & j & -j & 1 & -1 \\ -j & j & 1 & -1 & 1 & -1 \\ j & -j & -j & -j & 1 & -1 \\ -j & j & -1 & 1 & 1 & -1 \end{bmatrix}$  $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ 1 & -1 & 1 & -1 & 1 & -1 \\ -j & j & 1 & -1 & j & -j \\ -1 & 1 & 1 & -1 & -1 & 1 \\ j & -j & 1 & -1 & -j & j \end{bmatrix}$  $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ j & -j & j & -j & 1 & -1 \\ 1 & -1 & j & -j & j & -j \\ -j & j & -j & j & -1 & 1 \\ -1 & 1 & j & -j & -j & j \end{bmatrix}$ | the UL codebook for seven layers includes all of or a subset of the following, where $S=2\sqrt{14}$:

| TPMI index | W (ordered from left to right in increasing order of TPMI index) |
|---|---|
| 0-3 | $\frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ 1 & -1 & 1 & 1 & -1 & 1 & -1 \\ 1 & -1 & j & -1 & 1 & -j & j \\ 1 & -1 & -1 & 1 & -1 & -1 & 1 \\ 1 & -1 & -j & -1 & 1 & j & -j \end{bmatrix}$  $\frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ j & -j & j & 1 & -1 & 1 & -1 \\ j & -j & -1 & -1 & 1 & -j & j \\ j & -j & -j & 1 & -1 & -1 & 1 \\ j & -j & 1 & -1 & 1 & j & -j \end{bmatrix}$ |
|  | $\frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ 1 & -1 & 1 & 1 & -1 & 1 & -1 \\ j & -j & -1 & -j & j & 1 & -1 \\ -1 & 1 & 1 & -1 & 1 & 1 & -1 \\ -j & j & -1 & j & -j & 1 & -1 \end{bmatrix}$  $\frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ j & -j & j & 1 & -1 & 1 & -1 \\ -1 & 1 & -j & -j & j & 1 & -1 \\ -j & j & j & -1 & 1 & 1 & -1 \\ 1 & -1 & -j & j & -j & 1 & -1 \end{bmatrix}$ | the UL codebook for eight layers includes all of or a subset of the following, where $S=8$:

| TPMI index | W (ordered from left to right in increasing order of TPMI index) |
|---|---|
| 0-3 | $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ 1 & -1 & 1 & -1 & 1 & -1 & 1 & -1 \\ 1 & -1 & j & -j & -1 & 1 & -j & j \\ 1 & -1 & -1 & 1 & 1 & -1 & -1 & 1 \\ 1 & -1 & -j & j & -1 & 1 & j & -j \end{bmatrix}$ |
|  | $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ j & -j & j & -j & 1 & -1 & 1 & -1 \\ j & -j & -1 & 1 & -1 & 1 & -j & j \\ j & -j & -j & j & 1 & -1 & -1 & 1 \\ j & -j & 1 & -1 & -1 & 1 & j & -j \end{bmatrix}$ |
|  | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ 1 & -1 & 1 & -1 & 1 & -1 & 1 & -1 \\ j & -j & -1 & 1 & -j & j & 1 & -1 \\ -1 & 1 & 1 & -1 & -1 & 1 & 1 & -1 \\ -j & j & -1 & 1 & j & -j & 1 & -1 \end{bmatrix}$ |
|  | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ j & -j & j & -j & 1 & -1 & 1 & -1 \\ -1 & 1 & -j & j & -j & j & 1 & -1 \\ -j & j & j & -j & -1 & 1 & 1 & -1 \\ 1 & -1 & -j & j & j & -j & 1 & -1 \end{bmatrix}$ |

14. The BS of claim 12, wherein when $(N_g, N_1, N_2)=(1, 2, 2)$:

the UL codebook for two layers includes all of or a subset of the following, where S=4:

| W (ordered from left to right in increasing order of TPMI index) |
|---|
| $\frac{1}{S}\begin{bmatrix} 1 & 1 \\ 1 & 1 \\ 1 & 1 \\ 1 & 1 \\ 1 & -1 \\ 1 & -1 \\ 1 & -1 \\ 1 & -1 \end{bmatrix}$, $\frac{1}{S}\begin{bmatrix} 1 & 1 \\ 1 & 1 \\ 1 & 1 \\ 1 & 1 \\ j & -j \\ j & -j \\ j & -j \\ j & -j \end{bmatrix}$, $\frac{1}{S}\begin{bmatrix} 1 & 1 \\ 1 & 1 \\ -1 & -1 \\ -1 & -1 \\ 1 & -1 \\ 1 & -1 \\ -1 & 1 \\ -1 & 1 \end{bmatrix}$, $\frac{1}{S}\begin{bmatrix} 1 & 1 \\ 1 & 1 \\ -1 & -1 \\ -1 & -1 \\ j & -j \\ j & -j \\ -j & j \\ -j & j \end{bmatrix}$, $\frac{1}{S}\begin{bmatrix} 1 & 1 \\ 1 & 1 \\ -1 & -1 \\ -1 & -1 \\ 1 & -1 \\ 1 & -1 \\ -1 & 1 \\ -1 & 1 \end{bmatrix}$, $\frac{1}{S}\begin{bmatrix} 1 & 1 \\ 1 & 1 \\ -1 & -1 \\ -1 & -1 \\ j & -j \\ j & -j \\ -j & j \\ -j & j \end{bmatrix}$, $\frac{1}{S}\begin{bmatrix} 1 & 1 \\ -1 & -1 \\ -1 & -1 \\ 1 & 1 \\ 1 & -1 \\ 1 & -1 \\ -1 & 1 \\ 1 & -1 \end{bmatrix}$, $\frac{1}{S}\begin{bmatrix} 1 & 1 \\ -1 & -1 \\ -1 & -1 \\ 1 & 1 \\ j & -j \\ j & -j \\ -j & j \\ j & -j \end{bmatrix}$ |
| $\frac{1}{S}\begin{bmatrix} 1 & 1 \\ 1 & -1 \\ 1 & 1 \\ 1 & -1 \\ 1 & -1 \\ 1 & 1 \\ 1 & -1 \\ 1 & 1 \end{bmatrix}$, $\frac{1}{S}\begin{bmatrix} 1 & 1 \\ 1 & -1 \\ 1 & 1 \\ 1 & -1 \\ j & -j \\ j & j \\ j & -j \\ j & j \end{bmatrix}$, $\frac{1}{S}\begin{bmatrix} 1 & 1 \\ -1 & 1 \\ 1 & 1 \\ -1 & 1 \\ 1 & -1 \\ -1 & -1 \\ 1 & 1 \\ -1 & 1 \end{bmatrix}$, $\frac{1}{S}\begin{bmatrix} 1 & 1 \\ -1 & 1 \\ 1 & -1 \\ -1 & -1 \\ j & -j \\ -j & -j \\ j & j \\ -j & j \end{bmatrix}$, $\frac{1}{S}\begin{bmatrix} 1 & 1 \\ 1 & -1 \\ -1 & -1 \\ -1 & 1 \\ -1 & 1 \\ 1 & 1 \\ -1 & 1 \\ -1 & -1 \end{bmatrix}$, $\frac{1}{S}\begin{bmatrix} 1 & 1 \\ 1 & -1 \\ -1 & -1 \\ -1 & 1 \\ 1 & -j \\ 1 & j \\ -j & j \\ -j & -1 \end{bmatrix}$, $\frac{1}{S}\begin{bmatrix} 1 & 1 \\ -1 & 1 \\ -1 & 1 \\ -1 & 1 \\ 1 & -1 \\ -1 & -1 \\ -1 & -1 \\ 1 & -1 \end{bmatrix}$, $\frac{1}{S}\begin{bmatrix} 1 & 1 \\ -1 & 1 \\ -1 & 1 \\ 1 & 1 \\ j & -j \\ -j & -j \\ -j & -j \\ j & -j \end{bmatrix}$ |
| $\frac{1}{S}\begin{bmatrix} 1 & 1 \\ 1 & 1 \\ 1 & -1 \\ 1 & -1 \\ 1 & -1 \\ 1 & -1 \\ 1 & 1 \\ 1 & 1 \end{bmatrix}$, $\frac{1}{S}\begin{bmatrix} 1 & 1 \\ 1 & 1 \\ 1 & -1 \\ 1 & -1 \\ j & -j \\ j & -j \\ j & j \\ j & j \end{bmatrix}$, $\frac{1}{S}\begin{bmatrix} 1 & 1 \\ 1 & 1 \\ -1 & -1 \\ -1 & 1 \\ 1 & 1 \\ -1 & 1 \\ 1 & 1 \\ -1 & -1 \end{bmatrix}$, $\frac{1}{S}\begin{bmatrix} 1 & 1 \\ 1 & 1 \\ -1 & -1 \\ -1 & 1 \\ j & -j \\ -j & -j \\ j & j \\ -j & -j \end{bmatrix}$, $\frac{1}{S}\begin{bmatrix} 1 & 1 \\ 1 & 1 \\ -1 & 1 \\ -1 & 1 \\ -1 & 1 \\ 1 & -1 \\ 1 & -1 \\ -1 & -1 \end{bmatrix}$, $\frac{1}{S}\begin{bmatrix} 1 & 1 \\ 1 & 1 \\ -1 & 1 \\ -1 & 1 \\ j & -j \\ j & -j \\ j & -j \\ -j & -j \end{bmatrix}$, $\frac{1}{S}\begin{bmatrix} 1 & 1 \\ -1 & -1 \\ -1 & 1 \\ -1 & 1 \\ 1 & -1 \\ 1 & -1 \\ -1 & -1 \\ 1 & 1 \end{bmatrix}$, $\frac{1}{S}\begin{bmatrix} 1 & 1 \\ -1 & -1 \\ -1 & 1 \\ 1 & -1 \\ 1 & -j \\ j & -j \\ -j & j \\ j & j \end{bmatrix}$ |
| $\frac{1}{S}\begin{bmatrix} 1 & 1 \\ 1 & -1 \\ 1 & -1 \\ 1 & 1 \\ 1 & -1 \\ 1 & 1 \\ 1 & 1 \\ 1 & -1 \end{bmatrix}$, $\frac{1}{S}\begin{bmatrix} 1 & 1 \\ 1 & -1 \\ 1 & -1 \\ 1 & 1 \\ j & -j \\ j & j \\ j & j \\ j & -j \end{bmatrix}$, $\frac{1}{S}\begin{bmatrix} 1 & 1 \\ -1 & 1 \\ 1 & 1 \\ -1 & 1 \\ 1 & -1 \\ -1 & -1 \\ 1 & 1 \\ -1 & 1 \end{bmatrix}$, $\frac{1}{S}\begin{bmatrix} 1 & 1 \\ -1 & 1 \\ 1 & 1 \\ -1 & 1 \\ j & -j \\ -j & -j \\ j & -j \\ -j & -j \end{bmatrix}$, $\frac{1}{S}\begin{bmatrix} 1 & 1 \\ 1 & -1 \\ 1 & -1 \\ -1 & -1 \\ -1 & 1 \\ 1 & 1 \\ -1 & -1 \\ -1 & 1 \end{bmatrix}$, $\frac{1}{S}\begin{bmatrix} 1 & 1 \\ 1 & -1 \\ 1 & -1 \\ -1 & -1 \\ j & -j \\ j & j \\ -j & -j \\ -j & j \end{bmatrix}$, $\frac{1}{S}\begin{bmatrix} 1 & 1 \\ -1 & 1 \\ -1 & -1 \\ 1 & -1 \\ -1 & 1 \\ -1 & -1 \\ -1 & 1 \\ 1 & -1 \end{bmatrix}$, $\frac{1}{S}\begin{bmatrix} 1 & 1 \\ -1 & 1 \\ -1 & -1 \\ 1 & -1 \\ j & -j \\ -j & -j \\ -j & j \\ j & j \end{bmatrix}$ |

(continued)

| TPMI index | W (ordered from left to right in increasing order of TPMI index) |
|---|---|
|  | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ 1 & -1 & 1 & -1 & 1 & -1 & 1 & -1 \\ j & -j & -1 & 1 & -j & j & 1 & -1 \\ -1 & 1 & 1 & -1 & -1 & 1 & 1 & -1 \\ -j & j & -1 & 1 & j & -j & 1 & -1 \end{bmatrix}$ |
|  | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ j & -j & j & -j & 1 & -1 & 1 & -1 \\ -1 & 1 & -j & j & -j & j & 1 & -1 \\ -j & j & j & -j & -1 & 1 & 1 & -1 \\ 1 & -1 & -j & j & j & -j & 1 & -1 \end{bmatrix}$ | the UL codebook for three layers includes all of or a subset of the following, where $S=2\sqrt{6}$:

| W (ordered from left to right in increasing order of TPMI index) |
|---|
| $\frac{1}{S}\begin{bmatrix} 1 & 1 & 1 \\ 1 & -1 & 1 \\ 1 & 1 & 1 \\ 1 & -1 & 1 \\ 1 & 1 & -1 \\ 1 & -1 & -1 \\ 1 & 1 & -1 \\ 1 & -1 & -1 \end{bmatrix}$ $\frac{1}{S}\begin{bmatrix} 1 & 1 & 1 \\ 1 & -1 & 1 \\ 1 & 1 & 1 \\ 1 & -1 & 1 \\ j & j & -j \\ j & -j & -j \\ j & j & -j \\ j & -j & -j \end{bmatrix}$ $\frac{1}{S}\begin{bmatrix} 1 & 1 & 1 \\ -1 & 1 & -1 \\ 1 & -1 & 1 \\ -1 & -1 & -1 \\ 1 & 1 & -1 \\ -1 & 1 & 1 \\ 1 & -1 & -1 \\ -1 & -1 & 1 \end{bmatrix}$ $\frac{1}{S}\begin{bmatrix} 1 & 1 & 1 \\ -1 & 1 & -1 \\ 1 & -1 & 1 \\ -1 & -1 & -1 \\ j & j & -j \\ -j & j & j \\ j & -j & -j \\ -j & -j & j \end{bmatrix}$ |
| $\frac{1}{S}\begin{bmatrix} 1 & 1 & 1 \\ 1 & -1 & 1 \\ -1 & -1 & -1 \\ -1 & 1 & -1 \\ 1 & 1 & -1 \\ 1 & -1 & -1 \\ -1 & -1 & 1 \\ -1 & 1 & 1 \end{bmatrix}$ $\frac{1}{S}\begin{bmatrix} 1 & 1 & 1 \\ 1 & -1 & 1 \\ -1 & -1 & -1 \\ -1 & 1 & -1 \\ j & j & -j \\ j & -j & -j \\ -j & -j & j \\ -j & j & j \end{bmatrix}$ $\frac{1}{S}\begin{bmatrix} 1 & 1 & 1 \\ -1 & 1 & -1 \\ -1 & 1 & -1 \\ 1 & 1 & 1 \\ 1 & 1 & -1 \\ -1 & 1 & 1 \\ -1 & 1 & 1 \\ 1 & 1 & -1 \end{bmatrix}$ $\frac{1}{S}\begin{bmatrix} 1 & 1 & 1 \\ -1 & 1 & -1 \\ -1 & 1 & -1 \\ 1 & 1 & 1 \\ j & j & -j \\ -j & j & j \\ -j & j & j \\ j & j & -j \end{bmatrix}$ |
| $\frac{1}{S}\begin{bmatrix} 1 & 1 & 1 \\ 1 & 1 & 1 \\ 1 & -1 & 1 \\ 1 & -1 & 1 \\ 1 & 1 & -1 \\ 1 & 1 & -1 \\ 1 & -1 & -1 \\ 1 & -1 & -1 \end{bmatrix}$ $\frac{1}{S}\begin{bmatrix} 1 & 1 & 1 \\ 1 & 1 & 1 \\ 1 & -1 & 1 \\ 1 & -1 & 1 \\ j & j & -j \\ j & j & -j \\ j & -j & -j \\ j & -j & -j \end{bmatrix}$ $\frac{1}{S}\begin{bmatrix} 1 & 1 & 1 \\ -1 & -1 & -1 \\ 1 & -1 & 1 \\ -1 & 1 & -1 \\ 1 & 1 & -1 \\ -1 & -1 & 1 \\ 1 & -1 & -1 \\ -1 & 1 & 1 \end{bmatrix}$ $\frac{1}{S}\begin{bmatrix} 1 & 1 & 1 \\ -1 & -1 & -1 \\ 1 & -1 & 1 \\ -1 & 1 & -1 \\ j & j & -j \\ -j & -j & j \\ j & -j & -j \\ -j & j & j \end{bmatrix}$ |
| $\frac{1}{S}\begin{bmatrix} 1 & 1 & 1 \\ 1 & 1 & 1 \\ -1 & 1 & -1 \\ -1 & 1 & -1 \\ 1 & 1 & -1 \\ 1 & 1 & -1 \\ -1 & 1 & 1 \\ -1 & 1 & 1 \end{bmatrix}$ $\frac{1}{S}\begin{bmatrix} 1 & 1 & 1 \\ 1 & 1 & 1 \\ -1 & 1 & -1 \\ -1 & 1 & -1 \\ j & j & -j \\ j & j & -j \\ -j & j & j \\ -j & j & j \end{bmatrix}$ $\frac{1}{S}\begin{bmatrix} 1 & 1 & 1 \\ -1 & -1 & -1 \\ -1 & 1 & -1 \\ 1 & -1 & 1 \\ 1 & 1 & -1 \\ -1 & -1 & 1 \\ -1 & 1 & 1 \\ 1 & -1 & -1 \end{bmatrix}$ $\frac{1}{S}\begin{bmatrix} 1 & 1 & 1 \\ -1 & -1 & -1 \\ -1 & 1 & -1 \\ 1 & -1 & 1 \\ j & j & -j \\ -j & -j & j \\ -j & j & j \\ j & -j & -j \end{bmatrix}$ |
| $\frac{1}{S}\begin{bmatrix} 1 & 1 & 1 \\ 1 & -1 & 1 \\ 1 & -1 & 1 \\ 1 & 1 & 1 \\ 1 & 1 & -1 \\ 1 & -1 & -1 \\ 1 & -1 & -1 \\ 1 & 1 & -1 \end{bmatrix}$ $\frac{1}{S}\begin{bmatrix} 1 & 1 & 1 \\ 1 & -1 & 1 \\ 1 & -1 & 1 \\ 1 & 1 & 1 \\ j & j & -j \\ j & -j & -j \\ j & -j & -j \\ j & j & -j \end{bmatrix}$ $\frac{1}{S}\begin{bmatrix} 1 & 1 & 1 \\ -1 & 1 & -1 \\ 1 & 1 & 1 \\ -1 & 1 & -1 \\ 1 & 1 & -1 \\ -1 & 1 & 1 \\ 1 & 1 & -1 \\ -1 & 1 & 1 \end{bmatrix}$ $\frac{1}{S}\begin{bmatrix} 1 & 1 & 1 \\ -1 & 1 & -1 \\ 1 & 1 & 1 \\ -1 & 1 & -1 \\ j & j & -j \\ -j & j & j \\ j & j & -j \\ -j & j & j \end{bmatrix}$ |
| $\frac{1}{S}\begin{bmatrix} 1 & 1 & 1 \\ 1 & -1 & 1 \\ -1 & 1 & -1 \\ -1 & -1 & -1 \\ 1 & 1 & -1 \\ 1 & -1 & -1 \\ -1 & 1 & 1 \\ -1 & -1 & 1 \end{bmatrix}$ $\frac{1}{S}\begin{bmatrix} 1 & 1 & 1 \\ 1 & -1 & 1 \\ -1 & 1 & -1 \\ -1 & -1 & -1 \\ j & j & -j \\ j & -j & -j \\ -j & j & j \\ -j & -j & j \end{bmatrix}$ $\frac{1}{S}\begin{bmatrix} 1 & 1 & 1 \\ -1 & 1 & -1 \\ -1 & -1 & -1 \\ 1 & -1 & 1 \\ 1 & 1 & -1 \\ -1 & 1 & 1 \\ -1 & -1 & 1 \\ 1 & -1 & -1 \end{bmatrix}$ $\frac{1}{S}\begin{bmatrix} 1 & 1 & 1 \\ -1 & 1 & -1 \\ -1 & -1 & -1 \\ 1 & -1 & 1 \\ j & j & -j \\ -j & j & j \\ -j & -j & j \\ j & -j & -j \end{bmatrix}$ | the UL codebook for four layers includes all of or a subset of the following, where $S=4\sqrt{2}$:

| W (ordered from left to right in increasing order of TPMI index) |
|---|

$$\frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ 1 & 1 & -1 & -1 \\ 1 & -1 & -1 & 1 \\ 1 & 1 & -1 & -1 \\ 1 & -1 & -1 & 1 \end{bmatrix} \quad \frac{1}{S}\begin{bmatrix} 1 & 1 & 1 & 1 \\ 1 & -1 & 1 & -1 \\ 1 & 1 & 1 & 1 \\ 1 & -1 & 1 & -1 \\ j & j & -j & -j \\ j & -j & -j & j \\ j & j & -j & -j \\ j & -j & -j & j \end{bmatrix} \quad \frac{1}{S}\begin{bmatrix} 1 & 1 & 1 & 1 \\ -1 & 1 & -1 & 1 \\ 1 & -1 & 1 & -1 \\ -1 & -1 & -1 & -1 \\ 1 & 1 & -1 & -1 \\ -1 & 1 & 1 & -1 \\ 1 & -1 & -1 & 1 \\ -1 & -1 & 1 & 1 \end{bmatrix} \quad \frac{1}{S}\begin{bmatrix} 1 & 1 & 1 & 1 \\ -1 & 1 & -1 & 1 \\ 1 & -1 & 1 & -1 \\ -1 & -1 & -1 & -1 \\ j & j & -j & -j \\ -j & j & j & -j \\ j & -j & -j & j \\ -j & -j & j & j \end{bmatrix}$$

$$\frac{1}{S}\begin{bmatrix} 1 & 1 & 1 & 1 \\ 1 & -1 & 1 & -1 \\ -1 & -1 & -1 & -1 \\ -1 & 1 & -1 & 1 \\ 1 & 1 & -1 & -1 \\ 1 & -1 & -1 & 1 \\ -1 & -1 & 1 & 1 \\ -1 & 1 & 1 & -1 \end{bmatrix} \quad \frac{1}{S}\begin{bmatrix} 1 & 1 & 1 & 1 \\ 1 & -1 & 1 & -1 \\ -1 & -1 & -1 & -1 \\ -1 & 1 & -1 & 1 \\ j & j & -j & -j \\ j & -j & -j & j \\ -j & -j & j & j \\ -j & j & j & -j \end{bmatrix} \quad \frac{1}{S}\begin{bmatrix} 1 & 1 & 1 & 1 \\ -1 & 1 & -1 & 1 \\ -1 & 1 & -1 & 1 \\ 1 & 1 & 1 & 1 \\ 1 & 1 & -1 & -1 \\ -1 & 1 & 1 & -1 \\ -1 & 1 & 1 & -1 \\ 1 & 1 & -1 & -1 \end{bmatrix} \quad \frac{1}{S}\begin{bmatrix} 1 & 1 & 1 & 1 \\ -1 & 1 & -1 & 1 \\ -1 & 1 & -1 & 1 \\ 1 & 1 & 1 & 1 \\ j & j & -j & -j \\ -j & j & j & -j \\ -j & j & j & -j \\ j & j & -j & -j \end{bmatrix}$$

$$\frac{1}{S}\begin{bmatrix} 1 & 1 & 1 & 1 \\ 1 & 1 & 1 & 1 \\ 1 & -1 & 1 & -1 \\ 1 & -1 & 1 & -1 \\ 1 & 1 & -1 & -1 \\ 1 & 1 & -1 & -1 \\ 1 & -1 & -1 & 1 \\ 1 & -1 & -1 & 1 \end{bmatrix} \quad \frac{1}{S}\begin{bmatrix} 1 & 1 & 1 & 1 \\ 1 & 1 & 1 & 1 \\ 1 & -1 & 1 & -1 \\ 1 & -1 & 1 & -1 \\ j & j & -j & -j \\ j & j & -j & -j \\ j & -j & -j & j \\ j & -j & -j & j \end{bmatrix} \quad \frac{1}{S}\begin{bmatrix} 1 & 1 & 1 & 1 \\ -1 & -1 & -1 & -1 \\ 1 & -1 & 1 & -1 \\ -1 & 1 & -1 & 1 \\ 1 & 1 & -1 & -1 \\ -1 & -1 & 1 & 1 \\ 1 & -1 & -1 & 1 \\ -1 & 1 & 1 & -1 \end{bmatrix} \quad \frac{1}{S}\begin{bmatrix} 1 & 1 & 1 & 1 \\ -1 & -1 & -1 & -1 \\ 1 & -1 & 1 & -1 \\ -1 & 1 & -1 & 1 \\ j & j & -j & -j \\ -j & -j & j & j \\ j & -j & -j & j \\ -j & j & j & -j \end{bmatrix}$$

$$\frac{1}{S}\begin{bmatrix} 1 & 1 & 1 & 1 \\ 1 & 1 & 1 & 1 \\ -1 & 1 & -1 & 1 \\ -1 & 1 & -1 & 1 \\ 1 & 1 & -1 & -1 \\ 1 & 1 & -1 & -1 \\ -1 & 1 & 1 & -1 \\ -1 & 1 & 1 & -1 \end{bmatrix} \quad \frac{1}{S}\begin{bmatrix} 1 & 1 & 1 & 1 \\ 1 & 1 & 1 & 1 \\ -1 & 1 & -1 & 1 \\ -1 & 1 & -1 & 1 \\ j & j & -j & -j \\ j & j & -j & -j \\ -j & j & j & -j \\ -j & j & j & -j \end{bmatrix} \quad \frac{1}{S}\begin{bmatrix} 1 & 1 & 1 & 1 \\ -1 & -1 & -1 & -1 \\ -1 & 1 & -1 & 1 \\ 1 & -1 & 1 & -1 \\ 1 & 1 & -1 & -1 \\ -1 & -1 & 1 & 1 \\ -1 & 1 & 1 & -1 \\ 1 & -1 & -1 & 1 \end{bmatrix} \quad \frac{1}{S}\begin{bmatrix} 1 & 1 & 1 & 1 \\ -1 & -1 & -1 & -1 \\ -1 & 1 & -1 & 1 \\ 1 & -1 & 1 & -1 \\ j & j & -j & -j \\ -j & -j & j & j \\ -j & j & j & -j \\ j & -j & -j & j \end{bmatrix}$$

$$\frac{1}{S}\begin{bmatrix} 1 & 1 & 1 & 1 \\ 1 & -1 & 1 & -1 \\ 1 & -1 & 1 & -1 \\ 1 & 1 & 1 & 1 \\ 1 & 1 & -1 & -1 \\ 1 & -1 & -1 & 1 \\ 1 & -1 & -1 & 1 \\ 1 & 1 & -1 & -1 \end{bmatrix} \quad \frac{1}{S}\begin{bmatrix} 1 & 1 & 1 & 1 \\ 1 & -1 & 1 & -1 \\ 1 & -1 & 1 & -1 \\ 1 & 1 & 1 & 1 \\ j & j & -j & -j \\ j & -j & -j & j \\ j & -j & -j & j \\ j & j & -j & -j \end{bmatrix} \quad \frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ 1 & 1 & -1 & -1 \\ -1 & 1 & 1 & -1 \\ 1 & 1 & -1 & -1 \\ -1 & 1 & 1 & -1 \end{bmatrix} \quad \frac{1}{S}\begin{bmatrix} 1 & 1 & 1 & 1 \\ -1 & 1 & -1 & 1 \\ 1 & 1 & 1 & 1 \\ -1 & 1 & -1 & 1 \\ j & j & -j & -j \\ -j & j & j & -j \\ j & j & -j & -j \\ -j & j & j & -j \end{bmatrix}$$

$$\frac{1}{S}\begin{bmatrix} 1 & 1 & 1 & 1 \\ 1 & -1 & 1 & -1 \\ -1 & 1 & -1 & 1 \\ -1 & -1 & -1 & -1 \\ 1 & 1 & -1 & -1 \\ 1 & -1 & -1 & 1 \\ -1 & 1 & 1 & -1 \\ -1 & -1 & 1 & 1 \end{bmatrix} \quad \frac{1}{S}\begin{bmatrix} 1 & 1 & 1 & 1 \\ 1 & -1 & 1 & -1 \\ -1 & 1 & -1 & 1 \\ -1 & -1 & -1 & -1 \\ j & j & -j & -j \\ j & -j & -j & j \\ -j & j & j & -j \\ -j & -j & j & j \end{bmatrix} \quad \frac{1}{S}\begin{bmatrix} 1 & 1 & 1 & 1 \\ -1 & 1 & -1 & 1 \\ -1 & -1 & -1 & -1 \\ 1 & -1 & 1 & -1 \\ 1 & 1 & -1 & -1 \\ -1 & 1 & 1 & -1 \\ -1 & -1 & 1 & 1 \\ 1 & -1 & -1 & 1 \end{bmatrix} \quad \frac{1}{S}\begin{bmatrix} 1 & 1 & 1 & 1 \\ -1 & 1 & -1 & 1 \\ -1 & -1 & -1 & -1 \\ 1 & -1 & 1 & -1 \\ j & j & -j & -j \\ -j & j & j & -j \\ -j & -j & j & j \\ j & -j & -j & j \end{bmatrix}$$

the UL codebook for five layers includes all of or a subset of the following, where $S=2\sqrt{10}$:

| W (ordered from left to right in increasing order of TPMI index) |
|---|

$$\frac{1}{S}\begin{bmatrix} 1 & 1 & 1 & 1 & 1 \\ 1 & 1 & -1 & -1 & 1 \\ 1 & 1 & 1 & 1 & -1 \\ 1 & 1 & -1 & -1 & -1 \\ 1 & -1 & 1 & -1 & 1 \\ 1 & -1 & -1 & 1 & 1 \\ 1 & -1 & 1 & -1 & -1 \\ 1 & -1 & -1 & 1 & -1 \end{bmatrix} \quad \frac{1}{S}\begin{bmatrix} 1 & 1 & 1 & 1 & 1 \\ 1 & 1 & -1 & -1 & 1 \\ 1 & 1 & 1 & 1 & -1 \\ 1 & 1 & -1 & -1 & -1 \\ j & -j & 1 & -1 & 1 \\ j & -j & -1 & 1 & 1 \\ j & -j & 1 & -1 & -1 \\ j & -j & -1 & 1 & -1 \end{bmatrix} \quad \frac{1}{S}\begin{bmatrix} 1 & 1 & 1 & 1 & 1 \\ -1 & -1 & 1 & 1 & -1 \\ 1 & 1 & -1 & -1 & -1 \\ -1 & -1 & -1 & -1 & 1 \\ 1 & -1 & 1 & -1 & 1 \\ -1 & 1 & 1 & -1 & -1 \\ 1 & -1 & -1 & 1 & -1 \\ -1 & 1 & -1 & 1 & 1 \end{bmatrix} \quad \frac{1}{S}\begin{bmatrix} 1 & 1 & 1 & 1 & 1 \\ -1 & -1 & 1 & 1 & -1 \\ 1 & 1 & -1 & -1 & -1 \\ -1 & -1 & -1 & -1 & 1 \\ j & -j & 1 & -1 & 1 \\ -j & j & 1 & -1 & -1 \\ j & -j & -1 & 1 & -1 \\ -j & j & -1 & 1 & 1 \end{bmatrix}$$

-continued

W (ordered from left to right in increasing order of TPMI index)

$$\frac{1}{S}\begin{bmatrix} 1 & 1 & 1 & 1 & 1 \\ 1 & 1 & -1 & -1 & 1 \\ -1 & -1 & -1 & -1 & 1 \\ -1 & -1 & 1 & 1 & 1 \\ 1 & -1 & j & -j & 1 \\ 1 & -1 & -j & j & 1 \\ -1 & 1 & -j & j & 1 \\ -1 & 1 & j & -j & 1 \end{bmatrix} \quad \frac{1}{S}\begin{bmatrix} 1 & 1 & 1 & 1 & 1 \\ 1 & 1 & -1 & -1 & 1 \\ -1 & -1 & -1 & -1 & 1 \\ -1 & -1 & 1 & 1 & 1 \\ j & -j & j & -j & 1 \\ j & -j & -j & j & 1 \\ -j & j & -j & j & 1 \\ -j & j & j & -j & 1 \end{bmatrix} \quad \frac{1}{S}\begin{bmatrix} 1 & 1 & 1 & 1 & 1 \\ -1 & -1 & 1 & 1 & -1 \\ -1 & -1 & 1 & 1 & 1 \\ 1 & 1 & 1 & 1 & -1 \\ 1 & -1 & 1 & -1 & 1 \\ -1 & 1 & 1 & -1 & -1 \\ -1 & 1 & 1 & -1 & 1 \\ 1 & -1 & 1 & -1 & -1 \end{bmatrix} \quad \frac{1}{S}\begin{bmatrix} 1 & 1 & 1 & 1 & 1 \\ -1 & -1 & 1 & 1 & -1 \\ -1 & -1 & 1 & 1 & 1 \\ 1 & 1 & 1 & 1 & -1 \\ j & -j & j & -j & 1 \\ -j & j & j & -j & -1 \\ -j & j & j & -j & 1 \\ j & -j & j & -j & -1 \end{bmatrix}$$

the UL codebook for six layers includes all of or a subset of the following, where $S=4\sqrt{3}$:

W (ordered from left to right in increasing order of TPMI index)

$$\frac{1}{S}\begin{bmatrix} 1 & 1 & 1 & 1 & 1 & 1 \\ 1 & 1 & -1 & -1 & 1 & 1 \\ 1 & 1 & 1 & 1 & -1 & -1 \\ 1 & 1 & -1 & -1 & -1 & -1 \\ 1 & -1 & 1 & -1 & 1 & -1 \\ 1 & -1 & -1 & 1 & 1 & -1 \\ 1 & -1 & 1 & -1 & -1 & 1 \\ 1 & -1 & -1 & 1 & -1 & 1 \end{bmatrix} \quad \frac{1}{S}\begin{bmatrix} 1 & 1 & 1 & 1 & 1 & 1 \\ 1 & 1 & -1 & -1 & 1 & 1 \\ 1 & 1 & 1 & 1 & -1 & -1 \\ 1 & 1 & -1 & -1 & -1 & -1 \\ j & -j & j & -j & 1 & -1 \\ j & -j & -j & j & 1 & -1 \\ j & -j & j & -j & -1 & 1 \\ j & -j & -j & j & -1 & 1 \end{bmatrix} \quad \frac{1}{S}\begin{bmatrix} 1 & 1 & 1 & 1 & 1 & 1 \\ -1 & -1 & 1 & 1 & -1 & -1 \\ -1 & -1 & 1 & 1 & -1 & -1 \\ -1 & -1 & -1 & -1 & 1 & 1 \\ 1 & -1 & 1 & -1 & 1 & -1 \\ 1 & -1 & -1 & 1 & 1 & -1 \\ 1 & -1 & -1 & 1 & -1 & 1 \\ -1 & 1 & -1 & 1 & 1 & -1 \end{bmatrix} \quad \frac{1}{S}\begin{bmatrix} 1 & 1 & 1 & 1 & 1 & 1 \\ -1 & -1 & 1 & 1 & -1 & -1 \\ 1 & 1 & -1 & -1 & -1 & -1 \\ -1 & -1 & -1 & -1 & 1 & 1 \\ j & -j & j & -j & 1 & -1 \\ -j & j & j & -j & -1 & 1 \\ j & -j & -j & j & -1 & 1 \\ -j & j & -j & j & 1 & -1 \end{bmatrix}$$

$$\frac{1}{S}\begin{bmatrix} 1 & 1 & 1 & 1 & 1 & 1 \\ 1 & 1 & -1 & -1 & 1 & 1 \\ -1 & -1 & -1 & -1 & 1 & 1 \\ -1 & -1 & 1 & 1 & 1 & 1 \\ 1 & -1 & 1 & -1 & 1 & -1 \\ 1 & -1 & -1 & 1 & 1 & -1 \\ -1 & 1 & -1 & 1 & 1 & -1 \\ -1 & 1 & 1 & -1 & 1 & -1 \end{bmatrix} \quad \frac{1}{S}\begin{bmatrix} 1 & 1 & 1 & 1 & 1 & 1 \\ 1 & 1 & -1 & -1 & 1 & 1 \\ -1 & -1 & -1 & -1 & 1 & 1 \\ -1 & -1 & 1 & 1 & 1 & 1 \\ j & -j & j & -j & 1 & -1 \\ j & -j & -j & j & 1 & -1 \\ -j & j & -j & j & 1 & -1 \\ -j & j & j & -j & 1 & -1 \end{bmatrix} \quad \frac{1}{S}\begin{bmatrix} 1 & 1 & 1 & 1 & 1 & 1 \\ -1 & -1 & 1 & 1 & -1 & -1 \\ -1 & -1 & 1 & 1 & 1 & 1 \\ 1 & 1 & 1 & 1 & -1 & -1 \\ 1 & -1 & 1 & -1 & 1 & -1 \\ 1 & -1 & -1 & 1 & 1 & -1 \\ -1 & 1 & 1 & -1 & -1 & 1 \\ 1 & -1 & 1 & -1 & -1 & 1 \end{bmatrix} \quad \frac{1}{S}\begin{bmatrix} 1 & 1 & 1 & 1 & 1 & 1 \\ -1 & -1 & 1 & 1 & -1 & -1 \\ -1 & -1 & 1 & 1 & 1 & 1 \\ 1 & 1 & 1 & 1 & -1 & -1 \\ j & -j & j & -j & 1 & -1 \\ -j & j & j & -j & -1 & 1 \\ -j & j & j & -j & 1 & -1 \\ j & -j & j & -j & -1 & 1 \end{bmatrix}$$

the UL codebook for six layers includes all of or a subset of the following, where $S=2\sqrt{14}$:

W (ordered from left to right in increasing order of TPMI index)

$$\frac{1}{S}\begin{bmatrix} 1 & 1 & 1 & 1 & 1 & 1 & 1 \\ 1 & 1 & -1 & 1 & 1 & -1 & -1 \\ 1 & 1 & 1 & -1 & -1 & -1 & -1 \\ 1 & 1 & -1 & -1 & -1 & 1 & 1 \\ 1 & -1 & 1 & 1 & -1 & 1 & -1 \\ 1 & -1 & -1 & 1 & -1 & -1 & 1 \\ 1 & -1 & 1 & -1 & 1 & -1 & 1 \\ 1 & -1 & -1 & -1 & 1 & 1 & -1 \end{bmatrix}$$

$$\frac{1}{S}\begin{bmatrix} 1 & 1 & 1 & 1 & 1 & 1 & 1 \\ 1 & 1 & -1 & 1 & 1 & -1 & -1 \\ 1 & 1 & 1 & -1 & -1 & -1 & -1 \\ 1 & 1 & -1 & -1 & -1 & 1 & 1 \\ j & -j & j & 1 & -1 & 1 & -1 \\ j & -j & -j & 1 & -1 & -1 & 1 \\ j & -j & j & -1 & 1 & -1 & 1 \\ j & -j & -j & -1 & 1 & 1 & -1 \end{bmatrix}$$

$$\frac{1}{S}\begin{bmatrix} 1 & 1 & 1 & 1 & 1 & 1 & 1 \\ -1 & -1 & 1 & -1 & -1 & 1 & 1 \\ 1 & 1 & -1 & -1 & -1 & 1 & 1 \\ -1 & -1 & -1 & 1 & 1 & 1 & 1 \\ 1 & -1 & 1 & 1 & -1 & 1 & -1 \\ -1 & 1 & 1 & -1 & 1 & 1 & -1 \\ 1 & -1 & -1 & 1 & 1 & -1 & 1 \\ -1 & 1 & -1 & 1 & -1 & -1 & 1 \end{bmatrix}$$

-continued

W (ordered from left to right in increasing order of TPMI index)

$$\frac{1}{S}\begin{bmatrix} 1 & 1 & 1 & 1 & 1 & 1 & 1 \\ -1 & -1 & 1 & -1 & -1 & 1 & 1 \\ 1 & 1 & -1 & -1 & -1 & 1 & 1 \\ -1 & -1 & -1 & 1 & 1 & 1 & 1 \\ j & -j & j & 1 & -1 & 1 & -1 \\ -j & j & j & -1 & 1 & 1 & -1 \\ j & -j & -j & 1 & 1 & -1 & 1 \\ -j & j & -j & 1 & -1 & 1 & -1 \end{bmatrix}$$

$$\frac{1}{S}\begin{bmatrix} 1 & 1 & 1 & 1 & 1 & 1 & 1 \\ 1 & 1 & -1 & 1 & 1 & -1 & -1 \\ -1 & -1 & -1 & 1 & 1 & 1 & 1 \\ -1 & -1 & 1 & 1 & 1 & -1 & -1 \\ 1 & -1 & 1 & 1 & -1 & 1 & -1 \\ 1 & -1 & -1 & 1 & -1 & -1 & 1 \\ -1 & 1 & -1 & 1 & -1 & 1 & -1 \\ -1 & 1 & 1 & 1 & -1 & -1 & 1 \end{bmatrix}$$

$$\frac{1}{S}\begin{bmatrix} 1 & 1 & 1 & 1 & 1 & 1 & 1 \\ 1 & 1 & -1 & 1 & 1 & -1 & -1 \\ -1 & -1 & -1 & 1 & 1 & 1 & 1 \\ -1 & -1 & 1 & 1 & 1 & -1 & -1 \\ j & -j & j & 1 & -1 & 1 & -1 \\ j & -j & -j & 1 & -1 & -1 & 1 \\ -j & j & -j & 1 & -1 & 1 & -1 \\ -j & j & j & 1 & -1 & -1 & 1 \end{bmatrix}$$

W (ordered from left to right in increasing order of TPMI index)

$$\frac{1}{S}\begin{bmatrix} 1 & 1 & 1 & 1 & 1 & 1 & 1 \\ -1 & -1 & 1 & -1 & -1 & 1 & 1 \\ -1 & -1 & 1 & 1 & 1 & -1 & -1 \\ 1 & 1 & 1 & -1 & -1 & -1 & -1 \\ 1 & -1 & 1 & 1 & -1 & 1 & -1 \\ -1 & 1 & 1 & -1 & 1 & 1 & -1 \\ -1 & 1 & 1 & 1 & -1 & -1 & 1 \\ 1 & -1 & 1 & -1 & 1 & -1 & 1 \end{bmatrix}$$

$$\frac{1}{S}\begin{bmatrix} 1 & 1 & 1 & 1 & 1 & 1 & 1 \\ -1 & -1 & 1 & -1 & -1 & 1 & 1 \\ -1 & -1 & 1 & 1 & 1 & -1 & -1 \\ 1 & 1 & 1 & -1 & -1 & -1 & -1 \\ j & -j & j & 1 & -1 & 1 & -1 \\ -j & j & j & -1 & 1 & 1 & -1 \\ -j & j & j & 1 & -1 & -1 & 1 \\ j & -j & j & -1 & 1 & -1 & 1 \end{bmatrix}$$

the UL codebook for eight layers includes all of or a subset of the following, where S=8:

W (ordered from left to right in increasing order of TPMI index)

$$\frac{1}{S}\begin{bmatrix} 1 & 1 & 1 & 1 & 1 & 1 & 1 & 1 \\ 1 & 1 & -1 & -1 & 1 & 1 & -1 & -1 \\ 1 & 1 & 1 & 1 & -1 & -1 & -1 & -1 \\ 1 & 1 & -1 & -1 & -1 & -1 & 1 & 1 \\ 1 & -1 & 1 & -1 & 1 & -1 & 1 & -1 \\ 1 & -1 & -1 & 1 & 1 & -1 & -1 & 1 \\ 1 & -1 & 1 & -1 & -1 & 1 & -1 & 1 \\ 1 & -1 & -1 & 1 & -1 & 1 & 1 & -1 \end{bmatrix}$$

$$\frac{1}{S}\begin{bmatrix} 1 & 1 & 1 & 1 & 1 & 1 & 1 & 1 \\ 1 & 1 & -1 & -1 & 1 & 1 & -1 & -1 \\ 1 & 1 & 1 & 1 & -1 & -1 & -1 & -1 \\ 1 & 1 & -1 & -1 & -1 & -1 & 1 & 1 \\ j & -j & j & -j & 1 & -1 & 1 & -1 \\ j & -j & -j & j & 1 & -1 & -1 & 1 \\ j & -j & j & -j & -1 & 1 & -1 & 1 \\ j & -j & -j & j & -1 & 1 & 1 & -1 \end{bmatrix}$$

$$\frac{1}{S}\begin{bmatrix} 1 & 1 & 1 & 1 & 1 & 1 & 1 & 1 \\ -1 & -1 & 1 & 1 & -1 & -1 & 1 & 1 \\ 1 & 1 & -1 & -1 & -1 & -1 & 1 & 1 \\ -1 & -1 & -1 & -1 & 1 & 1 & 1 & 1 \\ 1 & -1 & 1 & -1 & 1 & -1 & 1 & -1 \\ -1 & 1 & 1 & -1 & -1 & 1 & 1 & -1 \\ 1 & -1 & -1 & 1 & -1 & 1 & 1 & -1 \\ -1 & 1 & -1 & 1 & 1 & -1 & 1 & -1 \end{bmatrix}$$

$$\frac{1}{S}\begin{bmatrix} 1 & 1 & 1 & 1 & 1 & 1 & 1 & 1 \\ -1 & -1 & 1 & 1 & -1 & -1 & 1 & 1 \\ 1 & 1 & -1 & -1 & -1 & -1 & 1 & 1 \\ -1 & -1 & -1 & -1 & 1 & 1 & 1 & 1 \\ j & -j & j & -j & 1 & -1 & 1 & -1 \\ -j & j & j & -j & -1 & 1 & 1 & -1 \\ j & -j & -j & j & -1 & 1 & 1 & -1 \\ -j & j & -j & j & 1 & -1 & 1 & -1 \end{bmatrix}$$

$$\frac{1}{S}\begin{bmatrix} 1 & 1 & 1 & 1 & 1 & 1 & 1 & 1 \\ 1 & 1 & -1 & -1 & 1 & 1 & -1 & -1 \\ -1 & -1 & -1 & -1 & 1 & 1 & 1 & 1 \\ -1 & -1 & 1 & 1 & 1 & 1 & -1 & -1 \\ 1 & -1 & 1 & -1 & 1 & -1 & 1 & -1 \\ 1 & -1 & -1 & 1 & 1 & -1 & -1 & 1 \\ -1 & 1 & -1 & 1 & 1 & -1 & 1 & -1 \\ -1 & 1 & 1 & -1 & 1 & -1 & -1 & 1 \end{bmatrix}$$

W (ordered from left to right in increasing order of TPMI index)

$$\frac{1}{S}\begin{bmatrix} 1 & 1 & 1 & 1 & 1 & 1 & 1 & 1 \\ 1 & 1 & -1 & -1 & 1 & 1 & -1 & -1 \\ -1 & -1 & -1 & -1 & 1 & 1 & 1 & 1 \\ -1 & -1 & 1 & 1 & 1 & 1 & -1 & -1 \\ j & -j & j & -j & 1 & -1 & 1 & -1 \\ j & -j & -j & j & 1 & -1 & -1 & 1 \\ -j & j & -j & j & 1 & -1 & 1 & -1 \\ -j & j & j & -j & 1 & -1 & -1 & 1 \end{bmatrix}$$

$$\frac{1}{S}\begin{bmatrix} 1 & 1 & 1 & 1 & 1 & 1 & 1 & 1 \\ -1 & -1 & 1 & 1 & -1 & -1 & 1 & 1 \\ -1 & -1 & 1 & 1 & 1 & 1 & -1 & -1 \\ 1 & 1 & 1 & 1 & -1 & -1 & -1 & -1 \\ 1 & -1 & 1 & -1 & 1 & -1 & 1 & -1 \\ -1 & 1 & 1 & -1 & -1 & 1 & 1 & -1 \\ -1 & 1 & 1 & -1 & 1 & -1 & -1 & 1 \\ 1 & -1 & 1 & -1 & -1 & 1 & -1 & 1 \end{bmatrix}$$

$$\frac{1}{S}\begin{bmatrix} 1 & 1 & 1 & 1 & 1 & 1 & 1 & 1 \\ -1 & -1 & 1 & 1 & -1 & -1 & 1 & 1 \\ -1 & -1 & 1 & 1 & 1 & 1 & -1 & -1 \\ 1 & 1 & 1 & 1 & -1 & -1 & -1 & -1 \\ j & -j & j & -j & 1 & -1 & 1 & -1 \\ -j & j & j & -j & -1 & 1 & 1 & -1 \\ -j & j & j & -j & 1 & -1 & -1 & 1 \\ j & -j & j & -j & -1 & 1 & -1 & 1 \end{bmatrix}.$$

15. A method performed by a user equipment (UE), the method comprising:
 transmitting UE capability information including at least one value of $N_g$ from {1, 2, 4, 8}, each value indicating a number of antenna port groups with each group comprising $N/N_g$ antenna ports, where N is a number of antenna ports at the UE;
 receiving a configuration about (i) an uplink (UL) codebook for N antenna ports and (ii) a configured $N_g$ value, wherein the UL codebook is according to the configured $N_g$ value and the configured $N_g$ value is based on the at least one value of $N_g$;
 receiving an indication indicating a transmit precoding matrix indicator (TPMI) for transmission of a physical uplink shared channel (PUSCH); and
 transmitting the PUSCH based on the indicated TPMI, wherein the TPMI indicates a precoding matrix (W) from the UL codebook for N antenna ports, and
 wherein at least one value of N is 8.

16. The method of claim 15, wherein the indication is via a downlink control information (DCI) field in an UL-DCI granting the PUSCH transmission.

17. The method of claim 15, wherein, when the at least one value of $N_g$ includes $N_g=1$, the UE capability information further includes at least one value for ($N_1$, $N_2$) from (4,1) and (2,2), where $N_1$ and $N_2$ are number of antenna ports with the same polarization in the first and second dimensions, respectively.

18. The method of claim 15, wherein the configuration is via a radio resource control (RRC) parameter, and the UL codebook is one of:
 a first codebook corresponding to $N_g=1$ and comprising full-coherent (FC) precoding matrices,
 a second codebook corresponding to $N_g=2$ and comprising partial-coherent (PC) precoding matrices,
 a third codebook corresponding to $N_g=4$ and comprising partial-coherent (PC) precoding matrices, or a fourth codebook corresponding to $N_g=8$ and comprising non-coherent (NC) precoding matrices.

19. The method of claim 15, wherein the first codebook corresponds to one of $(N_g, N_1, N_2)=(1, 4, 1)$ and $(1, 2, 2)$.

20. The method of claim 19, wherein when $(N_g, N_1, N_2)=(1, 4, 1)$:

the UL codebook for two layers includes all of or a subset of the following, where S=4:

| TPMI index | W (ordered from left to right in increasing order of TPMI index) |
|---|---|
| 0-7 | $\frac{1}{S}\begin{bmatrix}1&1\\1&1\\1&1\\1&1\\1&-1\\1&-1\\1&-1\\1&-1\end{bmatrix}$ $\frac{1}{S}\begin{bmatrix}1&1\\1&1\\1&1\\1&1\\j&-j\\j&-j\\j&-j\\j&-j\end{bmatrix}$ $\frac{1}{S}\begin{bmatrix}1&1\\j&j\\-1&-1\\-j&-j\\1&-1\\j&-j\\-1&1\\-j&j\end{bmatrix}$ $\frac{1}{S}\begin{bmatrix}1&1\\j&j\\-1&-1\\-j&-j\\1&-1\\j&-j\\-1&1\\1&-1\end{bmatrix}$ $\frac{1}{S}\begin{bmatrix}1&1\\-1&-1\\1&1\\-1&-1\\1&-1\\-1&1\\1&-1\\-1&1\end{bmatrix}$ $\frac{1}{S}\begin{bmatrix}1&1\\-1&-1\\1&1\\-1&-1\\1&-1\\-1&1\\-j&j\\-j&j\end{bmatrix}$ $\frac{1}{S}\begin{bmatrix}1&1\\-j&-j\\-1&-1\\j&j\\1&-1\\-j&j\\-1&1\\j&-j\end{bmatrix}$ $\frac{1}{S}\begin{bmatrix}1&1\\-j&-j\\-1&-1\\j&j\\1&-1\\j&-j\\1&-1\\-j&-j\\-1&1\end{bmatrix}$ |
| 8-15 | $\frac{1}{S}\begin{bmatrix}1&1\\1&j\\1&-1\\1&-j\\1&-1\\1&-j\\1&1\\1&j\end{bmatrix}$ $\frac{1}{S}\begin{bmatrix}1&1\\1&j\\1&-1\\1&-j\\j&-j\\j&1\\j&j\\j&-1\end{bmatrix}$ $\frac{1}{S}\begin{bmatrix}1&1\\j&-1\\-1&1\\-j&-1\\1&-1\\j&1\\-1&-1\\-j&1\end{bmatrix}$ $\frac{1}{S}\begin{bmatrix}1&1\\j&-1\\-1&1\\-j&-1\\j&-j\\j&1\\-j&-j\\1&j\end{bmatrix}$ $\frac{1}{S}\begin{bmatrix}1&1\\-1&-j\\-1&1\\-1&j\\-1&j\\-1&j\\1&1\\-1&-j\end{bmatrix}$ $\frac{1}{S}\begin{bmatrix}1&1\\-1&-j\\1&-1\\-1&j\\-1&j\\j&-j\\j&-1\\-1&-j\end{bmatrix}$ $\frac{1}{S}\begin{bmatrix}1&1\\-j&1\\-1&1\\j&1\\1&-1\\j&-j\\-j&-1\\-1&-1\\j&-1\end{bmatrix}$ $\frac{1}{S}\begin{bmatrix}1&1\\-j&1\\-1&1\\j&1\\j&-j\\j&-j\\1&-j\\-j&-j\\-1&-j\end{bmatrix}$ |
| 16-23 | $\frac{1}{S}\begin{bmatrix}1&1\\1&-1\\1&1\\1&-1\\1&-1\\1&1\\1&-1\\1&1\end{bmatrix}$ $\frac{1}{S}\begin{bmatrix}1&1\\1&-1\\1&1\\1&-1\\j&-j\\j&j\\j&-j\\j&j\end{bmatrix}$ $\frac{1}{S}\begin{bmatrix}1&1\\j&-j\\-1&-1\\-j&j\\1&-1\\j&j\\-1&1\\-j&-j\end{bmatrix}$ $\frac{1}{S}\begin{bmatrix}1&1\\j&-j\\-1&-1\\-j&j\\j&-j\\j&j\\-1&-1\\-j&-j\end{bmatrix}$ $\frac{1}{S}\begin{bmatrix}1&1\\-1&1\\1&1\\-1&1\\-1&-1\\-1&1\\1&-1\\-1&1\end{bmatrix}$ $\frac{1}{S}\begin{bmatrix}1&1\\-1&1\\1&1\\-1&1\\-1&-1\\-j&-j\\-1&-1\\-j&-j\end{bmatrix}$ $\frac{1}{S}\begin{bmatrix}1&1\\-j&j\\-1&-1\\j&-j\\1&-1\\-j&-j\\-1&1\\j&-j\end{bmatrix}$ $\frac{1}{S}\begin{bmatrix}1&1\\-j&j\\-1&-1\\j&-j\\j&-j\\j&j\\1&1\\-j&j\\-1&-1\end{bmatrix}$ |
| 24-31 | $\frac{1}{S}\begin{bmatrix}1&1\\1&-j\\1&-1\\1&j\\1&-1\\1&j\\1&1\\1&-j\end{bmatrix}$ $\frac{1}{S}\begin{bmatrix}1&1\\1&-j\\1&-1\\1&j\\j&-j\\j&-1\\j&-j\\j&1\end{bmatrix}$ $\frac{1}{S}\begin{bmatrix}1&1\\j&1\\-1&1\\-j&1\\1&-1\\j&-1\\-1&-1\\-j&-1\end{bmatrix}$ $\frac{1}{S}\begin{bmatrix}1&1\\j&1\\-1&1\\-j&1\\j&-j\\j&-1\\-j&-j\\-j&-1\end{bmatrix}$ $\frac{1}{S}\begin{bmatrix}1&1\\-1&j\\-1&1\\-1&-j\\-1&-j\\-1&-j\\1&1\\-1&j\end{bmatrix}$ $\frac{1}{S}\begin{bmatrix}1&1\\-1&j\\-1&1\\-1&-j\\-1&-j\\-1&-j\\-j&1\\j&j\\-j&-1\end{bmatrix}$ $\frac{1}{S}\begin{bmatrix}1&1\\-j&-1\\-1&1\\j&-1\\j&-1\\j&-1\\-j&1\\j&j\\-1&-1\\j&1\end{bmatrix}$ $\frac{1}{S}\begin{bmatrix}1&1\\-j&-1\\-1&1\\j&-1\\j&-j\\j&-1\\1&j\\-j&-j\\-1&j\end{bmatrix}$ | the UL codebook for three layers includes all of or a subset of the following, where $S=2\sqrt{6}$:

| TPMI index | W (ordered from left to right in increasing order of TPMI index) |
|---|---|
| 0-23 | $\frac{1}{S}\begin{bmatrix}1&1&1\\1&j&1\\1&-1&1\\1&-j&1\\1&1&-1\\1&j&-1\\1&-1&-1\\1&-j&-1\end{bmatrix}$ $\frac{1}{S}\begin{bmatrix}1&1&1\\1&j&1\\1&-1&1\\1&-j&1\\j&j&-j\\j&-1&-j\\j&-j&-j\\j&1&-j\end{bmatrix}$ $\frac{1}{S}\begin{bmatrix}1&1&1\\j&-1&j\\-1&1&-1\\-j&-1&-j\\1&1&-1\\j&-1&1\\-1&1&-1\\-j&-1&1\end{bmatrix}$ $\frac{1}{S}\begin{bmatrix}1&1&1\\j&-1&j\\-1&1&-1\\-j&-1&-j\\j&-1&-j\\j&j&-j\\-1&-j&1\\-j&j&j\\1&-j&-1\end{bmatrix}$ |

| TPMI index | W (ordered from left to right in increasing order of TPMI index) |
|---|---|
| | $\frac{1}{S}\begin{bmatrix} 1 & 1 & 1 \\ -1 & -j & -1 \\ 1 & -1 & 1 \\ -1 & j & -1 \\ 1 & 1 & -1 \\ -1 & -j & 1 \\ 1 & -1 & -1 \\ -1 & j & 1 \end{bmatrix}$ $\frac{1}{S}\begin{bmatrix} 1 & 1 & 1 \\ -1 & -j & -1 \\ 1 & -1 & 1 \\ -1 & j & -1 \\ j & j & -j \\ -j & 1 & j \\ j & -j & -j \\ -j & -1 & j \end{bmatrix}$ $\frac{1}{S}\begin{bmatrix} 1 & 1 & 1 \\ -j & 1 & -j \\ -1 & 1 & -1 \\ j & 1 & j \\ 1 & 1 & -1 \\ -j & 1 & j \\ -1 & 1 & 1 \\ j & 1 & -j \end{bmatrix}$ $\frac{1}{S}\begin{bmatrix} 1 & 1 & 1 \\ -j & 1 & -j \\ -1 & 1 & -1 \\ j & 1 & j \\ j & j & -j \\ 1 & j & -1 \\ -j & j & -j \\ -1 & j & 1 \end{bmatrix}$ |
| | $\frac{1}{S}\begin{bmatrix} 1 & 1 & 1 \\ 1 & -1 & 1 \\ 1 & 1 & 1 \\ 1 & -1 & 1 \\ 1 & 1 & -1 \\ 1 & -1 & -1 \\ 1 & 1 & -1 \\ 1 & -1 & -1 \end{bmatrix}$ $\frac{1}{S}\begin{bmatrix} 1 & 1 & 1 \\ 1 & -1 & 1 \\ 1 & 1 & 1 \\ 1 & -1 & 1 \\ j & j & -j \\ j & -j & -j \\ j & j & -j \\ j & -j & -j \end{bmatrix}$ $\frac{1}{S}\begin{bmatrix} 1 & 1 & 1 \\ j & -j & j \\ -1 & -1 & -1 \\ -j & j & -j \\ 1 & 1 & -1 \\ j & -j & -j \\ -1 & -1 & 1 \\ -j & j & j \end{bmatrix}$ $\frac{1}{S}\begin{bmatrix} 1 & 1 & 1 \\ j & -j & j \\ -1 & -1 & -1 \\ -j & j & -j \\ j & j & -j \\ j & j & -j \\ -1 & 1 & 1 \\ -j & -j & j \\ 1 & -1 & -1 \end{bmatrix}$ |
| | $\frac{1}{S}\begin{bmatrix} 1 & 1 & 1 \\ -1 & 1 & -1 \\ 1 & 1 & 1 \\ -1 & 1 & -1 \\ 1 & 1 & -1 \\ -1 & 1 & 1 \\ 1 & 1 & -1 \\ -1 & 1 & 1 \end{bmatrix}$ $\frac{1}{S}\begin{bmatrix} 1 & 1 & 1 \\ -1 & 1 & -1 \\ 1 & 1 & 1 \\ -1 & 1 & -1 \\ j & j & -j \\ -j & j & j \\ j & j & -j \\ -j & j & j \end{bmatrix}$ $\frac{1}{S}\begin{bmatrix} 1 & 1 & 1 \\ -j & j & -j \\ -1 & -1 & -1 \\ j & -j & j \\ 1 & 1 & -1 \\ -j & j & j \\ -1 & -1 & 1 \\ j & -j & -j \end{bmatrix}$ $\frac{1}{S}\begin{bmatrix} 1 & 1 & 1 \\ -j & j & -j \\ -1 & -1 & -1 \\ j & -j & j \\ j & j & -j \\ 1 & -1 & -1 \\ -j & -j & -j \\ -1 & 1 & 1 \end{bmatrix}$ |
| | $\frac{1}{S}\begin{bmatrix} 1 & 1 & 1 \\ 1 & -j & 1 \\ 1 & -1 & 1 \\ 1 & j & 1 \\ 1 & 1 & -1 \\ 1 & -j & -1 \\ 1 & -1 & -1 \\ 1 & j & -1 \end{bmatrix}$ $\frac{1}{S}\begin{bmatrix} 1 & 1 & 1 \\ 1 & -j & 1 \\ 1 & -1 & 1 \\ 1 & j & 1 \\ j & j & -j \\ j & 1 & -j \\ j & -j & -j \\ j & -1 & -j \end{bmatrix}$ $\frac{1}{S}\begin{bmatrix} 1 & 1 & 1 \\ j & 1 & j \\ -1 & 1 & -1 \\ -j & 1 & -j \\ 1 & 1 & -1 \\ j & 1 & -j \\ -1 & 1 & 1 \\ -j & 1 & j \end{bmatrix}$ $\frac{1}{S}\begin{bmatrix} 1 & 1 & 1 \\ j & 1 & j \\ -1 & 1 & -1 \\ -j & 1 & -j \\ j & j & -j \\ j & j & -j \\ -1 & j & 1 \\ -j & j & j \\ 1 & j & -1 \end{bmatrix}$ |
| | $\frac{1}{S}\begin{bmatrix} 1 & 1 & 1 \\ -1 & j & -1 \\ 1 & -1 & 1 \\ -1 & -j & -1 \\ 1 & 1 & -1 \\ -1 & j & 1 \\ 1 & -1 & -1 \\ -1 & -j & 1 \end{bmatrix}$ $\frac{1}{S}\begin{bmatrix} 1 & 1 & 1 \\ -1 & j & -1 \\ 1 & -1 & 1 \\ -1 & -j & -1 \\ j & j & -j \\ -j & -1 & j \\ j & -j & -j \\ -j & 1 & j \end{bmatrix}$ $\frac{1}{S}\begin{bmatrix} 1 & 1 & 1 \\ -j & -1 & -j \\ -1 & 1 & -1 \\ j & -1 & j \\ 1 & 1 & -1 \\ -j & -1 & j \\ -1 & 1 & 1 \\ j & -1 & -j \end{bmatrix}$ $\frac{1}{S}\begin{bmatrix} 1 & 1 & 1 \\ -j & -1 & -j \\ -1 & 1 & -1 \\ j & -1 & j \\ j & j & -j \\ 1 & -j & -1 \\ -j & j & -j \\ -1 & -j & 1 \end{bmatrix}$ | the UL codebook for three layers includes all of or a subset of the following, where $S=4\sqrt{2}$:

| TPMI index | W (ordered from left to right in increasing order of TPMI index) |
|---|---|
| 0-23 | $\frac{1}{S}\begin{bmatrix} 1 & 1 & 1 & 1 \\ 1 & j & 1 & j \\ 1 & -1 & 1 & -1 \\ 1 & -j & 1 & -j \\ 1 & 1 & -1 & -1 \\ 1 & j & -1 & -j \\ 1 & -1 & -1 & 1 \\ 1 & -j & -1 & j \end{bmatrix}$ $\frac{1}{S}\begin{bmatrix} 1 & 1 & 1 & 1 \\ 1 & j & 1 & j \\ 1 & -1 & 1 & -1 \\ 1 & -j & 1 & -j \\ j & j & -j & -j \\ j & -1 & -j & 1 \\ j & -j & -j & j \\ j & 1 & -j & -1 \end{bmatrix}$ $\frac{1}{S}\begin{bmatrix} 1 & 1 & 1 & 1 \\ j & -1 & j & -1 \\ -1 & 1 & -1 & 1 \\ -j & -1 & -j & -1 \\ 1 & 1 & -1 & -1 \\ j & -1 & -j & 1 \\ -1 & 1 & 1 & -1 \\ -j & -1 & j & 1 \end{bmatrix}$ $\frac{1}{S}\begin{bmatrix} 1 & 1 & 1 & 1 \\ j & -1 & j & -1 \\ -1 & 1 & -1 & 1 \\ -j & -1 & -j & -1 \\ j & j & -j & -j \\ j & j & -j & -j \\ -1 & -j & 1 & j \\ -j & j & j & -j \\ 1 & -j & -1 & j \end{bmatrix}$ |

| TPMI index | W (ordered from left to right in increasing order of TPMI index) |
|---|---|

$$\frac{1}{S}\begin{bmatrix}1&1&1&1\\-1&-j&-1&-j\\1&-1&1&-1\\-1&j&-1&j\\1&1&-1&-1\\-1&-j&1&j\\1&-1&-1&1\\-1&j&1&-j\end{bmatrix} \quad \frac{1}{S}\begin{bmatrix}1&1&1&1\\-1&-j&-1&-j\\1&-1&1&-1\\-1&j&-1&j\\j&j&-j&-j\\-j&1&j&-1\\j&-j&-j&-j\\-j&-1&j&1\end{bmatrix} \quad \frac{1}{S}\begin{bmatrix}1&1&1&1\\-j&1&-j&1\\-1&-1&-1&-1\\j&1&j&1\\1&1&-1&-1\\-j&1&j&-1\\-1&1&1&-1\\j&1&-j&-1\end{bmatrix} \quad \frac{1}{S}\begin{bmatrix}1&1&1&1\\-j&1&-j&1\\-1&1&-1&1\\j&1&j&1\\j&j&-j&-j\\1&j&-1&-j\\-j&j&-j&-j\\-1&j&1&-j\end{bmatrix}$$

$$\frac{1}{S}\begin{bmatrix}1&1&1&1\\1&-1&1&-1\\1&1&1&1\\1&-1&1&-1\\1&1&-1&-1\\1&-1&-1&1\\1&1&-1&-1\\1&-1&-1&1\end{bmatrix} \quad \frac{1}{S}\begin{bmatrix}1&1&1&1\\1&-1&1&-1\\1&1&1&1\\1&-1&1&-1\\j&j&-j&-j\\j&-j&-j&j\\j&j&-j&-j\\j&-j&-j&j\end{bmatrix} \quad \frac{1}{S}\begin{bmatrix}1&1&1&1\\j&-j&j&-j\\-1&-1&-1&-1\\-j&j&-j&j\\1&1&-1&-1\\j&-j&-j&j\\-1&-1&1&1\\-j&j&j&-j\end{bmatrix} \quad \frac{1}{S}\begin{bmatrix}1&1&1&1\\j&-j&j&-j\\-1&-1&-1&-1\\-j&j&-j&j\\j&j&-j&-j\\-1&1&1&-1\\-j&-j&j&j\\1&-1&-1&1\end{bmatrix}$$

$$\frac{1}{S}\begin{bmatrix}1&1&1&1\\-1&1&-1&1\\1&1&1&1\\-1&1&-1&1\\1&1&-1&-1\\-1&1&1&-1\\1&1&-1&-1\\-1&1&1&-1\end{bmatrix} \quad \frac{1}{S}\begin{bmatrix}1&1&1&1\\-1&1&-1&1\\1&1&1&1\\-1&1&-1&1\\j&j&-j&-j\\-j&j&j&-j\\j&j&-j&-j\\-j&j&j&-j\end{bmatrix} \quad \frac{1}{S}\begin{bmatrix}1&1&1&1\\-j&j&-j&j\\-1&-1&-1&-1\\j&-j&j&-j\\1&1&-1&-1\\-j&j&j&-j\\-1&-1&1&1\\j&-j&-j&j\end{bmatrix} \quad \frac{1}{S}\begin{bmatrix}1&1&1&1\\-j&j&-j&j\\-1&-1&-1&-1\\j&-j&j&-j\\j&j&-j&-j\\1&-1&-1&1\\-j&-j&j&j\\-1&1&1&-1\end{bmatrix}$$

$$\frac{1}{S}\begin{bmatrix}1&1&1&1\\1&-j&1&-j\\1&-1&1&-1\\1&j&1&j\\1&1&-1&-1\\1&-j&-1&j\\1&-1&-1&1\\1&j&-1&-j\end{bmatrix} \quad \frac{1}{S}\begin{bmatrix}1&1&1&1\\1&-j&1&-j\\1&-1&1&-1\\1&j&1&j\\j&j&-j&-j\\j&1&-j&-1\\j&-j&-j&j\\j&-1&-j&1\end{bmatrix} \quad \frac{1}{S}\begin{bmatrix}1&1&1&1\\j&1&j&1\\-1&1&-1&1\\-j&1&-j&1\\1&1&-1&-1\\j&1&-j&-1\\-1&1&1&-1\\-j&1&j&-1\end{bmatrix} \quad \frac{1}{S}\begin{bmatrix}1&1&1&1\\j&1&j&1\\-1&1&-1&1\\-j&1&-j&1\\j&j&-j&-j\\-1&j&1&-j\\-j&j&j&-j\\1&j&-1&-j\end{bmatrix}$$

$$\frac{1}{S}\begin{bmatrix}1&1&1&1\\-1&j&-1&j\\1&-1&1&-1\\-1&-j&-1&-j\\1&1&-1&-1\\-1&j&1&-j\\1&-1&-1&1\\-1&-j&1&j\end{bmatrix} \quad \frac{1}{S}\begin{bmatrix}1&1&1&1\\-1&j&-1&j\\1&-1&1&-1\\-1&-j&-1&-j\\j&j&-j&-j\\-j&-1&j&1\\j&-j&-j&j\\-j&1&j&-1\end{bmatrix} \quad \frac{1}{S}\begin{bmatrix}1&1&1&1\\-j&-1&-j&-1\\-1&1&-1&1\\j&-1&j&-1\\1&1&-1&-1\\-j&-1&j&1\\-1&1&1&-1\\j&-1&-j&1\end{bmatrix} \quad \frac{1}{S}\begin{bmatrix}1&1&1&1\\-j&-1&-j&-1\\-1&1&-1&1\\j&-1&j&-1\\j&j&-j&-j\\1&-j&-1&j\\-j&j&j&-j\\-1&-j&1&j\end{bmatrix}$$

the UL codebook for five layers includes all of or a subset of the following, where $S=2\sqrt{10}$:

| TPMI index | W (ordered from left to right in increasing order of TPMI index) |
|---|---|
| 0-3 | $\frac{1}{S}\begin{bmatrix}1&1&1&1&1\\1&1&j&j&-1\\1&1&-1&-1&1\\1&1&-j&-j&-1\\1&-1&1&-1&1\\1&-1&j&-j&-1\\1&-1&-1&1&1\\1&-1&-j&j&-1\end{bmatrix} \quad \frac{1}{S}\begin{bmatrix}1&1&1&1&1\\1&1&j&j&-1\\1&1&-1&-1&1\\1&1&-j&-j&-1\\j&-j&1&-1&1\\j&-j&j&-j&-1\\j&-j&-1&1&1\\j&-j&-j&j&-1\end{bmatrix} \quad \frac{1}{S}\begin{bmatrix}1&1&1&1&1\\j&j&-1&-1&-j\\-1&-1&1&1&-1\\-j&-j&-1&-1&j\\1&-1&1&-1&1\\j&-j&-1&1&-j\\-1&1&1&-1&-1\\-j&j&-1&1&j\end{bmatrix} \quad \frac{1}{S}\begin{bmatrix}1&1&1&1&1\\j&j&-1&-1&-j\\-1&-1&1&1&-1\\-j&-j&-1&-1&j\\j&-j&1&-1&j\\-1&1&-1&1&-1\\-j&j&1&-1&-j\\1&-1&-1&1&j\end{bmatrix}$ |

| TPMI index | W (ordered from left to right in increasing order of TPMI index) |
|---|---|
| 4-7 | $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ 1 & -1 & 1 & -1 & 1 \\ -1 & 1 & -j & j & 1 \\ 1 & -1 & -1 & 1 & 1 \\ -1 & 1 & j & -j & 1 \end{bmatrix}$ $\frac{1}{S}\begin{bmatrix} 1 & 1 & 1 & 1 & 1 \\ -1 & -1 & -j & -j & 1 \\ 1 & 1 & -1 & -1 & 1 \\ -1 & -1 & j & j & 1 \\ j & -j & 1 & -1 & 1 \\ -j & j & -j & j & 1 \\ j & -j & -1 & 1 & 1 \\ -j & j & j & -j & 1 \end{bmatrix}$ $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ 1 & -1 & 1 & -1 & 1 \\ -j & j & 1 & -1 & j \\ -1 & 1 & 1 & -1 & -1 \\ j & -j & 1 & -1 & -j \end{bmatrix}$ $\frac{1}{S}\begin{bmatrix} 1 & 1 & 1 & 1 & 1 \\ -j & -j & 1 & 1 & j \\ -1 & -1 & 1 & 1 & -1 \\ j & j & 1 & 1 & -j \\ j & -j & 1 & -1 & 1 \\ 1 & -1 & 1 & -1 & j \\ -j & -j & 1 & -1 & -1 \\ -1 & 1 & 1 & -1 & -j \end{bmatrix}$ | the UL codebook for six layers includes all of or a subset of the following, where $S=4\sqrt{3}$:

| TPMI index | W (ordered from left to right in increasing order of TPMI index) |
|---|---|
| 0-3 | $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ 1 & -1 & 1 & -1 & 1 & -1 \\ 1 & -1 & j & -j & -1 & 1 \\ 1 & -1 & -1 & 1 & 1 & -1 \\ 1 & -1 & -j & j & -1 & 1 \end{bmatrix}$ $\frac{1}{S}\begin{bmatrix} 1 & 1 & 1 & 1 & 1 & 1 \\ 1 & 1 & j & j & -1 & -1 \\ 1 & 1 & -1 & -1 & 1 & 1 \\ 1 & 1 & -j & -j & -1 & -1 \\ j & -j & j & -j & 1 & -1 \\ j & -j & -1 & 1 & -1 & 1 \\ j & -j & -j & j & 1 & -1 \\ j & -j & 1 & -1 & -1 & 1 \end{bmatrix}$ $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ 1 & -1 & 1 & -1 & 1 & -1 \\ j & -j & -1 & 1 & -j & j \\ -1 & 1 & 1 & -1 & -1 & 1 \\ -j & j & -1 & 1 & j & -j \end{bmatrix}$ $\frac{1}{S}\begin{bmatrix} 1 & 1 & 1 & 1 & 1 & 1 \\ j & j & -1 & -1 & -j & -j \\ -1 & -1 & 1 & 1 & -1 & -1 \\ -j & -j & -1 & -1 & j & j \\ j & -j & j & -j & 1 & -1 \\ -1 & 1 & -j & j & -j & j \\ -j & j & j & -j & -1 & 1 \\ 1 & -1 & -j & j & j & -j \end{bmatrix}$ |
| 4-7 | $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ 1 & -1 & 1 & -1 & 1 & -1 \\ -1 & 1 & -j & j & 1 & -1 \\ 1 & -1 & -1 & 1 & 1 & -1 \\ -1 & 1 & j & -j & 1 & -1 \end{bmatrix}$ $\frac{1}{S}\begin{bmatrix} 1 & 1 & 1 & 1 & 1 & 1 \\ -1 & -1 & -j & -j & 1 & 1 \\ 1 & 1 & -1 & -1 & 1 & 1 \\ -1 & -1 & j & j & 1 & 1 \\ j & -j & j & -j & 1 & -1 \\ -j & j & 1 & -1 & 1 & -1 \\ j & -j & -j & -j & 1 & -1 \\ -j & j & -1 & 1 & 1 & -1 \end{bmatrix}$ $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ 1 & -1 & 1 & -1 & 1 & -1 \\ -j & j & 1 & -1 & j & -j \\ -1 & 1 & 1 & -1 & -1 & 1 \\ j & -j & 1 & -1 & -j & j \end{bmatrix}$ $\frac{1}{S}\begin{bmatrix} 1 & 1 & 1 & 1 & 1 & 1 \\ -j & -j & 1 & 1 & j & j \\ -1 & -1 & 1 & 1 & -1 & -1 \\ j & j & 1 & 1 & -j & -j \\ j & -j & j & -j & 1 & -1 \\ 1 & -1 & j & -j & j & -j \\ -j & j & j & -j & -1 & 1 \\ -1 & 1 & j & -j & -j & j \end{bmatrix}$ | the UL codebook for seven layers includes all of or a subset of the following, where $S=2\sqrt{14}$:

| TPMI index | W (ordered from left to right in increasing order of TPMI index) |
|---|---|
| 0-3 | $\frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ 1 & -1 & 1 & 1 & -1 & 1 & -1 \\ 1 & -1 & j & -1 & 1 & -j & j \\ 1 & -1 & -1 & 1 & -1 & -1 & 1 \\ 1 & -1 & -j & -1 & 1 & j & -j \end{bmatrix}$ $\frac{1}{S}\begin{bmatrix} 1 & 1 & 1 & 1 & 1 & 1 & 1 \\ 1 & 1 & j & -1 & -1 & -j & -j \\ 1 & 1 & -1 & 1 & 1 & -1 & -1 \\ 1 & 1 & -j & -1 & -1 & j & j \\ j & -j & j & 1 & -1 & 1 & -1 \\ j & -j & -1 & -1 & 1 & -j & j \\ j & -j & -j & 1 & -1 & -1 & 1 \\ j & -j & 1 & -1 & 1 & j & -j \end{bmatrix}$ $\frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ 1 & -1 & 1 & 1 & -1 & 1 & -1 \\ j & -j & -1 & -j & j & 1 & -1 \\ -1 & 1 & 1 & -1 & 1 & 1 & -1 \\ -j & j & -1 & j & -j & 1 & -1 \end{bmatrix}$ $\frac{1}{S}\begin{bmatrix} 1 & 1 & 1 & 1 & 1 & 1 & 1 \\ j & j & -1 & -j & -j & 1 & 1 \\ -1 & -1 & 1 & -1 & -1 & 1 & 1 \\ -j & -j & -1 & j & j & 1 & 1 \\ j & -j & j & 1 & -1 & 1 & -1 \\ -1 & 1 & -j & -j & j & 1 & -1 \\ -j & j & -j & -1 & 1 & 1 & -1 \\ 1 & -1 & -j & j & -j & 1 & -1 \end{bmatrix}$ | the UL codebook for eight layers includes all of or a subset of the following, where $S=8$:

| TPMI index | W (ordered from left to right in increasing order of TPMI index) |
|---|---|
| 0-3 | $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ 1 & -1 & 1 & -1 & 1 & -1 & 1 & -1 \\ 1 & -1 & j & -j & -1 & 1 & -j & j \\ 1 & -1 & -1 & 1 & 1 & -1 & -1 & 1 \\ 1 & -1 & -j & j & -1 & 1 & j & -j \end{bmatrix}$ |
| | $\frac{1}{S}\begin{bmatrix} 1 & 1 & 1 & 1 & 1 & 1 & 1 & 1 \\ 1 & 1 & j & j & -1 & -1 & -j & -j \\ 1 & 1 & -1 & -1 & 1 & 1 & -1 & -1 \\ 1 & 1 & -j & -j & -1 & -1 & j & j \\ j & -j & j & -j & 1 & -1 & 1 & -1 \\ j & -j & -1 & 1 & -1 & 1 & -j & j \\ j & -j & -j & j & 1 & -1 & -1 & 1 \\ j & -j & 1 & -1 & -1 & 1 & j & -j \end{bmatrix}$ |
| | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ 1 & -1 & 1 & -1 & 1 & -1 & 1 & -1 \\ j & -j & -1 & 1 & -j & j & 1 & -1 \\ -1 & 1 & 1 & -1 & -1 & 1 & 1 & -1 \\ -j & j & -1 & 1 & j & -j & 1 & -1 \end{bmatrix}$ |
| | $\frac{1}{S}\begin{bmatrix} 1 & 1 & 1 & 1 & 1 & 1 & 1 & 1 \\ j & j & -1 & -1 & -j & -j & 1 & 1 \\ -1 & -1 & 1 & 1 & -1 & -1 & 1 & 1 \\ -j & -j & -1 & -1 & j & j & 1 & 1 \\ j & -j & j & -j & 1 & -1 & 1 & -1 \\ -1 & 1 & -j & j & -j & j & 1 & -1 \\ -j & j & j & -j & -1 & 1 & 1 & -1 \\ 1 & -1 & -j & j & j & -j & 1 & -1 \end{bmatrix}$ |

* * * * *